United States Patent
Priley et al.

(10) Patent No.: US 9,521,924 B2
(45) Date of Patent: Dec. 20, 2016

(54) BREWABLE BEVERAGE MAKING MACHINE

(71) Applicant: Pangaea Labs Ltd., Fo Tan, N.T. (HK)

(72) Inventors: Anthony Paul Priley, Sacramento, CA (US); Robert Paul Schwartz, Highland Park, IL (US)

(73) Assignee: Pangaea Labs Ltd., Fo Tan, N.T. (HK)

( * ) Notice: Subject to any disclaimer, the term of this patent is extended or adjusted under 35 U.S.C. 154(b) by 337 days.

(21) Appl. No.: 14/208,574

(22) Filed: Mar. 13, 2014

(65) Prior Publication Data

US 2015/0173563 A1 Jun. 25, 2015

Related U.S. Application Data

(63) Continuation-in-part of application No. 14/140,189, filed on Dec. 24, 2013.

(51) Int. Cl.
| | |
|---|---|
| *A47J 31/00* | (2006.01) |
| *A47J 31/40* | (2006.01) |
| *A47J 31/32* | (2006.01) |
| *A47J 31/36* | (2006.01) |

(52) U.S. Cl.
CPC ............. *A47J 31/407* (2013.01); *A47J 31/32* (2013.01); *A47J 31/3609* (2013.01)

(58) Field of Classification Search
CPC .............................. A47J 31/32; A47J 31/3609
USPC .................................................. 99/287, 302 R
See application file for complete search history.

(56) References Cited

U.S. PATENT DOCUMENTS

| | | | | |
|---|---|---|---|---|
| 4,998,462 A | * | 3/1991 | Sekiguchi | A47J 31/32 99/289 T |
| 5,632,193 A | | 5/1997 | Shen | |
| 6,220,147 B1 | | 4/2001 | Priley | |
| 6,488,976 B1 | | 12/2002 | Priley | |
| 6,722,265 B2 | | 4/2004 | Priley | |
| 6,810,789 B2 | | 11/2004 | Chung et al. | |
| 6,973,869 B1 | * | 12/2005 | Lin | A47J 31/057 99/275 |

(Continued)

FOREIGN PATENT DOCUMENTS

| | | |
|---|---|---|
| CN | 1541076 A | 10/2004 |
| CN | 2922489 Y | 7/2007 |

(Continued)

*Primary Examiner* — Reginald L Alexander
(74) *Attorney, Agent, or Firm* — Richard M. Goldberg

(57) ABSTRACT

A brewable beverage making machine includes a brewing chamber assembly for holding a brewable substance therein, the brewing chamber assembly including inlet openings for supply of an input liquid therein, an outlet opening at an upper end thereof, and a discharge opening for discharging the brewed liquid, the inlet openings being sized and oriented to cause turbulent agitation; a heater which heats the input liquid supplied to the brewing chamber assembly; an pump for supplying heated liquid from the heater through the inlet openings; a first valve connected with the outlet opening; and a microprocessor which opens the first valve during initial filling of the brewing chamber assembly with the heated liquid and closes the first valve when the heated liquid reaches a predetermined level in the brewing chamber assembly to cause pressurization of the heated liquid in the brewing chamber assembly during a brewing operation.

33 Claims, 78 Drawing Sheets

(56) References Cited

U.S. PATENT DOCUMENTS

| | | | |
|---|---|---|---|
| 7,717,026 B1 * | 5/2010 | Lassota | A47J 31/36 |
| | | | 99/283 |
| 7,930,972 B2 * | 4/2011 | Denisart | A47J 31/002 |
| | | | 99/295 |
| 8,667,892 B2 | 3/2014 | Cominelli | |
| 8,997,633 B2 * | 4/2015 | Bishop | A47J 31/32 |
| | | | 99/287 |
| 9,295,358 B2 * | 3/2016 | Vastardis | A47J 31/4403 |
| 2005/0076788 A1 | 4/2005 | Grant et al. | |
| 2006/0280841 A1 | 12/2006 | Cai | |
| 2009/0029021 A1 | 1/2009 | Nielson et al. | |
| 2010/0139496 A1 | 6/2010 | Santoiemmo | |
| 2010/0218686 A1 | 9/2010 | O'Brien et al. | |
| 2011/0200726 A1 | 8/2011 | Tinkler et al. | |
| 2011/0226343 A1 | 9/2011 | Novak | |
| 2011/0256273 A1 | 10/2011 | de Graaff et al. | |
| 2012/0052171 A1 | 3/2012 | Starr et al. | |
| 2012/0058226 A1 | 3/2012 | Winkler et al. | |
| 2012/0285334 A1 | 11/2012 | Demiglio et al. | |
| 2013/0055904 A1 | 3/2013 | DeMiglio et al. | |
| 2013/0199379 A1 | 8/2013 | Arnett | |

FOREIGN PATENT DOCUMENTS

| | | |
|---|---|---|
| CN | 201048847 Y | 4/2008 |
| CN | 101327099 A | 12/2008 |
| CN | 101953639 A | 1/2011 |
| CN | 102026891 A | 4/2011 |
| CN | 104188534 A | 12/2014 |
| WO | 2011/138405 A | 11/2011 |
| WO | 2012/084964 A1 | 6/2012 |

* cited by examiner

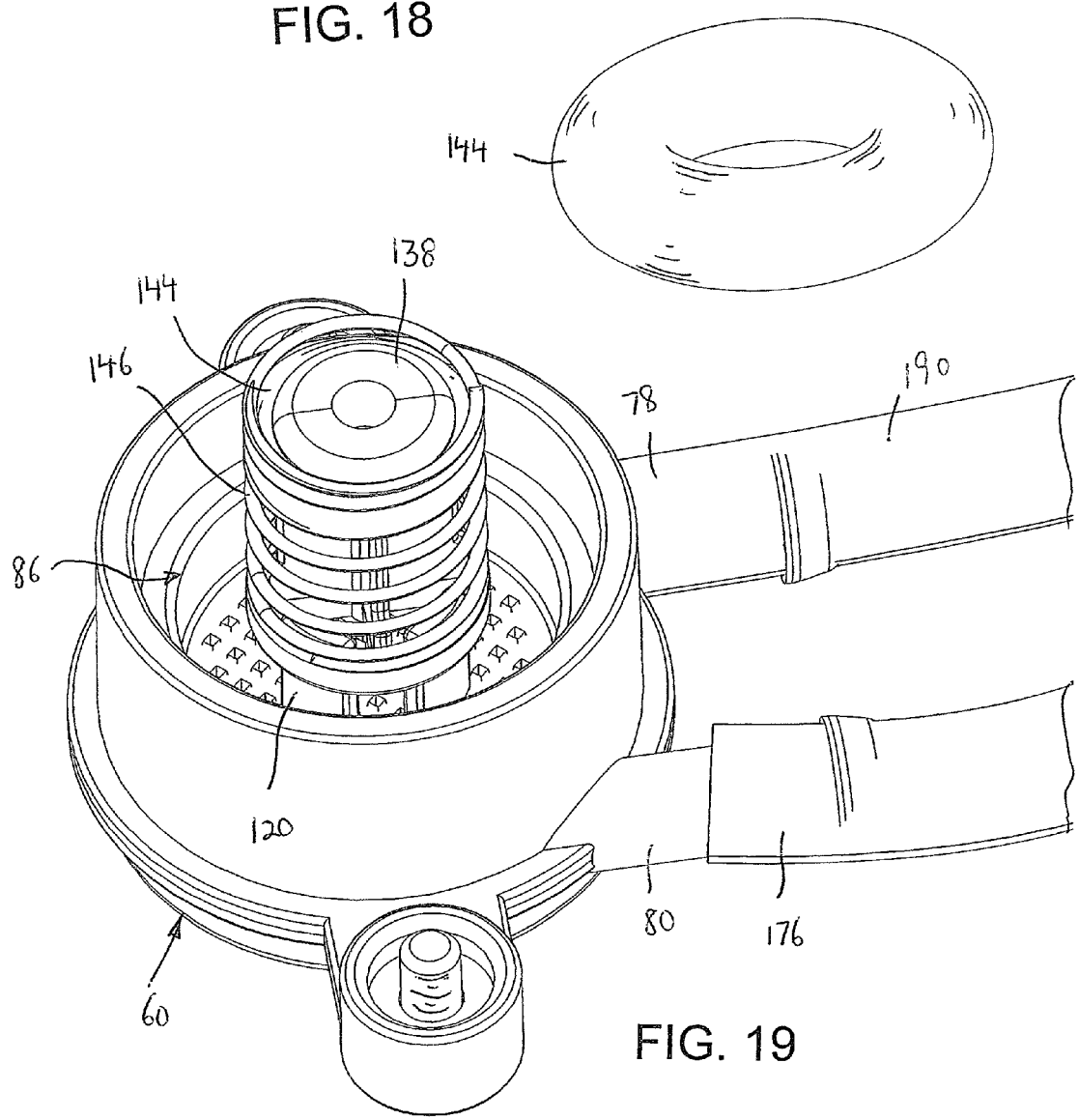

BREWABLE BEVERAGE MAKING MACHINE

REFERENCE TO RELATED APPLICATION

The present application is a Continuation-In-Part of U.S. patent application Ser. No. 14/140,189 to the same applicant, filed Dec. 24, 2013 and entitled BREWABLE BEVERAGE MAKING CUP ADAPTOR FOR CARTRIDGE TYPE COFFEE MAKING MACHINES AND CARTRIDGE TYPE COFFEE MAKING MACHINE.

BACKGROUND OF THE INVENTION

The present invention relates generally to brewable beverage making machines, which can use tea, coffee, cocoa, hops, malts and grains for such brewing.

A single serve coffee brewing machine sold under the registered trademark KEURIG has become very popular. This machine uses a single portion cartridge or packet sold under the registered trademark K-CUP. Each packet includes a cup packed with a brewing material, such as coffee, and sealed air tight at its upper open end with a foil lid. A similar machine is sold under the trademark NESPRESSO.

When the packet is placed in one of its brewing machines, the brewer punctures the foil lid with a spray nozzle and the bottom wall of the packet with a discharge nozzle. Coffee grounds are held in the packet. Hot water under pressure is supplied through the spray nozzle, mixes with the coffee grounds, and then exits through the discharge nozzle to a coffee mug positioned by the user below the discharge nozzle.

With this arrangement, however, the output punched hole is basically the same size as the input punched hole, so that there is no steeping or residence time of the hot water in the packet, that is, the water quickly flows through the coffee and out the punched outlet hole. Further, as the water enters the packet, air in the packet rises as a bubble of air. However, because the only inlet opening is the punched hole in the foil lid through which the water is supplied, there is nowhere for the air to escape. As a result, the pocket of air further prevents the water from rising in the packet to properly mix with all of the coffee grounds, as well as providing added pressure for pushing the water quickly out of the punched outlet hole.

In addition to being used with coffee, the packets sold under the trademark K-CUP also include tea leaves for brewing tea, cocoa for making hot cocoa beverages, as well as fruit brews for making fruit drinks.

The KEURIG system also includes a refillable cartridge or basket with a filter that can be inserted therein and filled with a brewable material sold under the trademark MY K-CUP. A top is provided with an opening that is always open and receives the input nozzle of the machine, as well as having side air vents for fluidly connecting the interior with atmospheric pressure. The bottom of the basket includes at least one outlet discharge opening, which has a greater area than the inlet water opening in the top. Thus, there is no need for any puncturing devices. To fit this device in the Keurig machine, a sub-housing must be removed first.

However, with the refillable basket, because the outlet opening has a greater area than the inlet opening, and because of the vent openings, the hot water input into the basket will flow very rapidly out through the outlet discharge opening, with very little steeping or residence time.

With the above systems, the hot water does not always sufficiently extract the flavor from the material in the packet. This is because the water flows into and out of the cartridge very quickly, without providing sufficient time to extract the flavor from the materials in the cartridge. This is particularly the case with tea leaves, where it is necessary for the hot water to interact with the tea leaves over a larger time period.

The same applies to conventional coffee and tea brewing machines.

SUMMARY OF THE INVENTION

Accordingly, it is an object of the present invention to provide a brewable beverage making machine that overcomes the aforementioned problems.

It is another object of the present invention to provide a brewable beverage making machine which serves to better force the water into the brewable material, particularly where the material consists of tea leaves, to better extract the flavor from the tea leaves.

It is still another object of the present invention to provide a brewable beverage making machine which permits air to escape the brewing chamber during initial filling of the hot water therein, but which pressurizes the brewing chamber once it is filled with hot water and the air escapes therefrom.

It is yet another object of the present invention to provide a brewable beverage making machine which prevents air or vapor lock at the upper end of the brewing chamber during filling of the hot water therein.

It is a further object of the present invention to provide a brewable beverage making machine which provides agitation and turbulence of the hot water entering the brewing chamber, providing an improved mixing of the water with the material therein, to better extract the flavor from the material.

It is a still further object of the present invention to provide a brewable beverage making cup machine that is easy and economical to make and use.

In accordance with an aspect of the present invention, a brewable beverage making machine includes a brewing chamber assembly for holding a brewable substance therein, the brewing chamber assembly including at least one inlet opening for supply of an input liquid therein, an outlet opening at an upper end of the brewing chamber assembly and a discharge opening for discharging a brewed liquid from the brewing chamber assembly, the at least one inlet opening being sized and oriented to cause turbulent agitation of the input liquid and brewable substance in the brewing chamber assembly. A heater heats the input liquid supplied to the brewing chamber assembly, and there is an arrangement for supplying heated liquid from the heater through the at least one inlet opening. A first valve is connected with the outlet opening, and a control element opens the first valve during initial filling of the brewing chamber assembly with the heated liquid and closes the first valve when the heated liquid reaches a predetermined level in the brewing chamber assembly to cause pressurization of the heated liquid in the brewing chamber assembly during a brewing operation.

Preferably, there is a brewing support assembly, and the the brewing chamber assembly is removably insertable in the brewing support assembly. In such case, the brewing support assembly includes a brewing lower support and a brewing upper support, with the brewing upper support and brewing lower support being movable relative to each other between a closed brewing position and an open position, with the brewing lower support being fixed in position, and the brewing upper support pivotally mounted relative to the brewing lower support, with the brewing chamber assembly removably mounted in the brewing lower support.

There is also a locking mechanism for releasably locking the brewing upper support to the brewing lower support during a brewing operation.

In such case, the brewing support assembly includes at least one inlet opening therein that is aligned with the at least one inlet opening of the brewing chamber assembly when the brewing chamber assembly is inserted in the brewing beverage support, for supply of the input liquid to the brewing chamber assembly.

Preferably, the brewing chamber assembly includes a bottom section and a top section, with the bottom section and the top section being movable relative to each other between a closed brewing position and an open position for removal and insertion of the brewable substance therein, and the top section includes a transparent dome to permit a user to view the turbulent agitation of the brewable substance and the input liquid during a brewing operation. In such case, the brewing upper support of the brewing support assembly also includes a transparent dome in covering spaced relation to the transparent dome of the top section.

Preferably, there is an arrangement to prevent fogging and condensation of the transparent domes during a brewing operation.

In one embodiment, the arrangement to prevent fogging and condensation includes a fan for blowing air between the transparent domes to prevent fogging thereof during a brewing operation.

Preferably, the at least one inlet opening is located at an offset position away from a center line of the brewing enclosure, and sized to provide sufficient velocity of the input liquid to move the brewable substance and input liquid within the brewing chamber assembly with the turbulent agitation. More preferably, there are at least two inlet openings at a lower section of the brewing chamber assembly, the at least two inlet openings being angled upwardly and slightly inwardly toward each other so that the input liquid supplied through the at least two inlet openings meet at a position below the outlet opening.

There is also a second valve connected with the discharge opening, and the control element controls operation of the second valve to close the second valve during initial filling of the brewing chamber assembly with the heated liquid and to open the second valve when the heated liquid reacts with the brewable substance to create the brewed liquid in order to permit discharge of the brewed liquid from the discharge opening, as determined by pressure in the chamber, and/or brewing time. Brewing time is defined as either residence time which is a length of time the input liquid is held in contact with the brewable substance, or agitation time which is a length of time the input liquid and the brewable substance are exposed to agitation.

The arrangement for supplying heated liquid from the heater through the at least one inlet opening includes a pump for pumping the heated liquid from the heater through the at least one inlet opening.

There is also an air pump for pumping air into the brewing chamber assembly at the end of a brewing cycle, so as to aid in forcing out brewed liquid from the brewing chamber assembly. The air pump also provides additional agitation during a brewing operation. In addition, the air pump is adapted to pump cooling air into the brewing chamber assembly so as to cool the brewed liquid exiting from the brewing chamber assembly. As to this latter aspect, the machine can also include a device for breaking up the brewed liquid exiting from the brewing chamber assembly into one of particles and droplets, in order to further cool the brewed liquid.

In accordance with another aspect of the present invention, a method of brewing a beverage includes the step of holding a brewable substance in a brewing chamber assembly of the type including at least one inlet opening for supply of an input liquid therein, an outlet opening at an upper end of the brewing chamber assembly and a discharge opening for discharging a brewed liquid from the brewing chamber assembly, the at least one inlet opening being sized and oriented to cause turbulent agitation of the input liquid and brewable substance in the brewing chamber assembly. The input liquid is heated supplied to the brewing chamber assembly, and the heated liquid is supplied from the heater through the at least one inlet opening to cause the turbulent agitation. A first valve connected with the outlet opening is opened during initial filling of the brewing chamber assembly with the heated liquid, and the first valve is closed when the heated liquid reaches a predetermined level in the brewing chamber assembly to cause pressurization of the heated liquid in the brewing chamber assembly during a brewing operation.

The method also includes the step of preventing fogging and condensation of the transparent domes during a brewing operation. Preferably, this step includes the step of blowing air between the transparent domes to prevent fogging thereof during a brewing operation.

Also, the method includes the step of supplying heated liquid from the heater through the at least one inlet opening causes the input liquid to result in the turbulent agitation.

The method further includes the step of controlling a second valve connected with the discharge opening to close during initial filling of the brewing chamber assembly with the heated liquid and to open when the heated liquid reacts with the brewable substance to create the brewed liquid in order to permit discharge of the brewed liquid from the discharge opening, as determined by pressure in the chamber, and/or brewing time.

The step of for supplying heated liquid from the heater through the at least one inlet opening includes the step of pumping the heated liquid from the heater through the at least one inlet opening.

The method further includes the step of pumping air into the brewing chamber assembly at the end of a brewing cycle, so as to aid in forcing out brewed liquid from the brewing chamber assembly, and/or so as to provide additional agitation during a brewing operation. Cooling air can also be pumped into the brewing chamber assembly so as to cool the brewed liquid exiting from the brewing chamber assembly. As to the latter aspect, the method can also include the step of breaking up the brewed liquid exiting from the brewing chamber assembly into one of particles and droplets, in order to further cool the brewed liquid.

The above and other features of the invention will become readily apparent from the following detailed description thereof which is to be read in connection with the accompanying drawings.

BRIEF DESCRIPTION OF THE DRAWINGS

FIG. 18 is a perspective view of the gasket ring;

FIG. 19 is a top perspective view of the partial assembly of the water tank connector, tank valve, gasket ring and coil spring;

DETAILED DESCRIPTION

Figure 1:
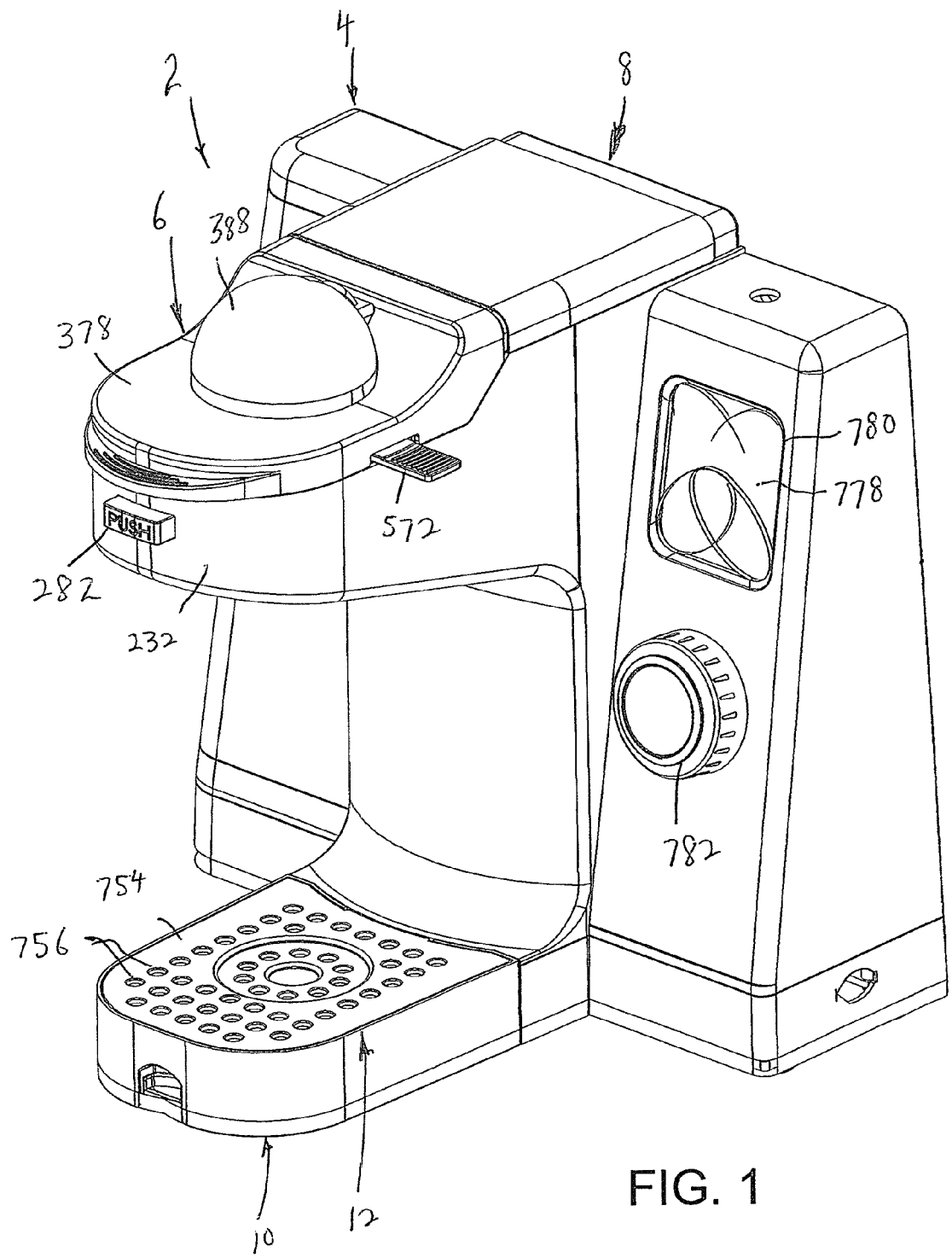
FIG. 1 is a top perspective view of the brewable beverage making machine according to the present invention.
Figure 2:
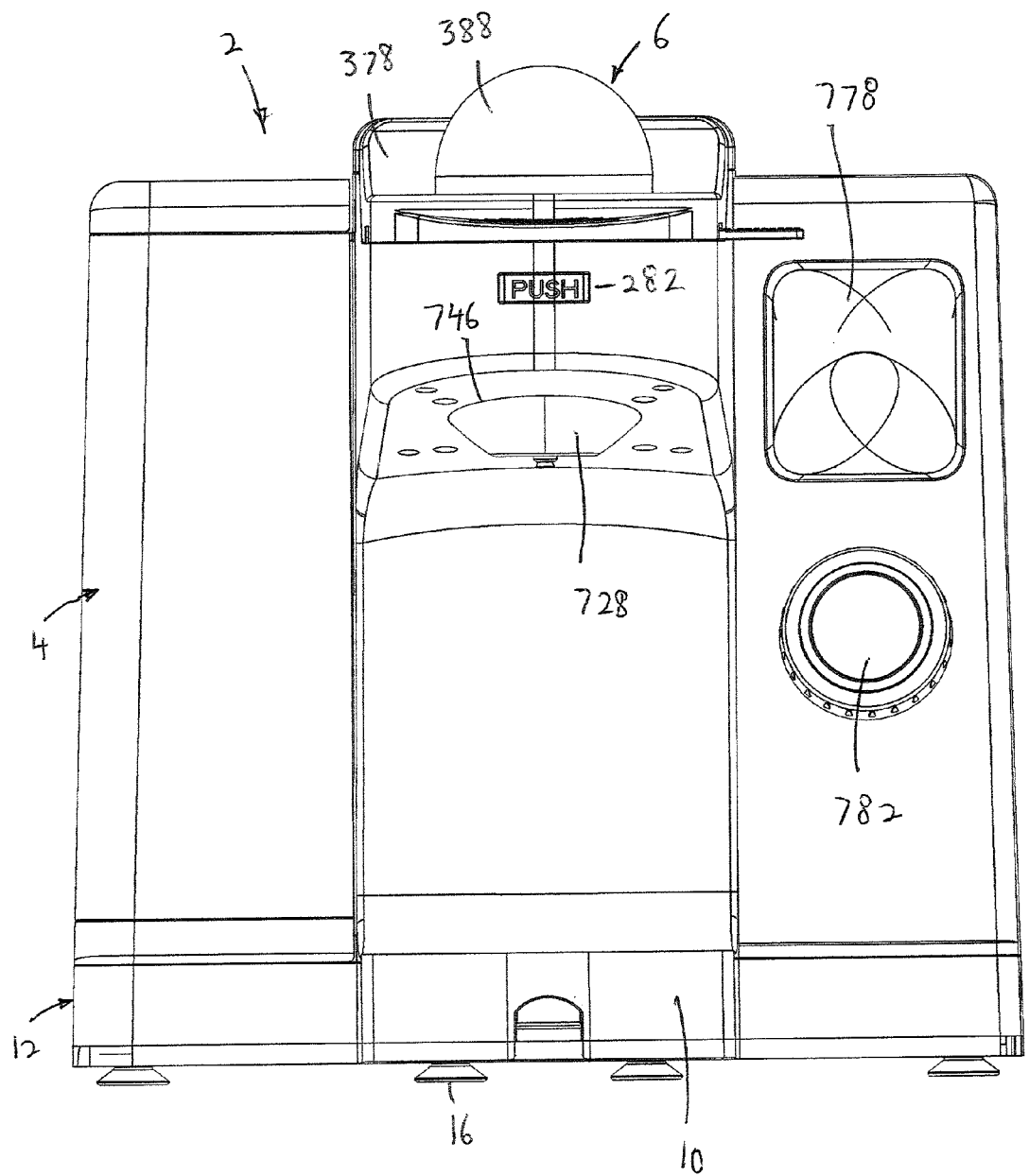
FIG. 2 is a front perspective view of the brewable beverage machine.
Figure 3:
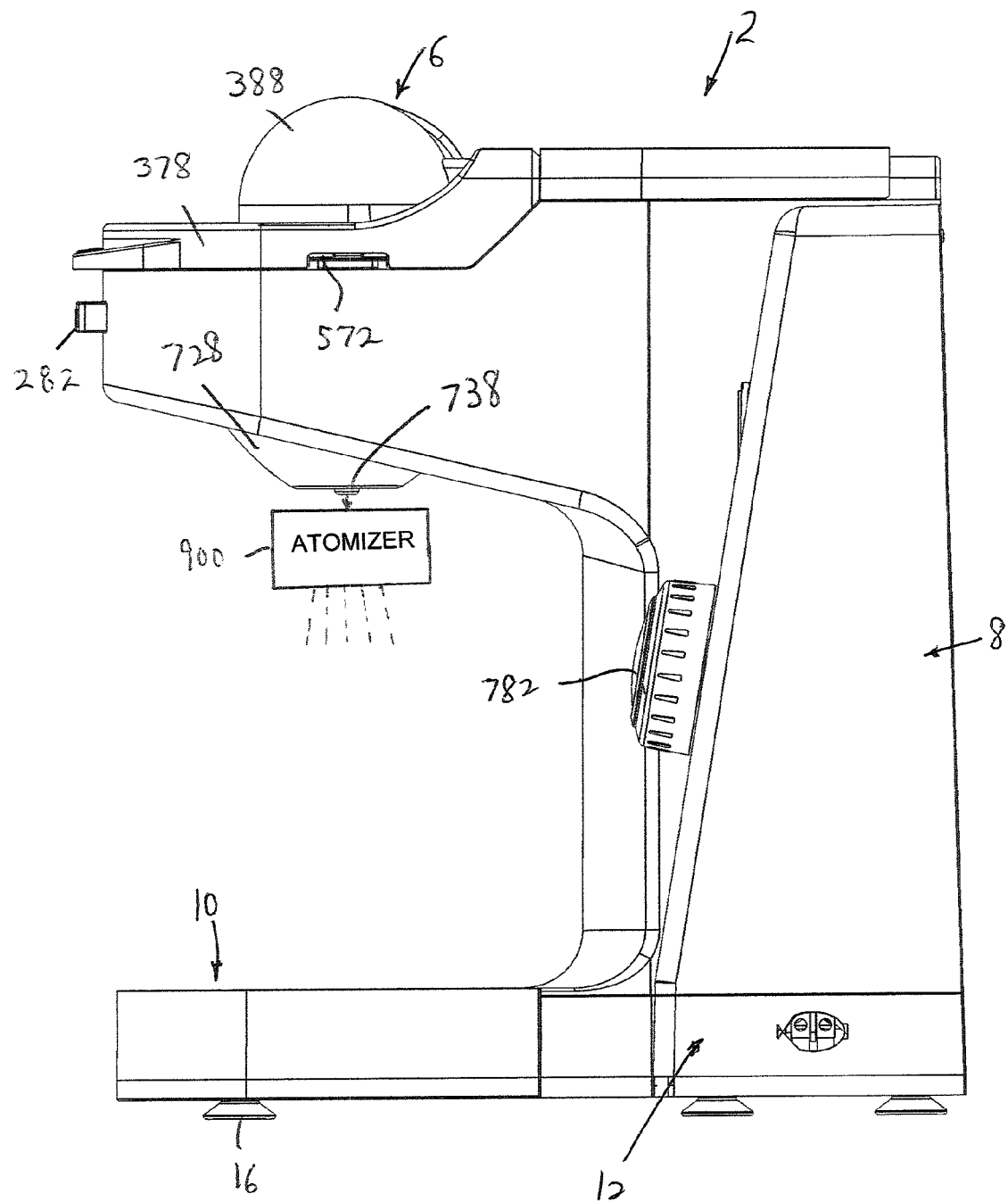
FIG. 3 is a right side elevational view of the brewable beverage making machine.
Figure 4:
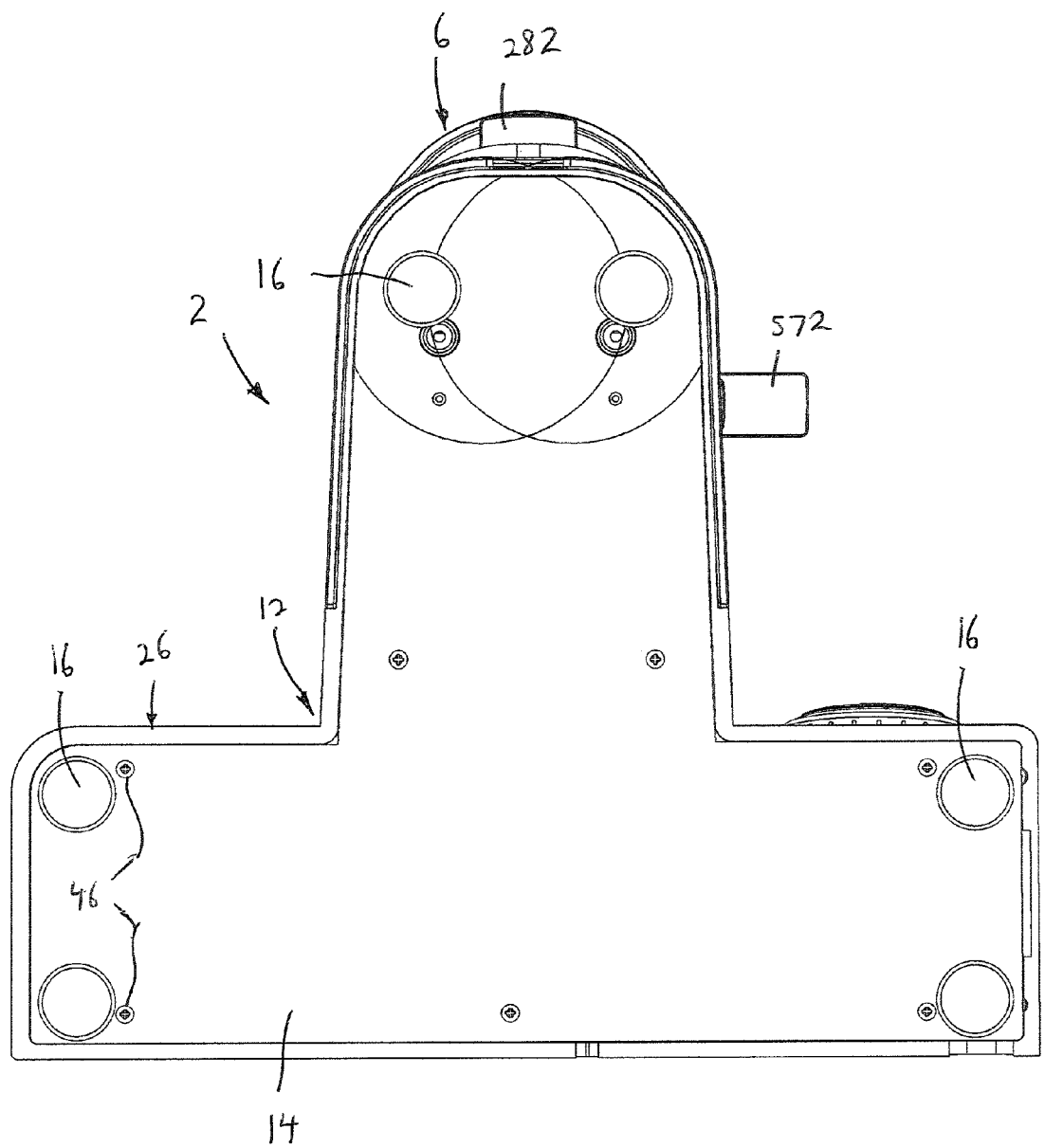
FIG. 4 is a bottom plan view of the brewable beverage making machine.
Figure 5:
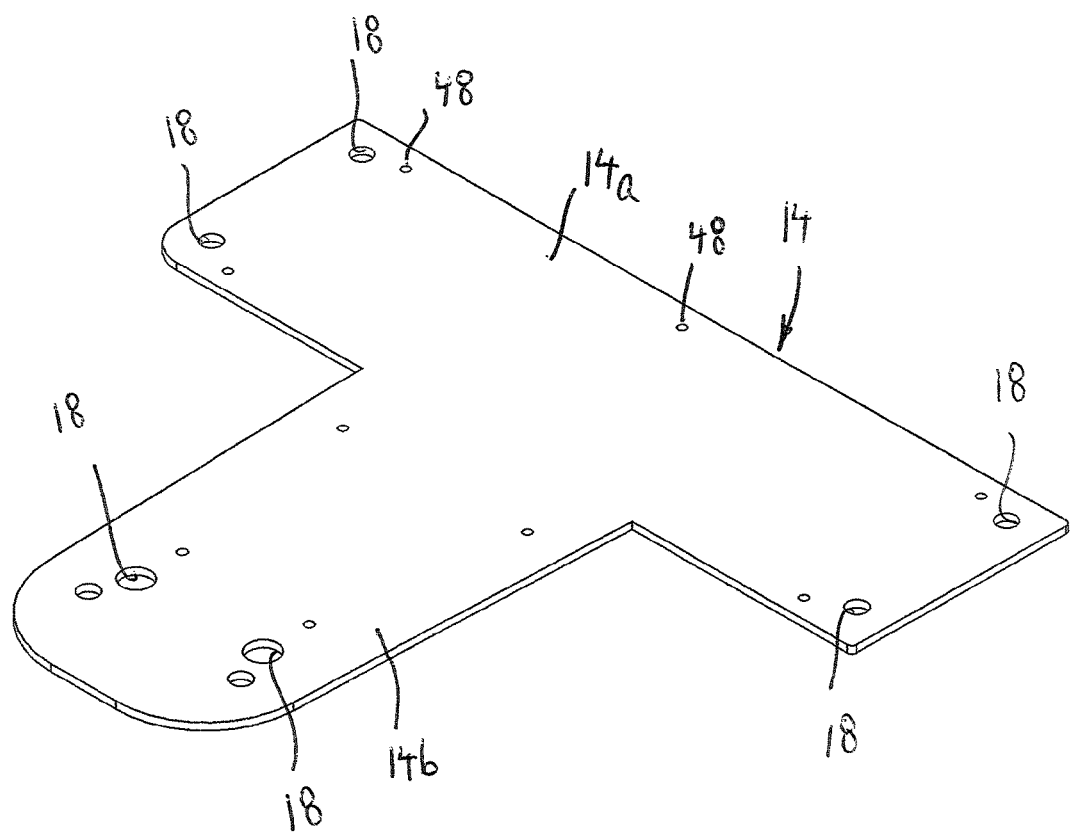
FIG. 5 is perspective view of the T-shaped plate thereof.
Figure 6:
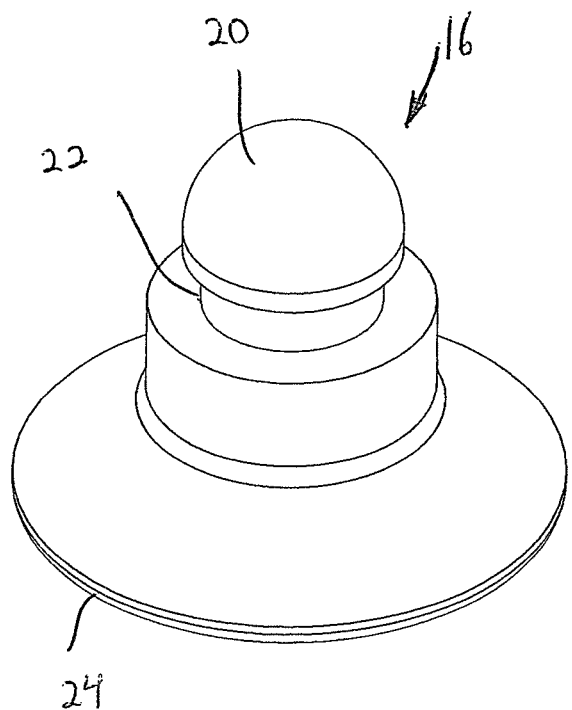
FIG. 6 is an enlarged perspective view of one of the suction cup feet.
Figure 7:
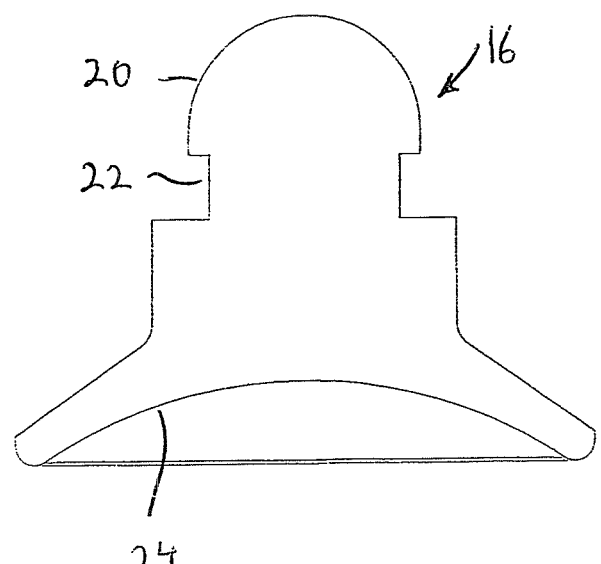
FIG. 7 is a cross-sectional view of the suction cup foot of FIG. 6.

Referring to the drawings in detail, a brewable beverage making machine 2 according to the present invention will now be described. In order to better emphasize the aspects of the present invention, brewable beverage making machine 10 will be discussed hereafter in relation to brewing of tea. However, it will be understood that the present invention is not limited thereby, and can be used with any brewable material, including but not limited to, coffee, cocoa, hops, malts, grains, medicinal herbs and tisane.

Specifically, as shown generally in FIGS. 1-4, brewable beverage making machine 2 according to the present invention includes a water tank 4, a brewing assembly 6, a housing 8 which encloses a water pump, heater, electronics, etc., and a front pedestal 10 below the brewing assembly 6 for holding a glass or cup to receive the brewed beverage.

As shown in FIGS. 1 and 4-7, housing 8 includes a T-shaped base 12 having a bottom T-shaped steel plate 14 for supporting the machine on a ground surface. T-shaped plate 14 includes a main plate leg 14a and a central plate leg 14b extending centrally from main plate leg 14a in a perpendicular manner. Rubber feet 16 are press fit within openings 18 of T-shaped steel plate 14, and have a bulbous end 20 for insertion through opening 18, an annular channel 22 below bulbous end 20 for capture in openings 18 and an arcuate opposite suction end 24 for supporting machine 2 on a surface.

Figure 8:
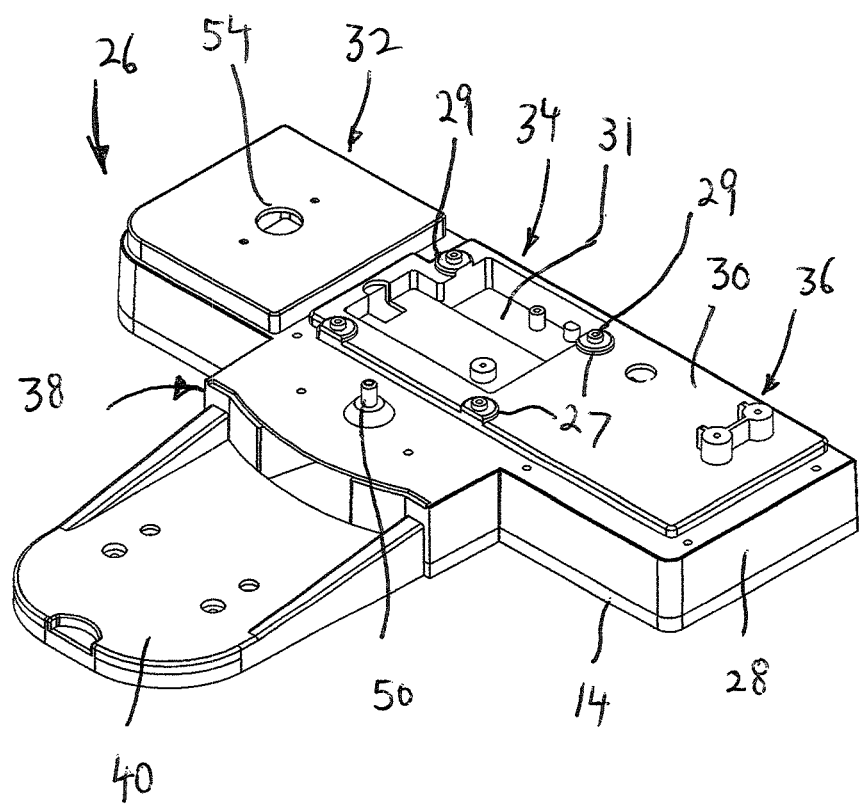
FIG. 8 is a top perspective view of the T-shaped hollow wall enclosure.
Figure 9:
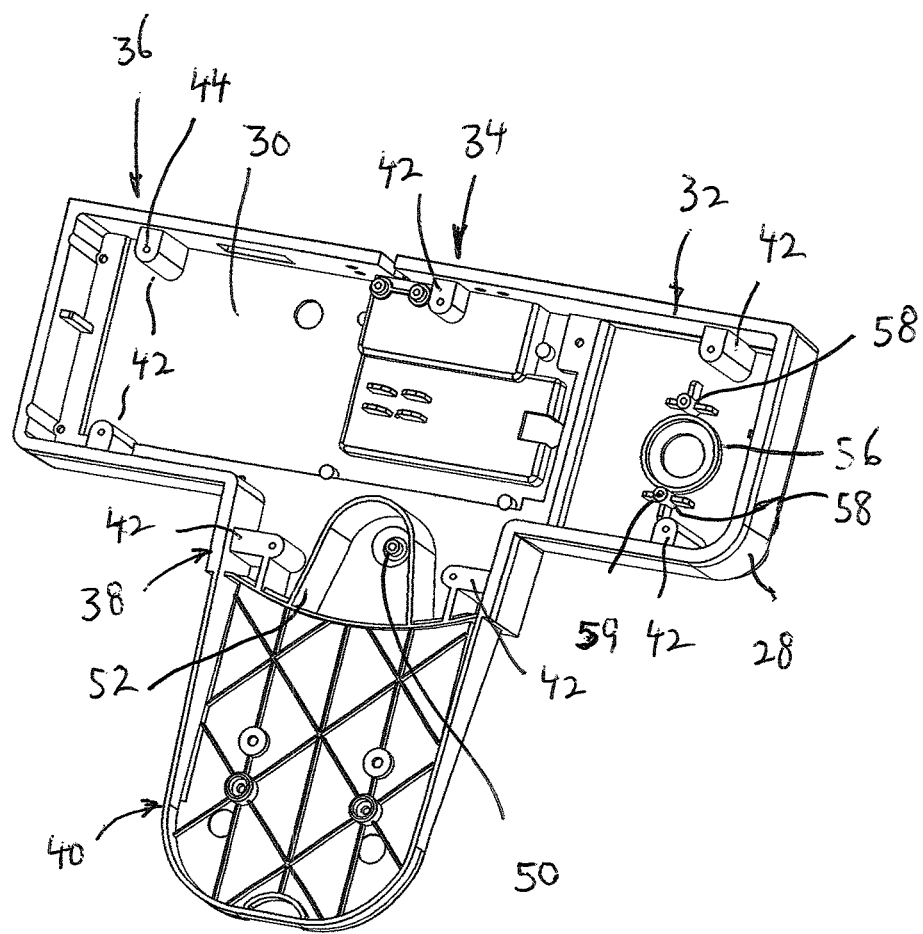
FIG. 9 is a bottom perspective view of the T-shaped hollow wall enclosure.

As shown in FIGS. 1, 8 and 9, housing 8 further includes a T-shaped hollow wall enclosure 26 mounted around T-shaped steel plate 14 such that T-shaped steel plate 14 fits within and is coplanar with the lower edge of T-shaped hollow wall enclosure 26.

T-shaped hollow wall enclosure 26 includes side walls 28 and an upper wall 30 which form, extending along main plate leg 14a of the T-shape, in line, an end water tank support 32, a central water pump and heater support 34 and an end air pump support 36. T-shaped hollow wall enclosure 26 also includes a tube connector support 38 extending partially along the central leg 14b of the T-shaped steel plate 14, with a cup platform support 40 extending from the front of tube connector support 38 to the front of the remainder of central leg 14b of the T-shaped steel plate 14.

A plurality of bosses 42 extend down from the underside of upper wall 30 and include threaded openings 44 through which screws 46 are inserted into openings 48 in T-shaped plate 14 as to secure T-shaped hollow wall enclosure 26 to T-shaped steel plate 14.

T-shaped hollow wall enclosure 26 includes a short nipple 50 extending up through upper wall 30 for connection of a tube thereto. The lower end of nipple 50 is open and an arcuate guide wall 52 is provided so that any liquid supplied through nipple 50 will be directed to the area of cup platform support 40 as a drain.

At end water tank support 32, there is an opening 54 in upper wall 30 thereat. A circular guide wall 56 is connected to the underside of upper wall 30 in surrounding relation to opening 54, and two bosses 58 with threaded openings 59 are provided in diametrically opposed relation on opposite sides of circular guide wall 56 and also connected with the underside of upper wall 30 thereat.

Figure 10:
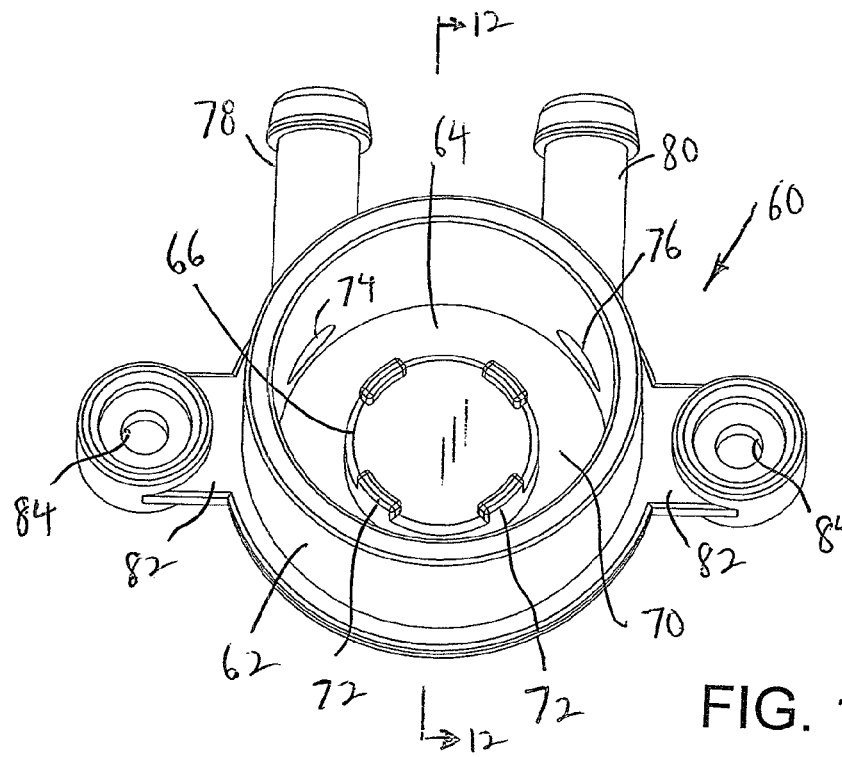
FIG. 10 is a top perspective view of the water tank connector.
Figure 11:
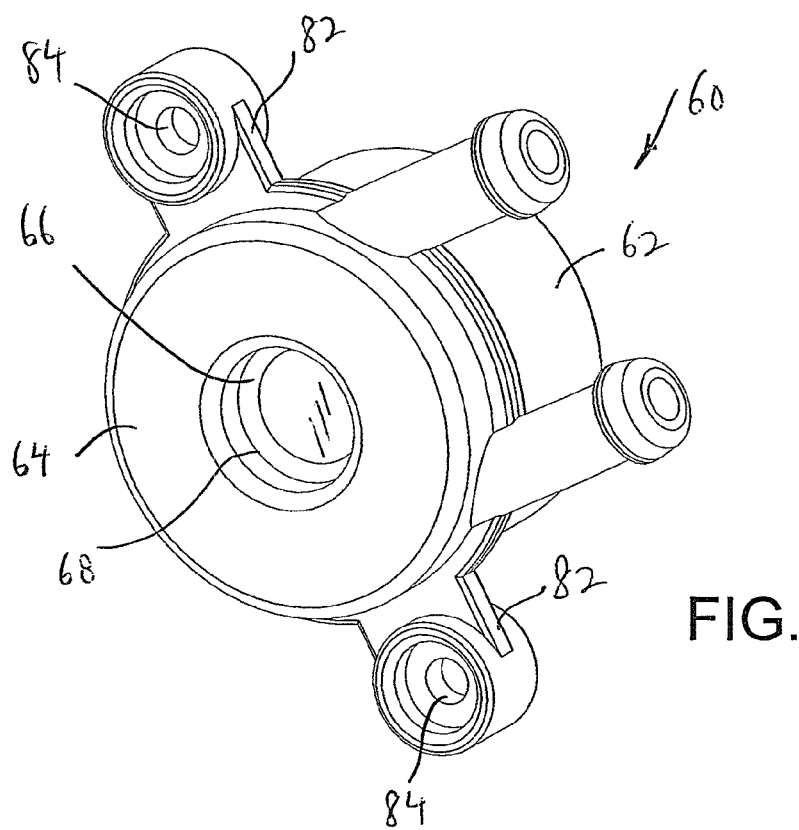
FIG. 11 is a bottom perspective view of the water tank connector.
Figure 12:
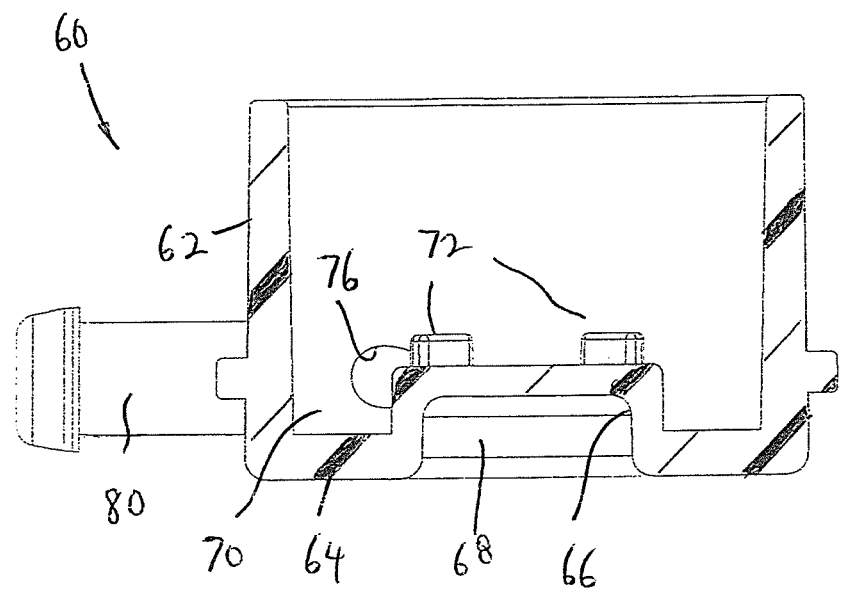
FIG. 12 is a cross-sectional view of the water tank connector of FIG. 10, taken along line 12-12 thereof.

As shown in FIGS. 10-12, a water tank connector 60 is secured within circular guide wall 56. Specifically, water tank connector 60 includes an annular side wall 62 closed by a bottom wall 64 having a central raised section 66 forming a central cylindrical recess 68 at the underside. As a result, there is an annular recess 70 formed in surrounding relation to central raised section 66. Four equiangularly spaced projections 72 are formed on top of central raised section 66 at the periphery thereof. Two openings 74 and 76 are formed in annular side wall 62 in fluid communication with annular recess 70, and two outwardly extending nipples 78 and 80 are connected to the outer surface of annular side wall 62 in fluid communication with openings 74 and 76, respectively. Two diametrically opposite projections 82 extend from the outer surface of annular side wall 62 and each includes an opening 84 through which screws (not shown) are inserted and threadedly received within threaded openings 59 to secure water tank connector 60 to the underside of upper wall 30 within circular guide wall 56.

Figure 13:
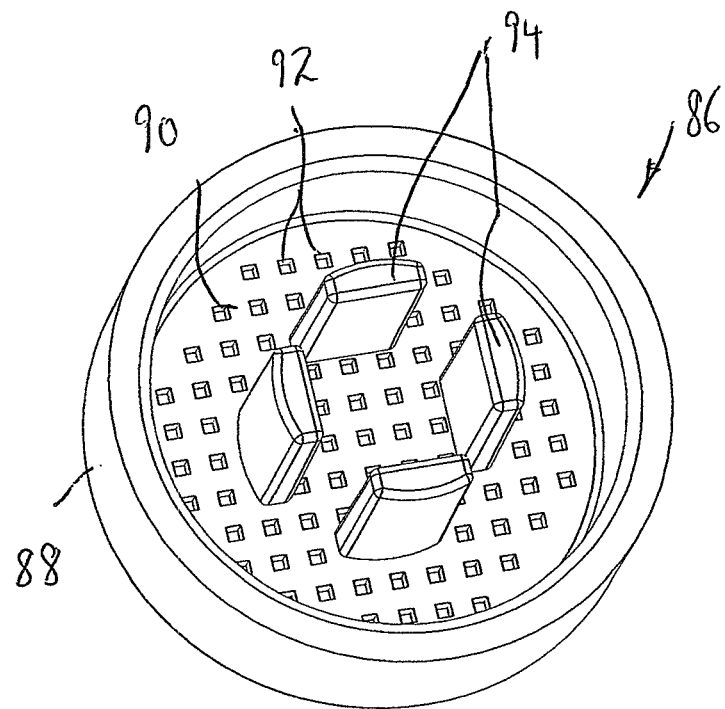
FIG. 13 is a top perspective view of the valve actuator.
Figure 14:
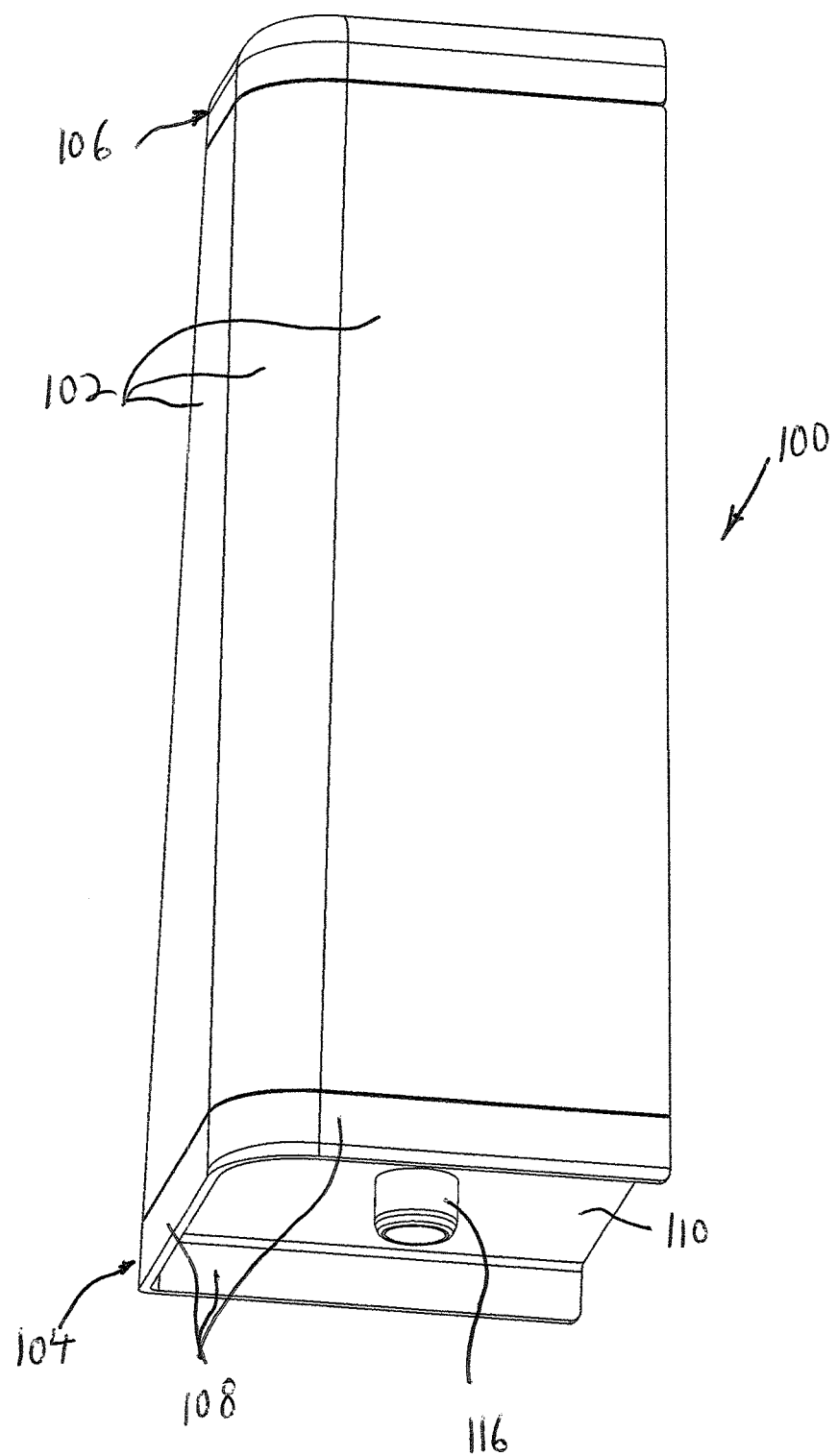
FIG. 14 is a top perspective view of the water tank.
Figure 15:
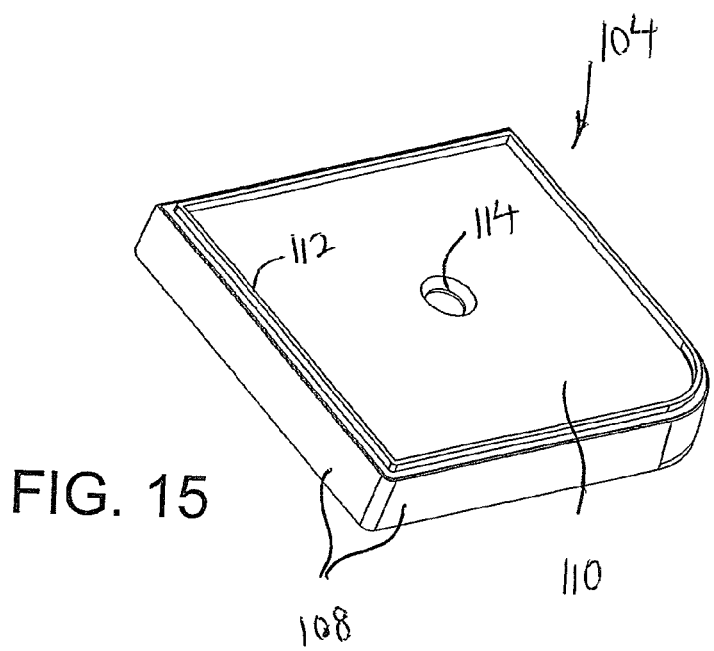
FIG. 15 is a top perspective view of the bottom closure for the water tank.

As shown in FIG. 13, a valve actuator 86 seats on projections 72. Specifically, valve actuator 86 includes an annular wall 88 closed at its lower end by a circular bottom wall 90 having a plurality of small openings 92 therein. Four upstanding valve actuating projections 94 extend upwardly from the upper surface of circular bottom wall 90 and are arranged equiangularly about an inner circle and extend above the upper surface of annular wall 88. When valve actuator 86 seats on projections 72, there is a space between circular bottom wall 90 of valve actuator 86 and bottom wall 64 and central raised section 66 of water tank connector 60, whereby water passes through small openings 92 into this space and out through nipples 78 and 80.

As shown in FIGS. 1, 2, 14 and 15, water tank 4 includes a water tank enclosure 100 is provided for supplying water for brewing purposes, and in this regard, water tank enclosure 100 includes four side walls 102, a bottom closure 104 mounted in sealing relation to the bottom of side walls 102 and a removable cover 106 at the upper end of side walls 102. Bottom closure 104 includes three side walls 108 having an upper end that seats flush against the lower end of side walls 102 and effectively forms a continuation thereof, an upper wall 110 that is connected to the upper edges of side walls 108 and closes the upper open end thereof, and a peripheral lip 112 on upper wall 110 spaced slightly inward from the periphery of upper wall 110 and which forms a sealing relation with the inner surfaces of side walls 102 at their lower ends. A central opening 114 is formed in upper wall 110 and an annular valve holding boss 116 extends down from the lower surface of upper wall 110 in surrounding relation to central opening 114.

Figure 16:
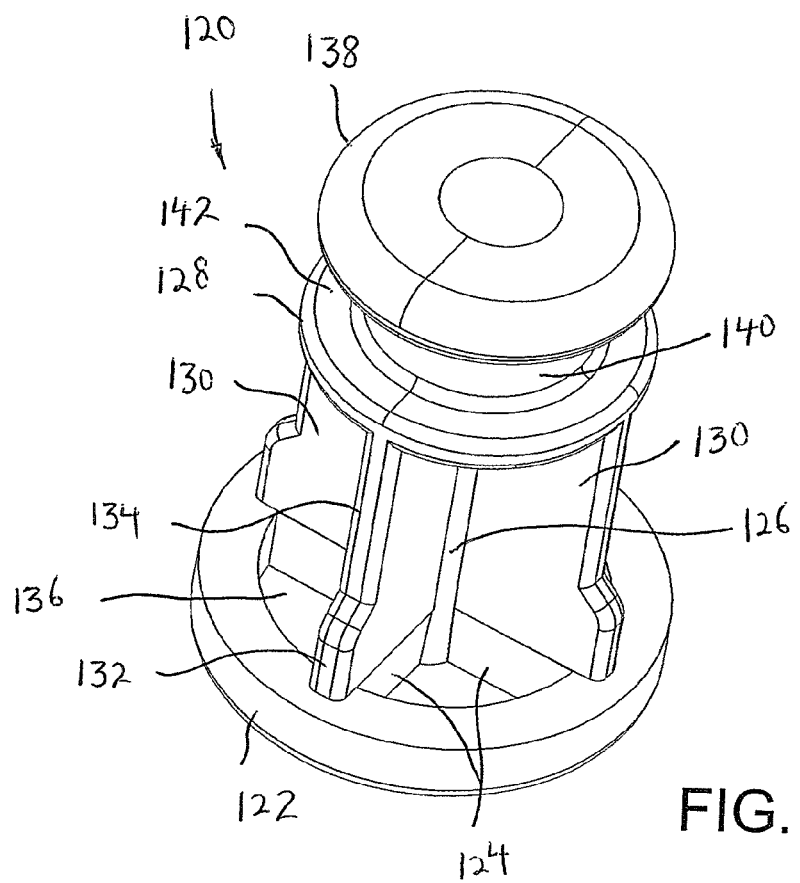
FIG. 16 is a top perspective view of the tank valve.
Figure 17:
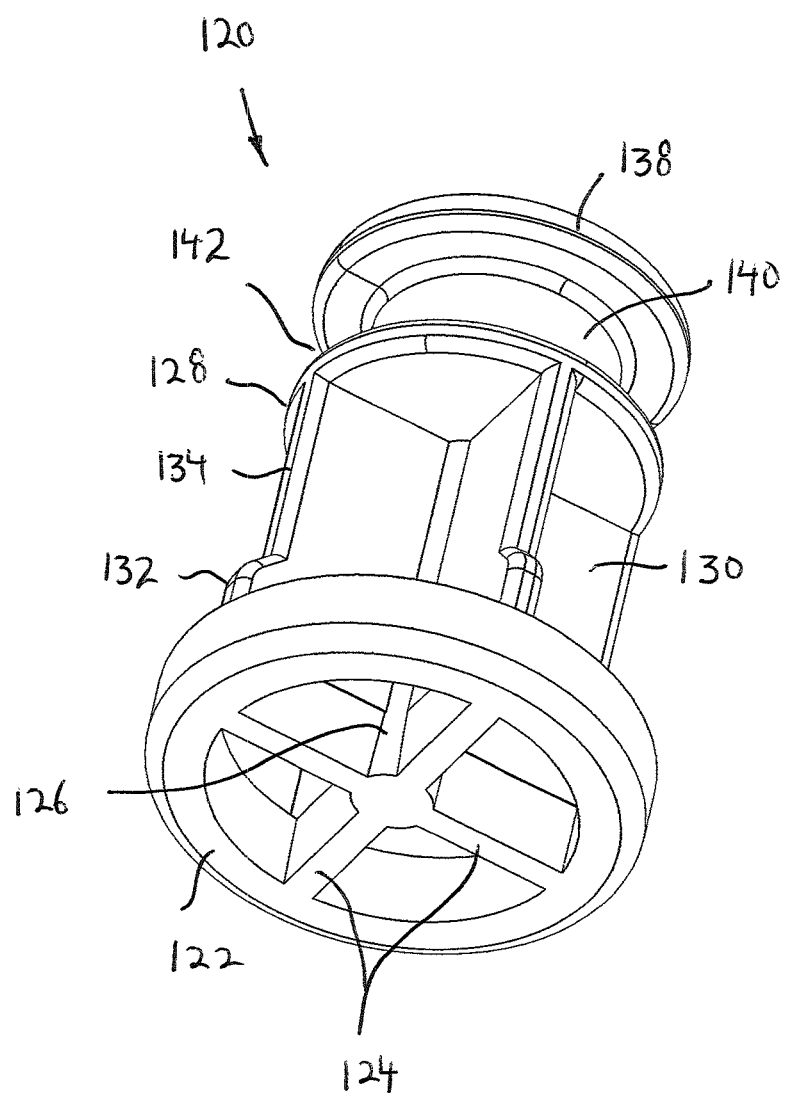
FIG. 17 is a bottom perspective view of the tank valve.

A tank valve 120 slidably fits within annular valve holding boss 116. As shown in FIGS. 16 and 17, tank valve 120 includes an annular base ring 122 having four equiangularly arranged radially extending walls 124 within base ring 122, each extending from a central vertical column 126 at its inner end and connected to the inner surface of base ring 122 at its outer end. An intermediate circular disc 128 is provided in parallel, spaced apart relationship above base ring 122 and four equiangularly arranged radially extending walls 130 are connected between the underside of intermediate circular disc 128 and the upper surface of base ring 122, in vertical alignment with equiangularly arranged radially extending walls 124, and are connected to and extend radially outward from central column 126. Each radially extending wall 130 has a lower section 132 thereof of a greater outer radius than the upper section 134 thereof. With this arrangement, there are four quadrant openings 136 defined between adjacent radially extending walls 124. Tank valve 120 further includes an upper circular disc 138 in parallel, spaced apart relationship above intermediate circular disc 128 and connected in this arrangement by a reduced diameter neck 140, thereby creating an annular recess 142 between discs 128 and 138.

As shown in FIGS. 18 and 19, a gasket ring 144 is mounted around neck 140 within annular recess 142. Gasket ring 144 has an outer diameter greater than the outer diameters of circular discs 128 and 138. In this manner, when tank valve 120 is positioned in annular valve holding boss 116, gasket ring 144 seats on the upper surface of upper wall 110 of bottom closure 104 to provide a seal thereat, thereby preventing escape of water through central opening 114.

In order to provide a water tight sealing action, a coil spring 146 is provided in surrounding relation to tank valve 120 and gasket ring 144, with the upper end of coil spring 146 in contact with the underside of upper wall 110 of bottom closure 104, and the lower end of coil spring 146 in contact with the upper surface of annular base ring 122. This serves to pull gasket ring 144 in tight sealing contact with the upper surface of upper wall 110 of bottom closure 104.

Figure 20:
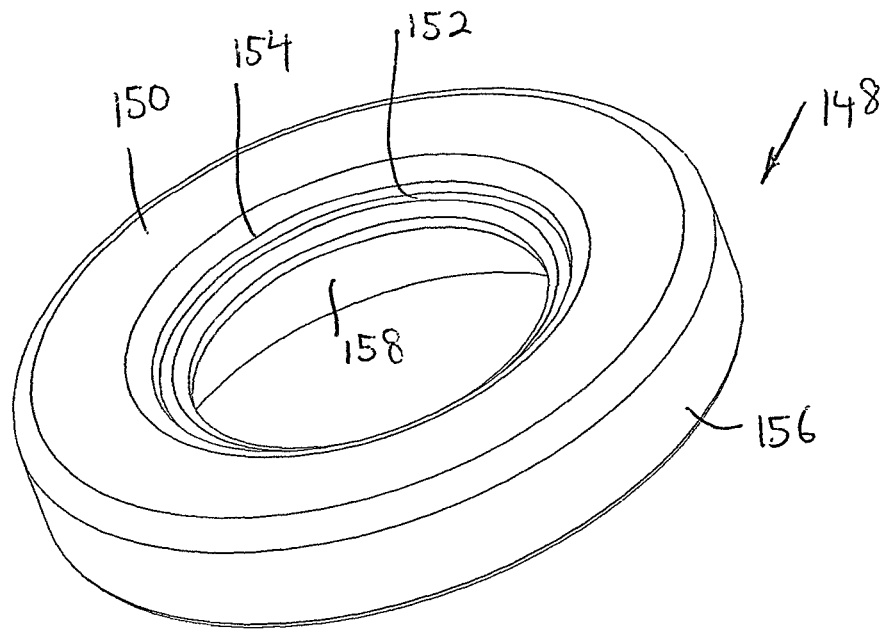
FIG. 20 is a top perspective view of the tank inlet ring.
Figure 21:
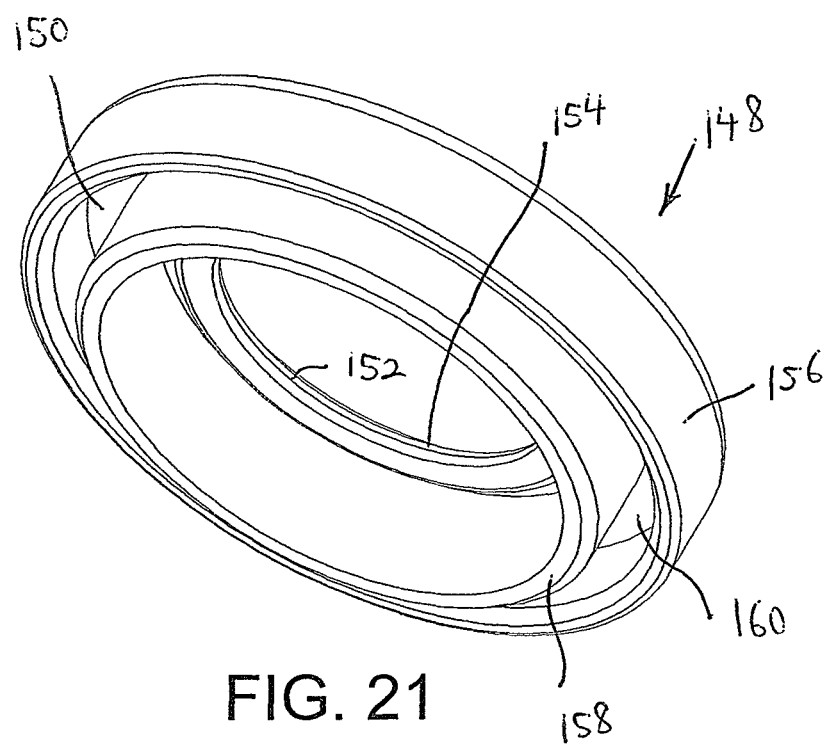
FIG. 21 is a bottom perspective view of the tank inlet ring.

Lastly, as shown in FIGS. 20 and 21, there is a tank inlet ring 148 that seats on the upper end of annular side wall 62 of water tank connector 60. Tank inlet ring 148 includes an upper annular wall 150 with a central opening 152 having a diameter greater than that of coil spring 146 and defined by a beveled annular wall 154. An outer annular side wall 156 is connected to the periphery of upper annular wall 150 and has an inner diameter similar to the outer diameter of annular side wall 62 so as to fit therearound, and an inner annular side wall 158 is connected to the underside of upper annular wall 150 and has an outer diameter similar to the inner diameter of annular side wall 62 to as to fit therein. In other words, an annular recess 160 is formed between annular side walls 156 and 158 to receive the upper end of annular side wall 62.

Water tank enclosure 100 and bottom closure 104, as a unit, can be filled with water when assembled on upper wall 30. Alternatively, water tank enclosure 100 and bottom closure 104, as a unit, can be removed from upper wall 30, filled with water, and then mounted again on upper wall 30. When water tank 100 enclosure and bottom closure 104 are placed on upper wall 30, valve actuating projections 94 of valve actuator 86 hit against the underside of annular base ring 122 of tank valve 120 and move tank valve 120 upwardly against the force of coil spring 146, thereby compressing coil spring 146. As a result, gasket ring 144 is raised up, out of contact the upper surface of upper wall 110 of bottom closure 104. The water in water tank 4 thereby flows through central opening 114 in bottom closure 104, through opening 54 and circular guide wall 56, around tank valve 120 and through quadrant openings 136 of tank valve 120. The water than travels through small openings 92 of valve actuator 86 into annular recess 70 where it can be pumped out through outwardly extending nipple 80.

Figure 22:
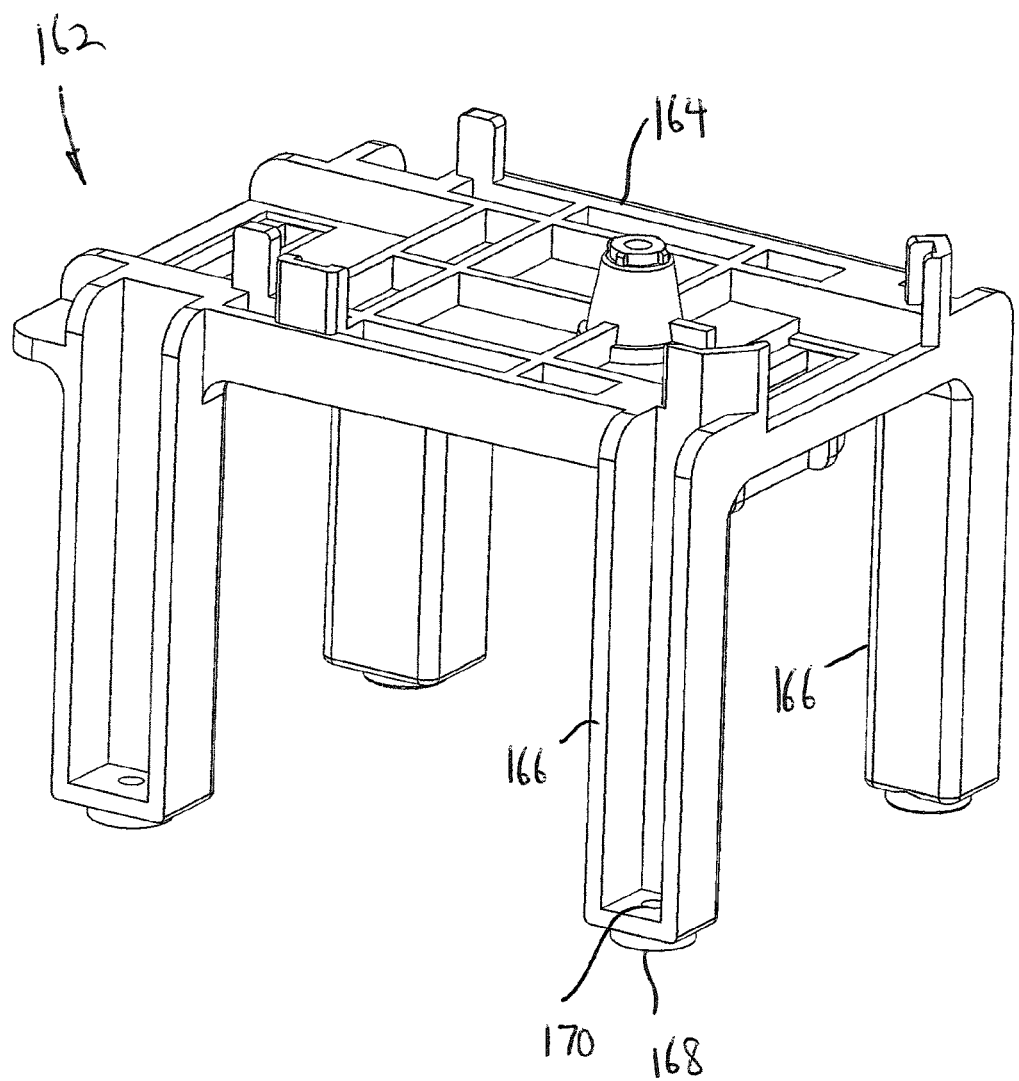
FIG. 22 is a perspective view of the support table.
Figure 23:
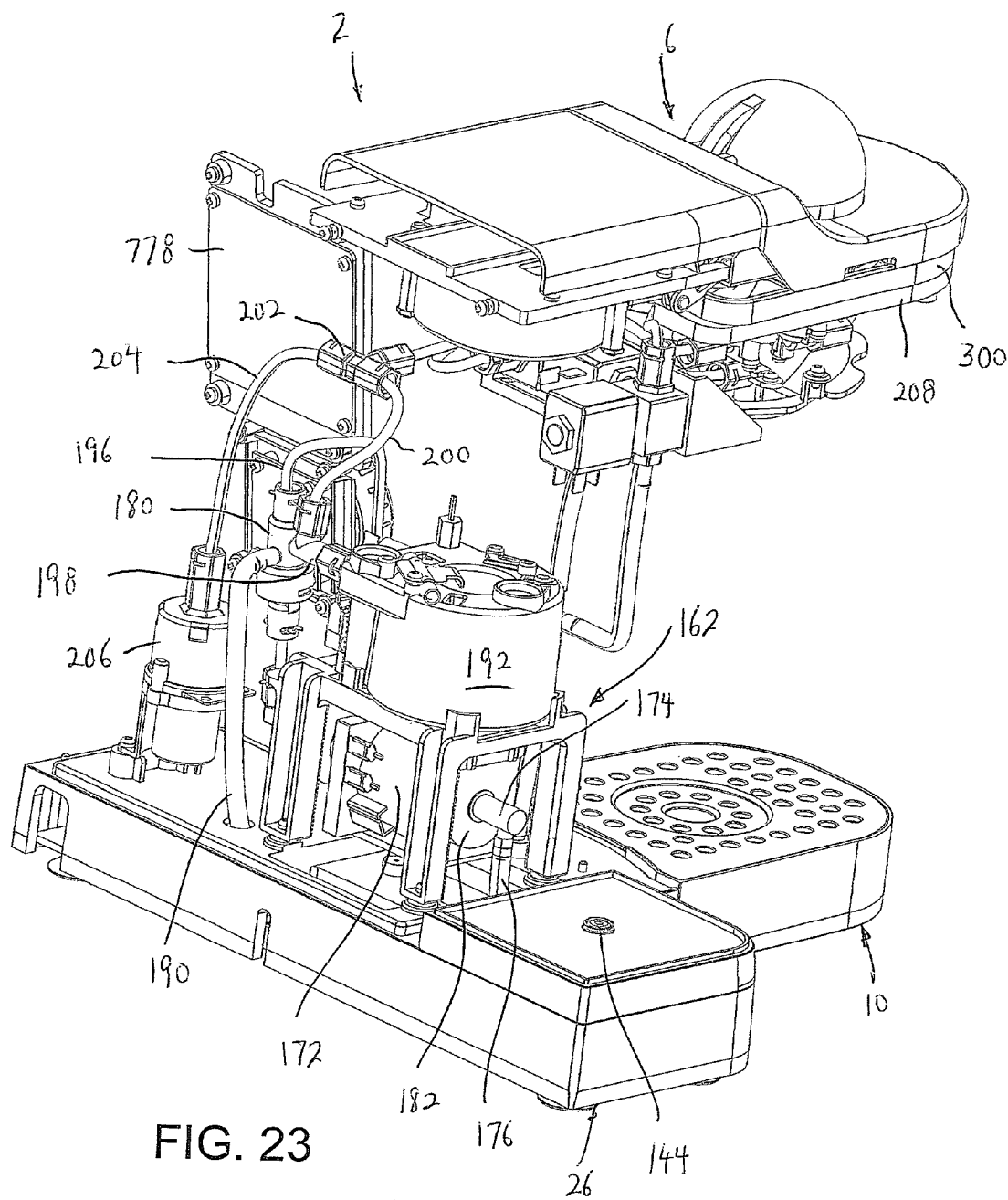
FIG. 23 is a rear perspective view of the brewable beverage making machine with the water tank, rear cover and main casing removed.
Figure 24:
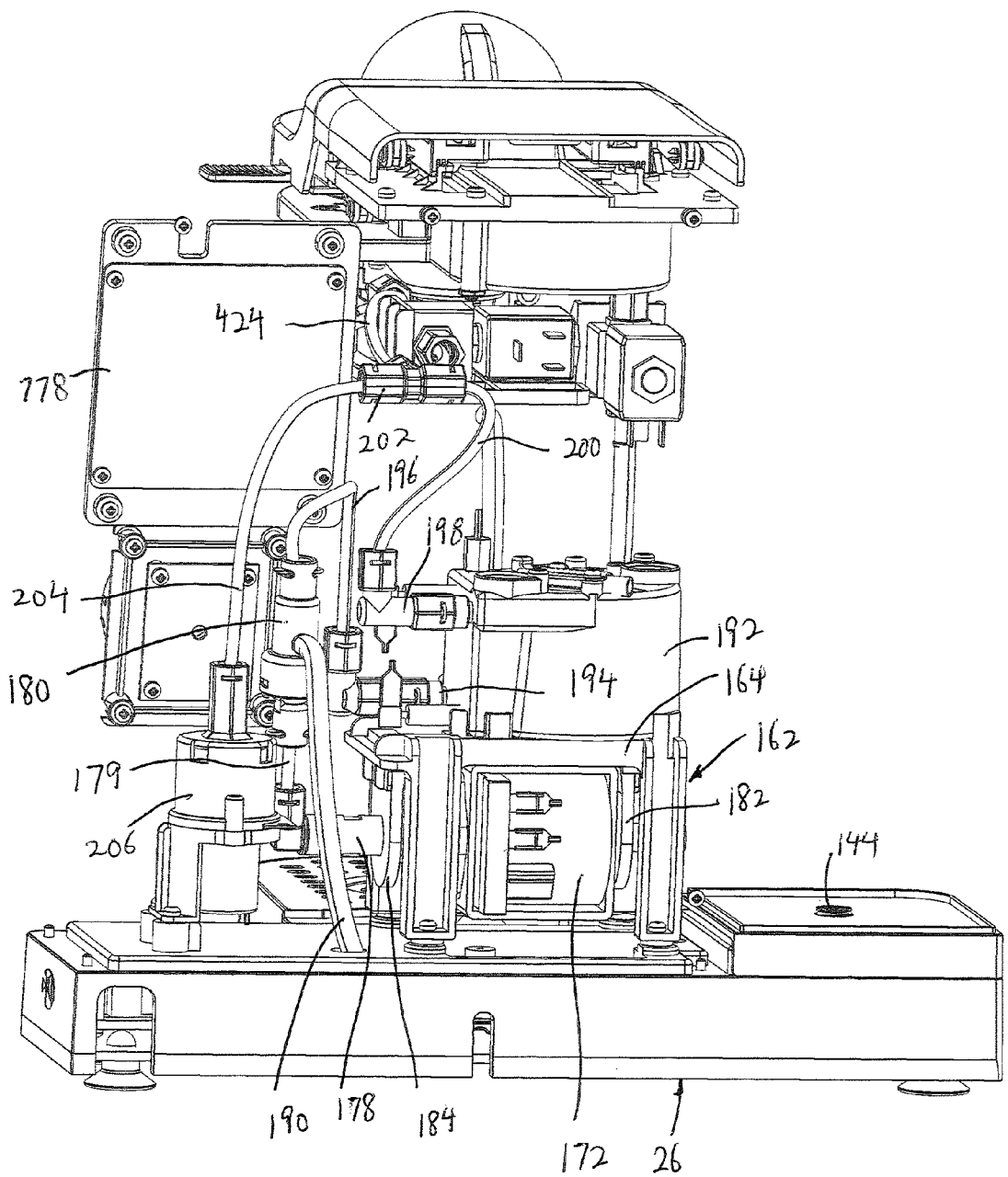
FIG. 24 is a rear perspective view of the brewable beverage making machine with the water tank, rear cover and main casing removed, taken from a different angle.

As shown in FIGS. 22-24, a support table 162 formed by a rectangular table top 164 and four supporting legs 166 at the four corners of the table top 164, is mounted on upper wall 30 of T-shaped hollow wall enclosure 26, and specifically, on four cylindrical raised walls 27 (FIG. 8) on upper wall 30 of central water pump and heater support 34, with each cylindrical raised wall 27 having a central threaded opening 29. Each supporting leg 166 is formed as a hollow leg with which is open at an outer side thereof, and which includes a circular projection 168 at the lower end that seats on a respective cylindrical raised wall 27. An opening 170 is provided each circular projection 168 of supporting legs 166 for insertion of screws (not shown) through openings 170 and threadedly received in central threaded openings 29. Upper wall 30 is removed in an area defined within in central water pump and heater support 34 to define a square recessed area 31 (FIG. 8) therein.

As shown in FIGS. 23 and 24, a water pump 172 is provided to pump the water from annular recess 70 and outwardly extending nipple 80. Water pump 172 includes an inlet pipe 174 that is fluidly connected to outwardly extending nipple 80 by a flexible tube 176, and an outlet pipe 178 that is coupled by tubing 179 to an inlet 181 (FIG. 25) of a one-way valve body 180. A first bracket 182 surrounds and supports inlet pipe 174 and is connected to the underside of table top 164, and a second bracket 184 surrounds and supports outlet pipe 178 and is connected to the underside of table top 164.

Figure 25:
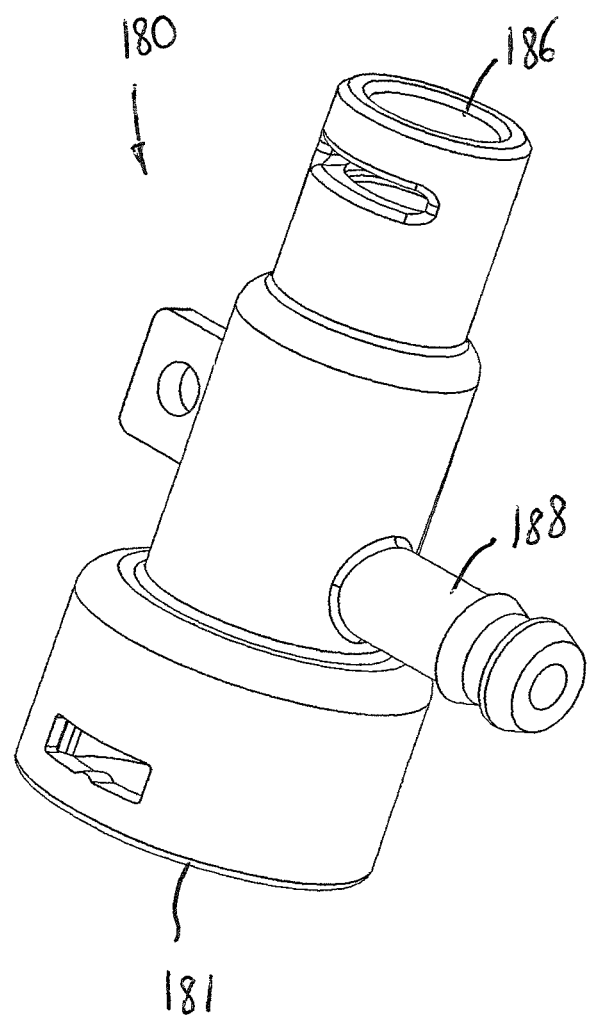
FIG. 25 is a perspective view of the one-way valve body.
Figure 26:
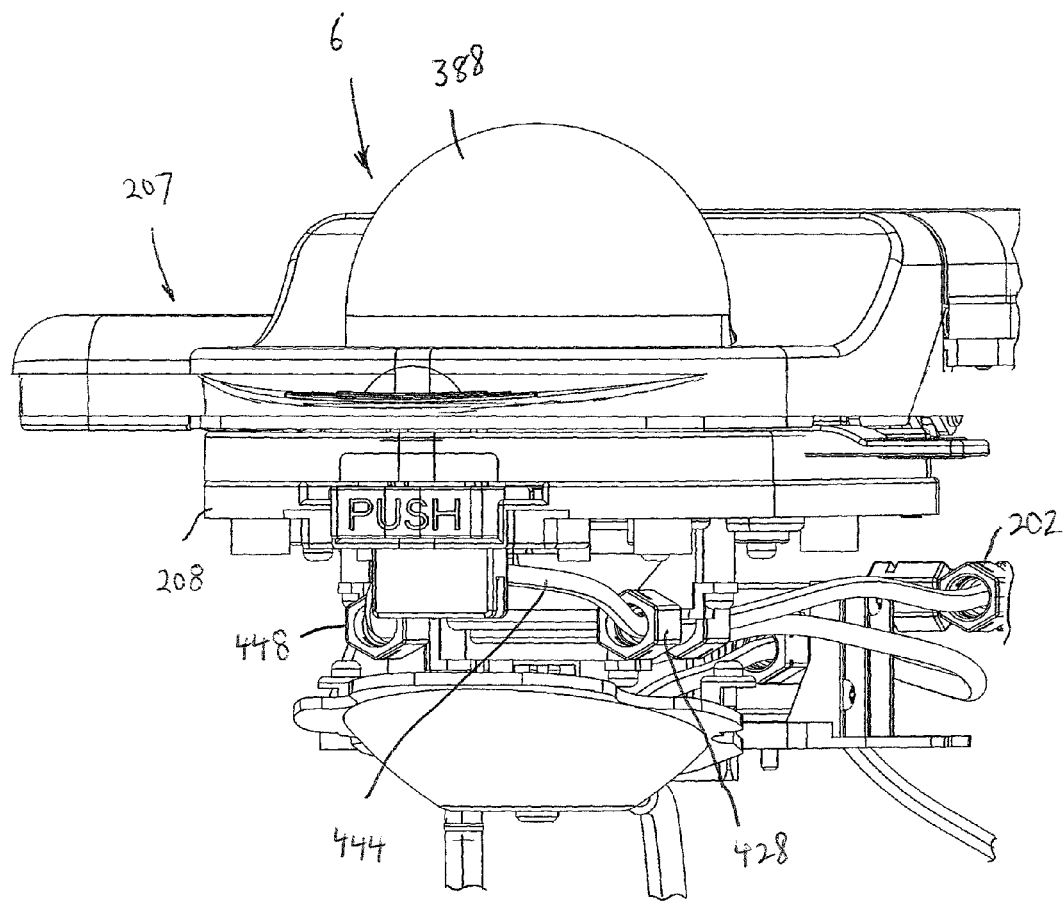
FIG. 26 is an enlarged perspective view of the brewing assembly with the housing cover removed.
Figure 27:
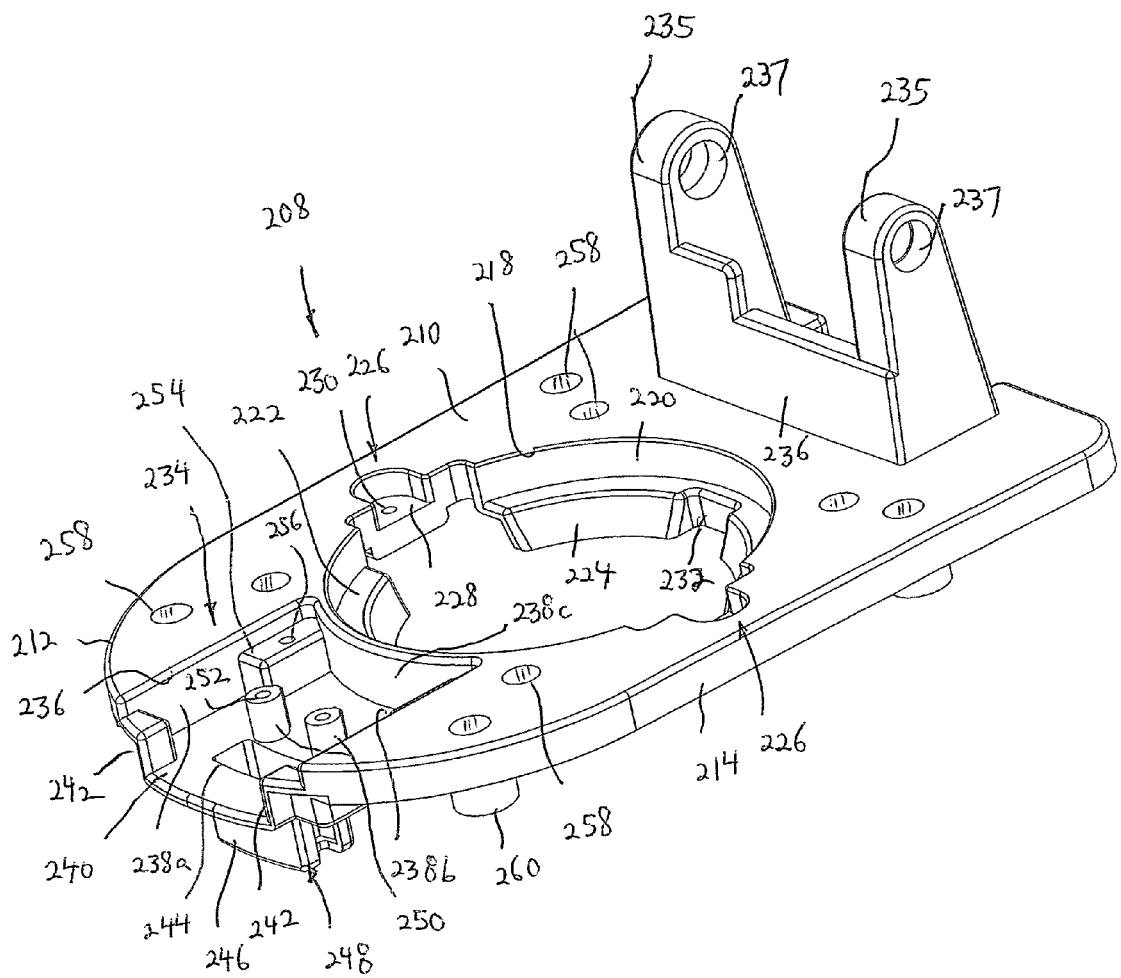
FIG. 27 is a top perspective view of the brewing lower support of the brewing assembly.
Figure 28:
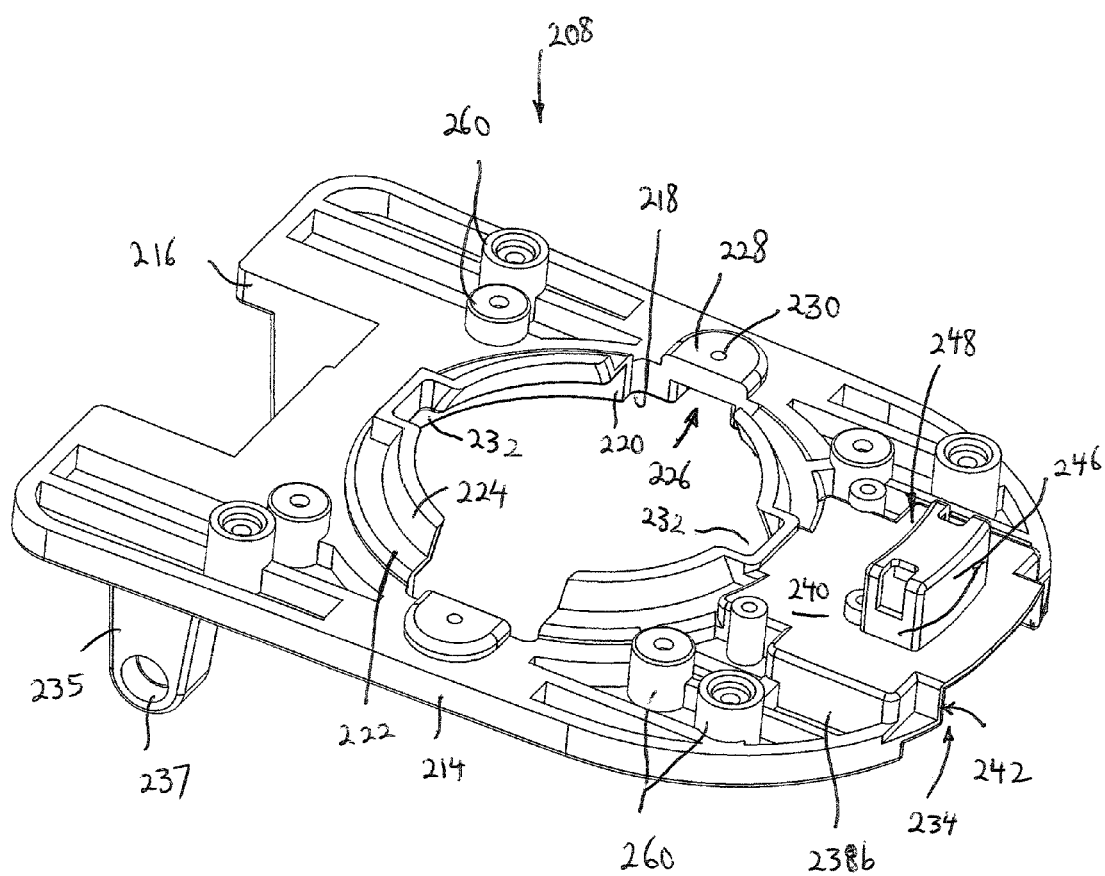
FIG. 28 is a bottom perspective view of the brewing lower support.
Figure 29:
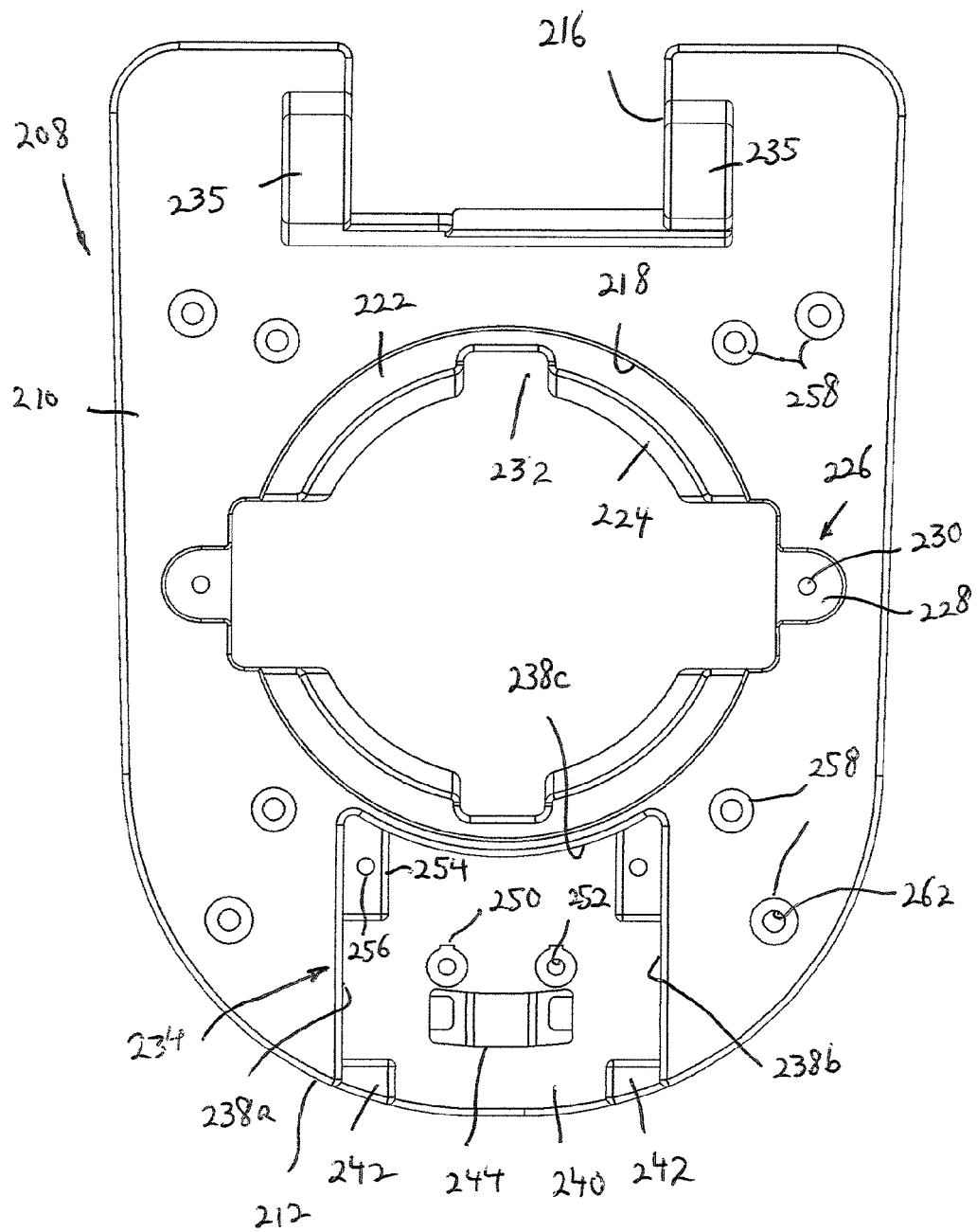
FIG. 29 is a top plan view of the brewing lower support.
Figure 30:
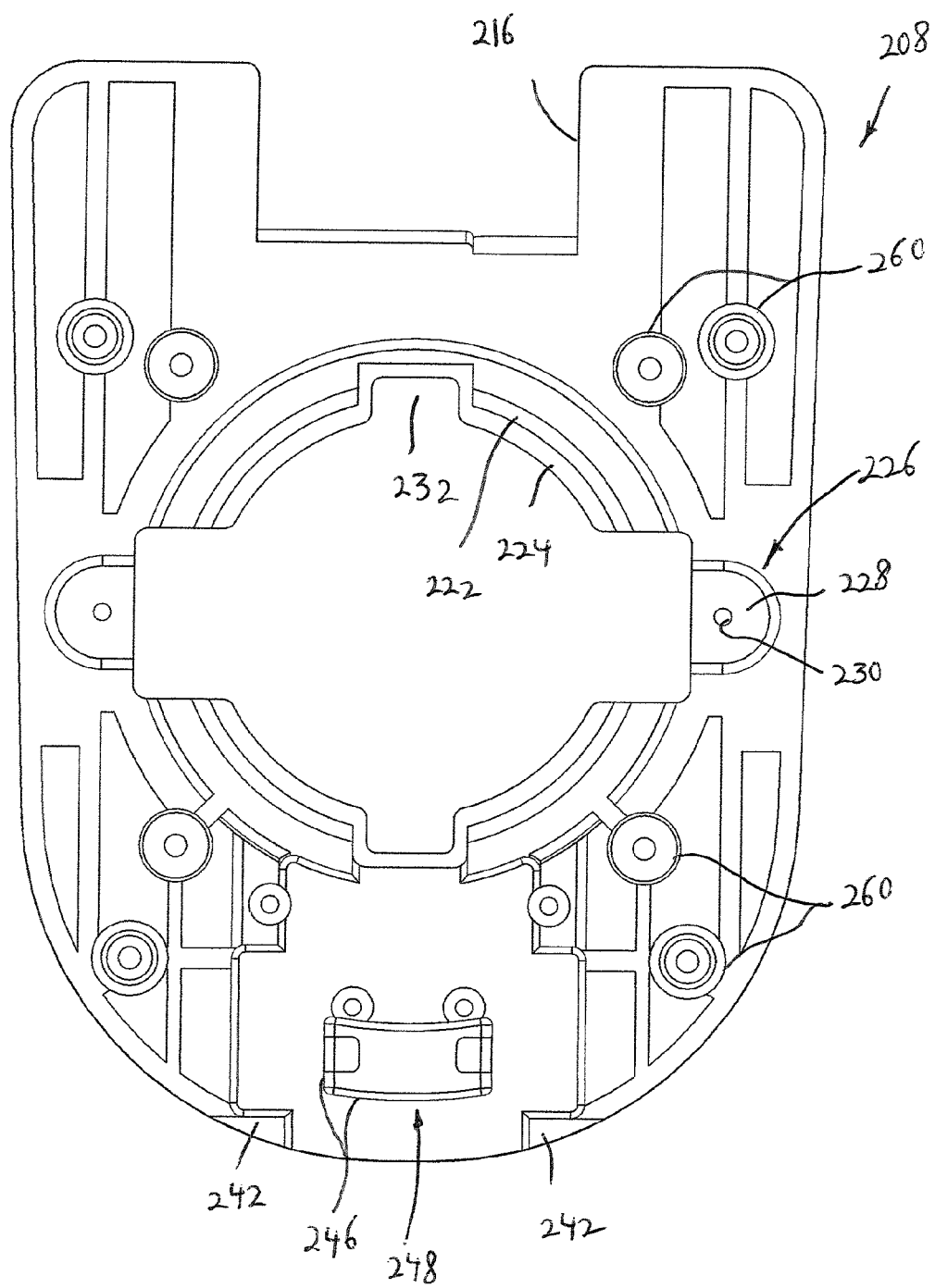
FIG. 30 is a bottom plan view of the brewing lower support.

As shown best in FIG. 25, one-way valve body 180 further includes an outlet 186 and a bypass nipple 188 that is in fluid communication with the interior of one-way valve body 180 through a small hole (not shown) so that a small percentage of the water pumped by water pump 172 through one-way valve 180 is returned to annular recess 70 via a flexible tube 190 connected between bypass nipple 188 and outwardly extending nipple 78 of water tank connector 60. As a result of the latter arrangement, there is provided a closed circuit so as to ensure that the pump is always running water through the pump and not just air, even when the water tank is empty.

As shown best in FIGS. 23 and 24, a water heater 192 is mounted on the upper surface of table top 164 of support table 162 and includes an inlet 194 connected by a flexible tube 196 to the outlet 186 of one-way valve body 180, and an outlet 198 connected to a flexible tube 200. Water heater 192 is preferably a conventional heat exchanger with a heating coil (not shown) therein which rapidly heats the water passing therethrough to a desired temperature. Control of the temperature of the water passing through water heater 192 is controlled by a microprocessor 702 (FIG. 89) by controlling the current through the heating coil and/or the times during which the heating coil remains on, as is well known.

As shown in FIGS. 23 and 24, the heated water from water heater 192 is passed out through tube 200 to one input of a T-connector 202. The other input of T-connector 202 is connected via a flexible tube 204 with an output of an air pump 206, the purpose for which will be explained in greater detail hereafter. Air pump 206 is mounted on upper wall 30 of end air pump support 36 of T-shaped hollow wall enclosure 26.

Referring now to FIGS. 26-33, and initially to FIGS. 26-30, brewing assembly 6 includes a brewing support assembly 207, which, starting from a lower end thereof, includes a brewing lower support 208 having a generally rectangular upper wall 210 with a rounded front end 212, and a downwardly extending short side wall 214 around the peripheral edge thereof. Upper wall 210 and side wall 214 are cut-away at the rear thereof by a rectangular cut-out section 216. A circular opening 218 is provided substantially centrally in upper wall 210. A vertical, downwardly extending guide wall 220 extends down from upper wall 210 at the periphery of circular opening 218, terminating at its lower end in an inwardly extending circular ledge 222, which in turn, terminates at its lower end at a downwardly extending guide wall 224 extending inwardly at a slight angle from the vertical.

Drop down, diametrically opposite recessed sections 226 are formed at the periphery of central opening, and each includes a lower recessed wall 228 having a threaded opening 230 therein. Two diametrically opposite guide openings 232 are provided in guide wall 224 at right angles to recessed sections 226.

Two spaced apart ears 235 extend upwardly from upper wall 210 immediately on opposite sides of rectangular cut-out section 216 at the rear of upper wall 210, with a connecting plate wall 236 connecting front edges of ears 235 immediately in front of rectangular cut-out section 216. Ears 235 include axially aligned openings 237 at their upper ends.

In order to accommodate a locking mechanism (to be described hereafter), a larger generally rectangular recessed section 234 is provided in upper wall 210, and is defined by a generally rectangular cut-away section 236 at the front of upper wall 210, with three side walls 238*a*, 238*b* and 238*c* extending down from upper wall 210 at the periphery of three edges of generally rectangular cut-away section 236, with the front edge of generally rectangular cut-away section 236 being maintained open, and a bottom wall 240 connecting lower edges of side walls 238. Two retaining walls 242 extend inwardly by a small amount from front ends of opposite side walls 238*a* and 238*b* so as to partially obstruct the open front end of generally rectangular cut-away section 236.

Bottom wall 240 is provided with an elongated opening 244 centrally thereof and spaced slightly to the rear of retaining walls 242, with walls 246 extending downwardly from bottom wall 240 along the periphery of and in surrounding relation to elongated opening 244 to define a guide pocket 248. Two cylindrical bosses 250 extend upwardly from the upper surface of bottom wall 240 immediately behind and at opposite ends of elongated opening 244, each with a threaded upper opening 252. Two corner ledges 254 extend upwardly at the rear corners of bottom wall 240, each with a threaded upper opening 256.

Lastly, there are eight openings 258 provided in upper wall 210, and a cylindrical bore 260 extends down from the underside of upper wall 210 in association with each opening 258, each cylindrical boss 260 including a stepped through opening 262 in open communication with the respective opening 258.

Figure 31:
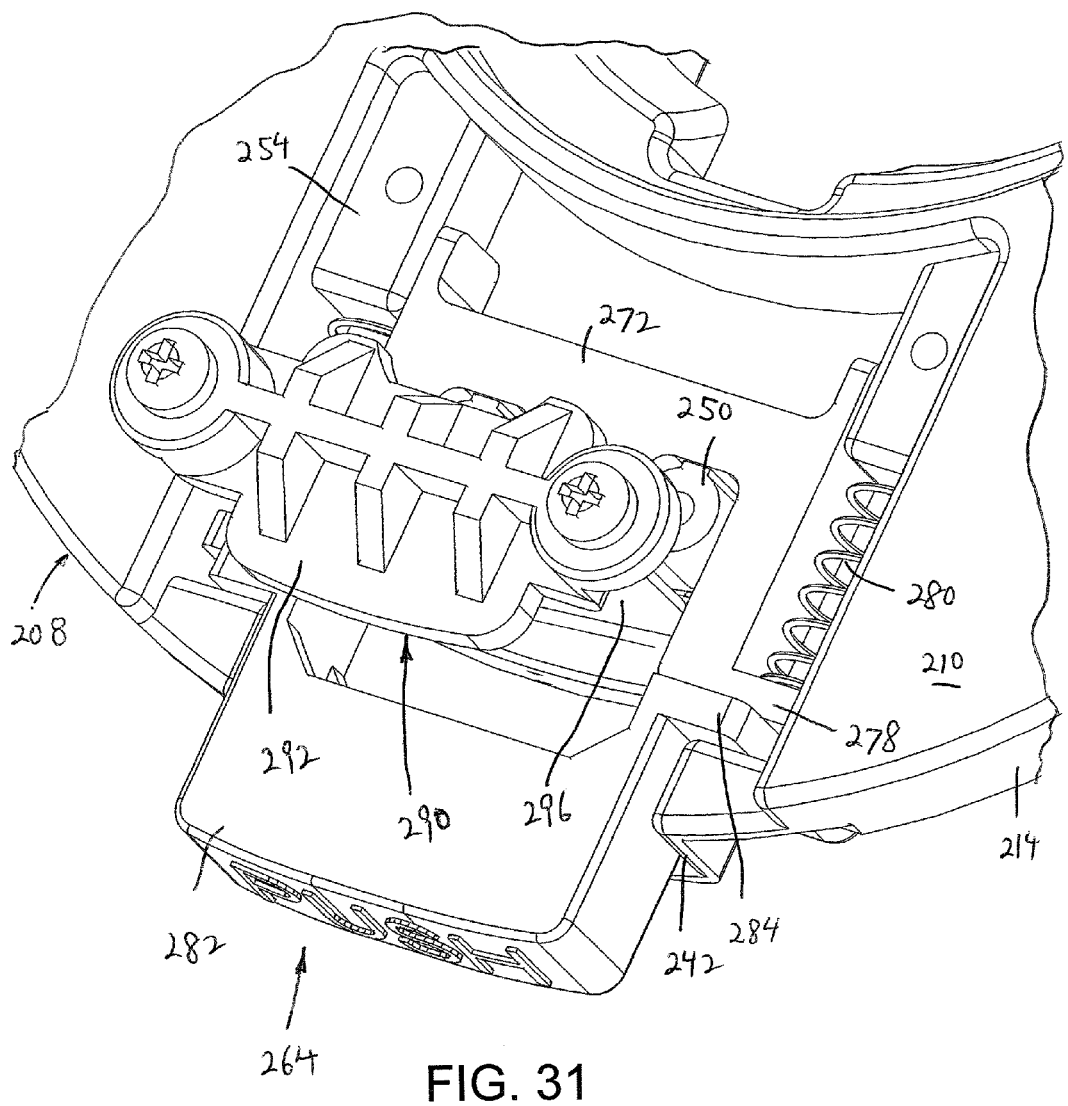
FIG. 31 is a perspective view of the locking assembly with the brewing lower support.
Figure 32:
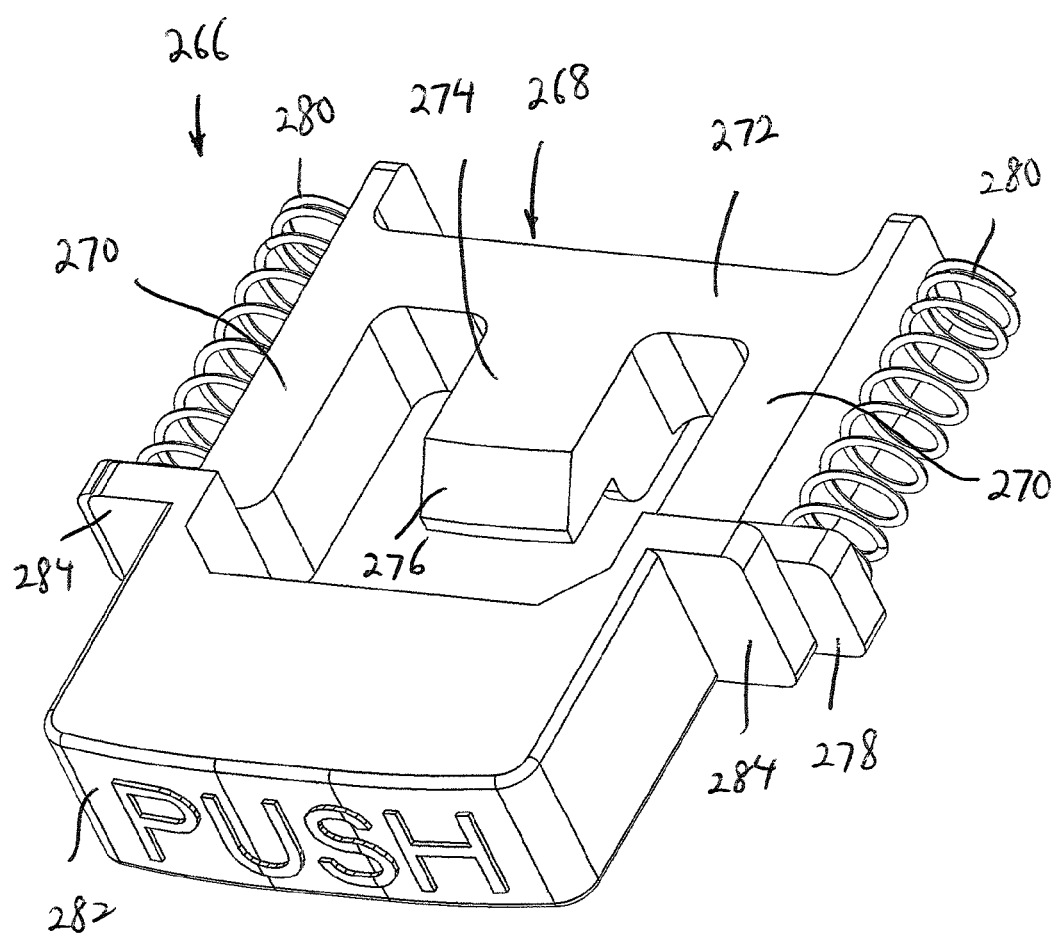
FIG. 32 is a top perspective view of the push button assembly of the locking assembly.
Figure 33:
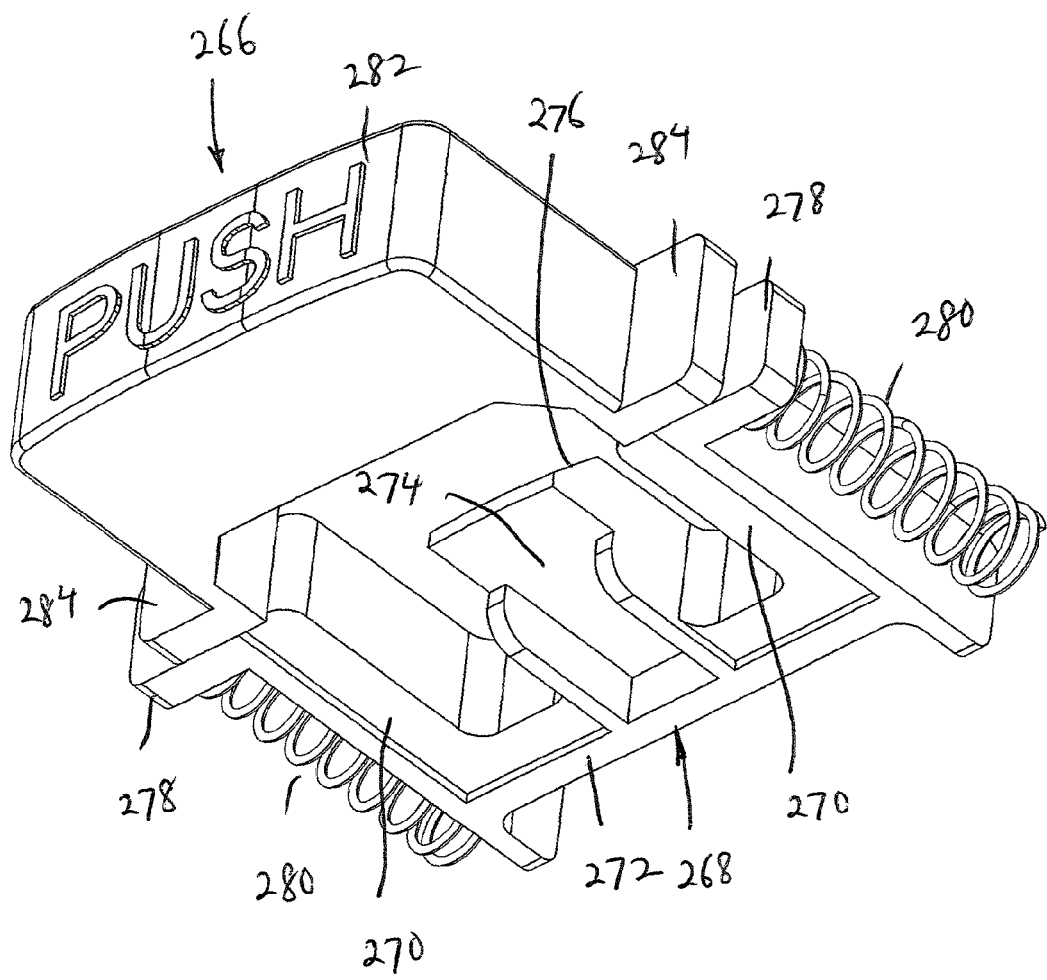
FIG. 33 is a bottom perspective view of the push button assembly of the locking assembly.

As shown in FIGS. 31-33, brewing support assembly 207 includes a locking assembly 264 for retaining brewing assembly 6 in a closed position during the brewing operation. In this regard, locking assembly 264 includes a push button assembly 266 that includes a lock plate 268 formed essentially in the configuration of the letter "E", with upper and lower parallel legs 270 connected together at one end thereof by a connecting leg 272 and a central bisecting locking leg 274 having an upper beveled surface 276 at the free end thereof. Spring abutment legs 278 extend transversely and outwardly from the free ends of legs 270. As shown in FIG. 31, parallel legs 270 fit and slide between corner ledges 254 of brewing lower support 208. Coil springs 280 are positioned between the front faces of corner ledges 254 and spring abutment legs 278 to normally bias lock plate 268 in a direction away from corner ledges 254 to a locking position.

A push button 282 is formed as a generally rectangular button with retaining walls 284 outwardly extending from opposite sides of the rear end thereof. Push button 282 is positioned in the front open end of rectangular recessed section 234 with retaining walls 284 sandwiched between retaining walls 242 of brewing lower support 208 and the opposite side of spring abutment legs 278. In the locking position, coil springs 280 bias spring abutment legs 278 into engagement with retaining walls 284 to cause retaining walls 284 to be in contact with retaining walls 242 of brewing lower support 208. In this position, the front portion of push button 282 extends out of brewing lower support 208, as shown best in FIG. 1

Figure 34:
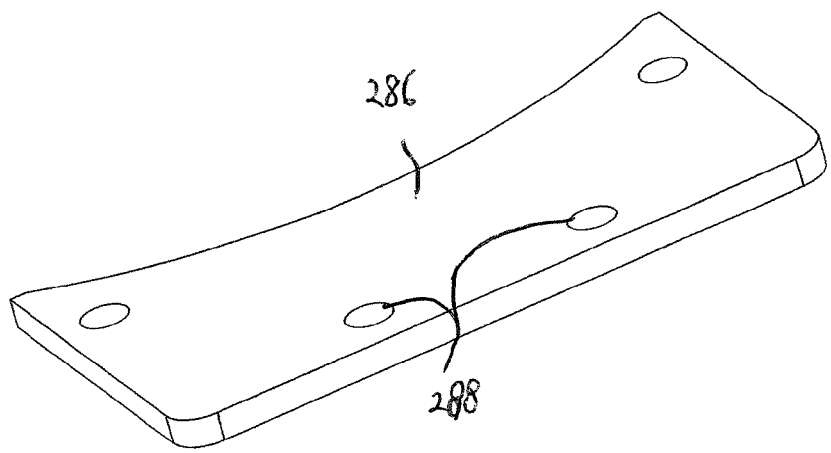
FIG. 34 is a perspective view of the lock cover plate of the locking assembly.
Figure 35:
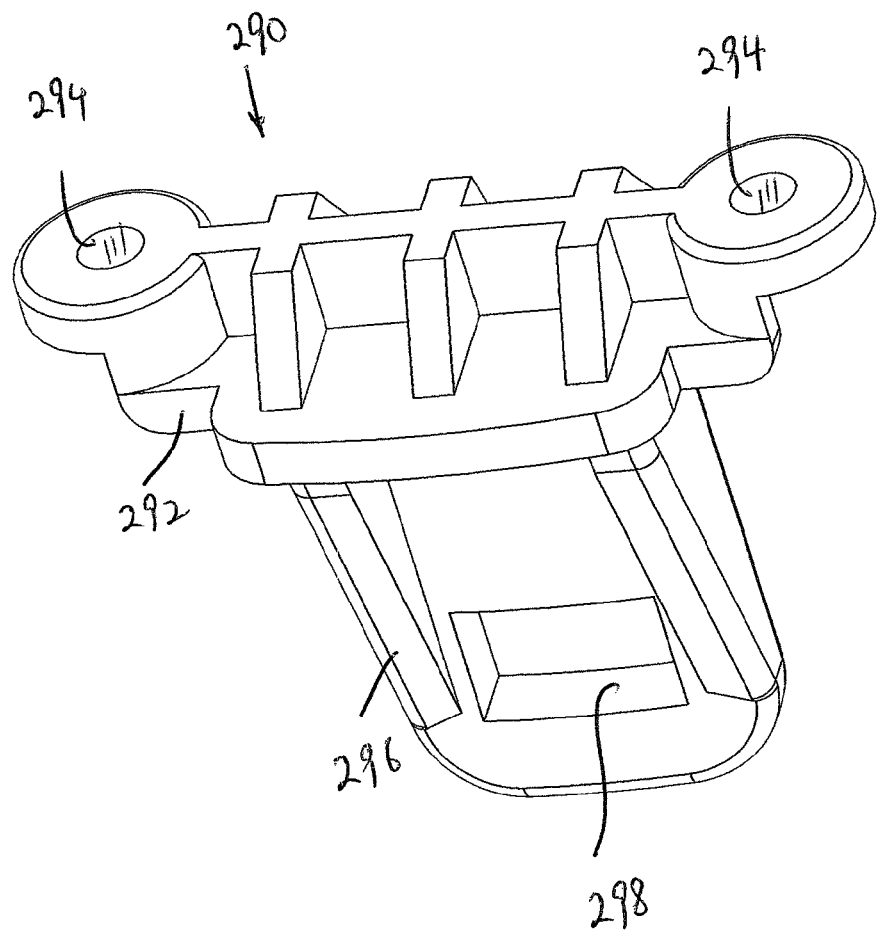
FIG. 35 is a front perspective view of the hook support of the locking assembly.
Figure 36:
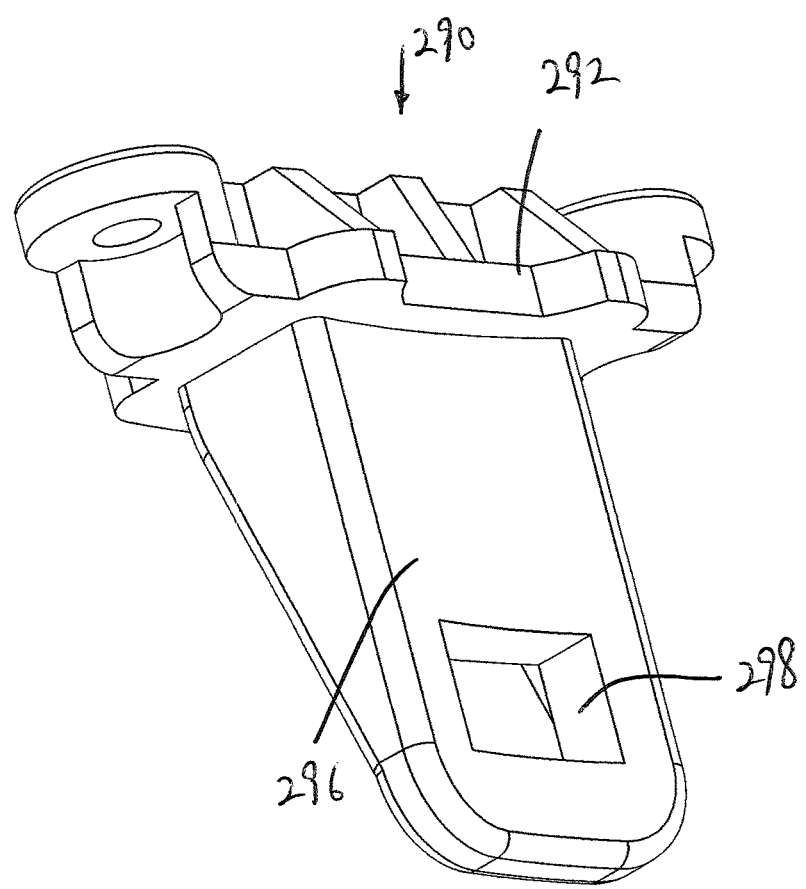
FIG. 36 is a rear perspective view of the hook support of the locking assembly.

To prevent escape of these components, a lock cover plate 286 (FIG. 34) is seated on top of lock plate 268, and includes four openings 288 aligned with threaded openings 252 and 256 of brewing lower support 208 for insertion of screws (not shown) therein to retain lock plate 268 in position, thereby limiting movement of lock plate 268 to a sliding movement.

As shown in FIGS. 31, 35, 36 and 84, locking assembly 264 further includes a hook support 290 that is fixed to an upper pivoting assembly to be described hereafter. Hook support 290 includes an upper connection plate 292 having two openings 294 at opposite ends for securing hook support 290 to the upper pivoting assembly, a lock plate 296 extends downwardly from the underside of upper connection plate 292 and includes a rectangular locking opening 298 at the lower end thereof. Lock plate 296 is slidably positioned in guide pocket 248 of brewing lower support 208 when brewing assembly 6 is closed during a brewing operation.

When the upper pivoting assembly (to be described later) is closed to start a brewing operation, the lower edge of lock plate 296 hits against upper beveled surface 276 of lock plate 268, forcing lock plate 268 to slide rearwardly against the force of coil springs 280. When lock plate 296 slides within guide pocket 248, central bisecting locking leg 274 is in alignment with locking opening 298, whereupon coil springs 280 force locking plate 268 to slide forwardly, with central bisecting locking leg 274 being positioned in locking opening 298, to prevent escape of hook support 290, whereby brewing assembly 6 is in a locked position.

At the completion of a brewing operation, push button 282 is depressed rearwardly, forcing lock plate 268 to slide rearwardly against the force of coil springs 280, thereby removing central bisecting locking leg 274 from locking opening 298, and thereby permitting escape of hook support 290 and opening of the upper pivoting assembly, whereby brewing assembly 6 is no longer in a locked position.

Figure 37:
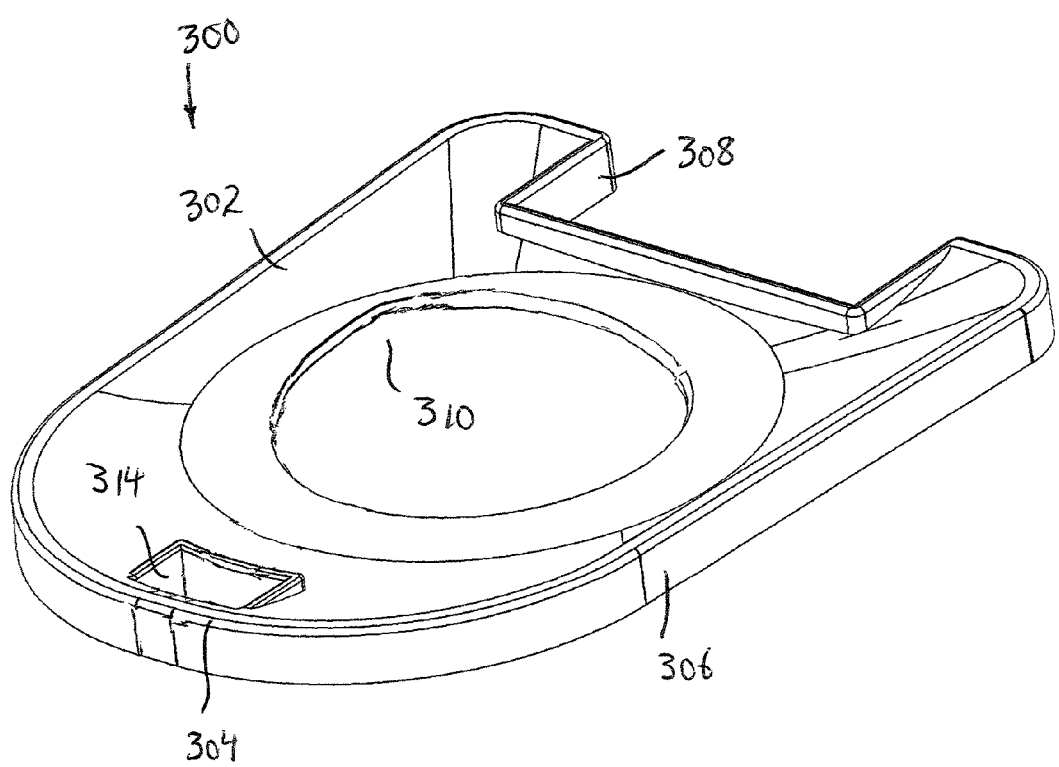
FIG. 37 is a top perspective view of the lower cover of the brewing assembly.
Figure 38:
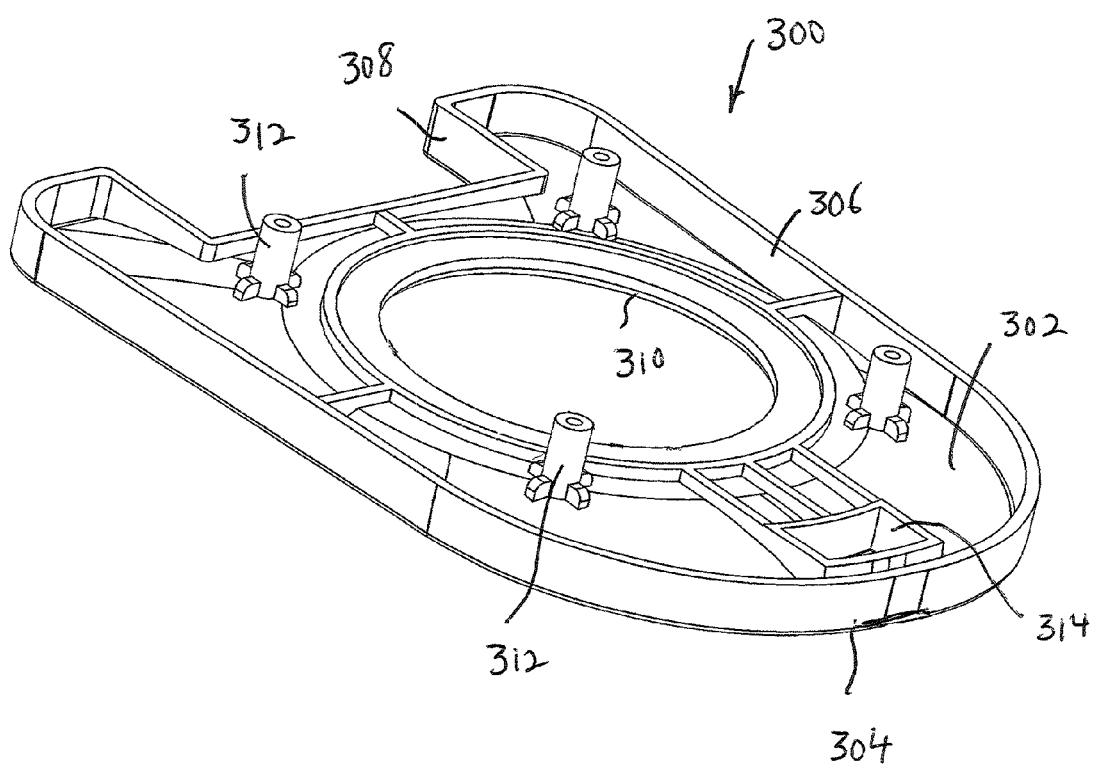
FIG. 38 is a bottom perspective view of the lower cover of the brewing assembly.
Figure 39:
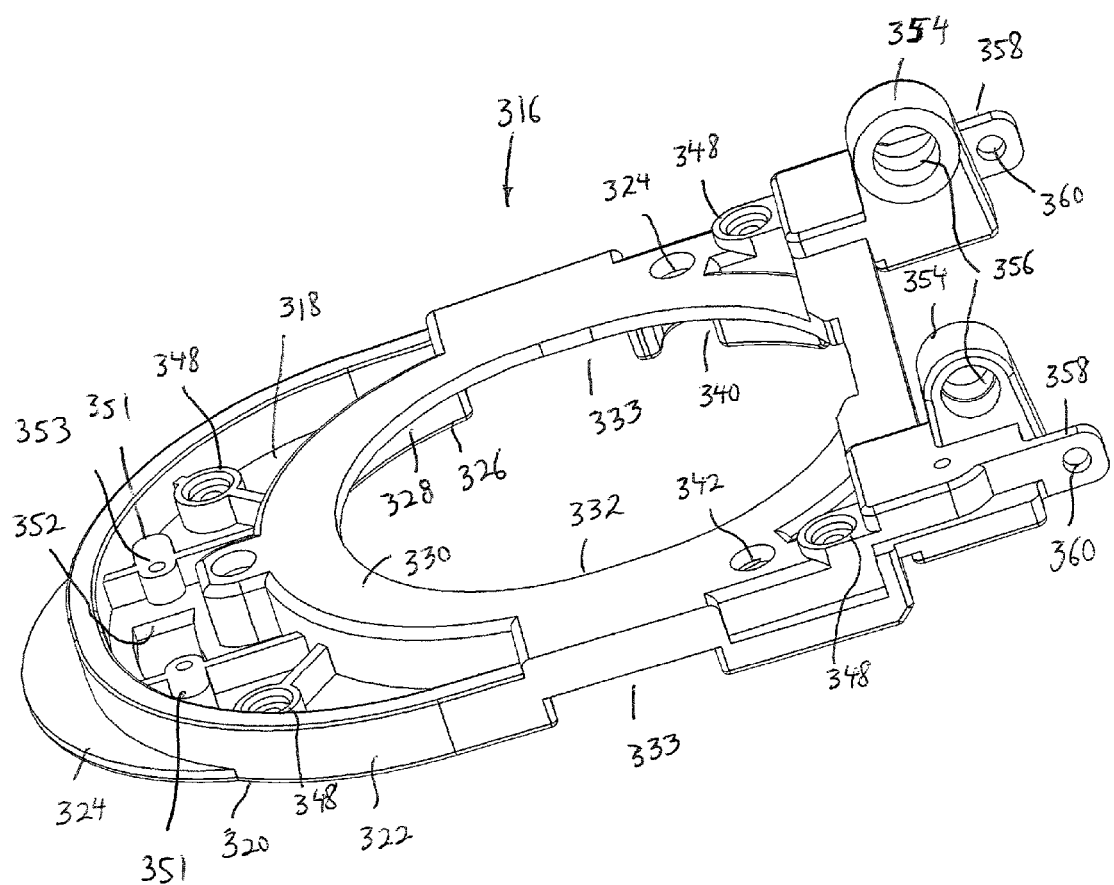
FIG. 39 is a top perspective view of the brewing upper support of the brewing assembly.
Figure 40:
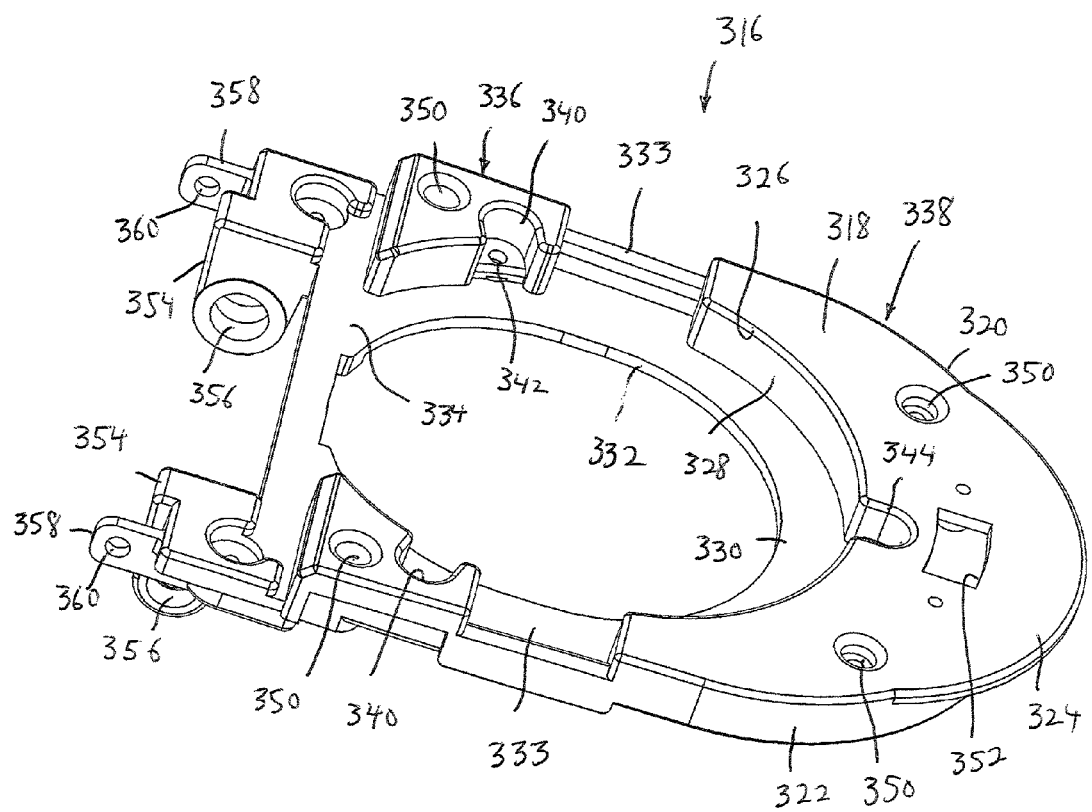
FIG. 40 is a bottom perspective view of the brewing upper support.
Figure 41:
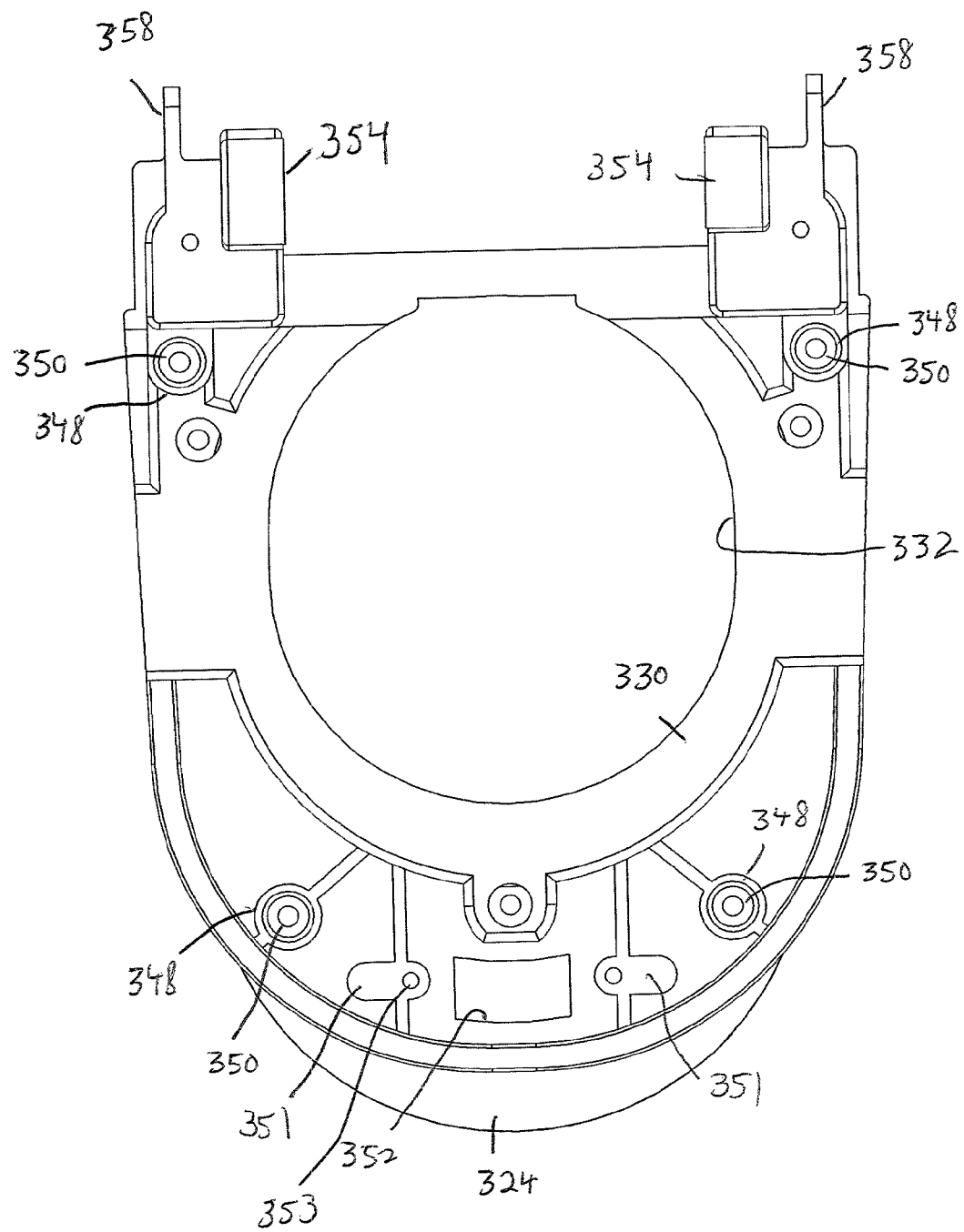
FIG. 41 is a top plan view of the brewing upper support.
Figure 42:
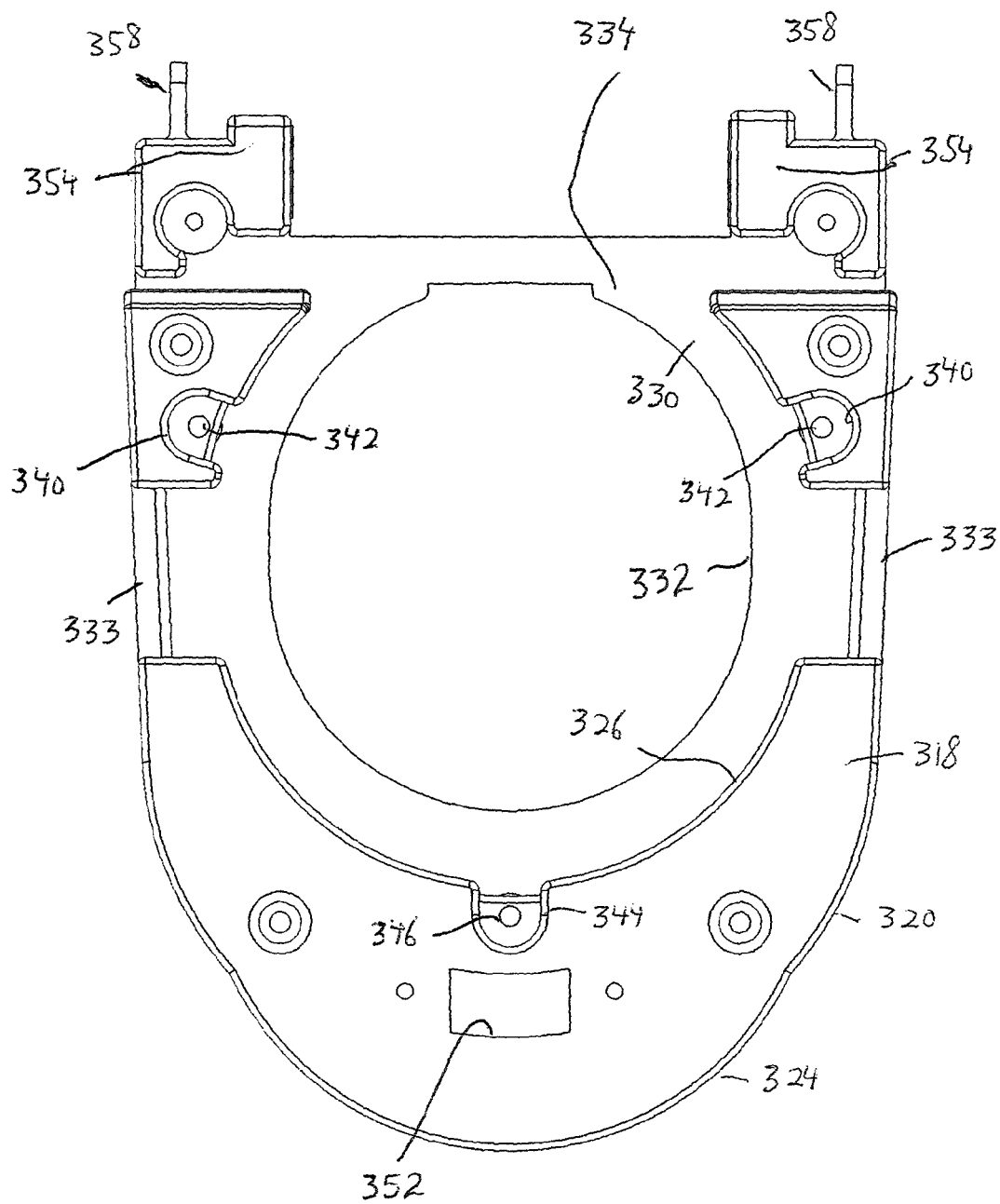
FIG. 42 is a bottom plan view of the brewing upper support.
Figure 90:
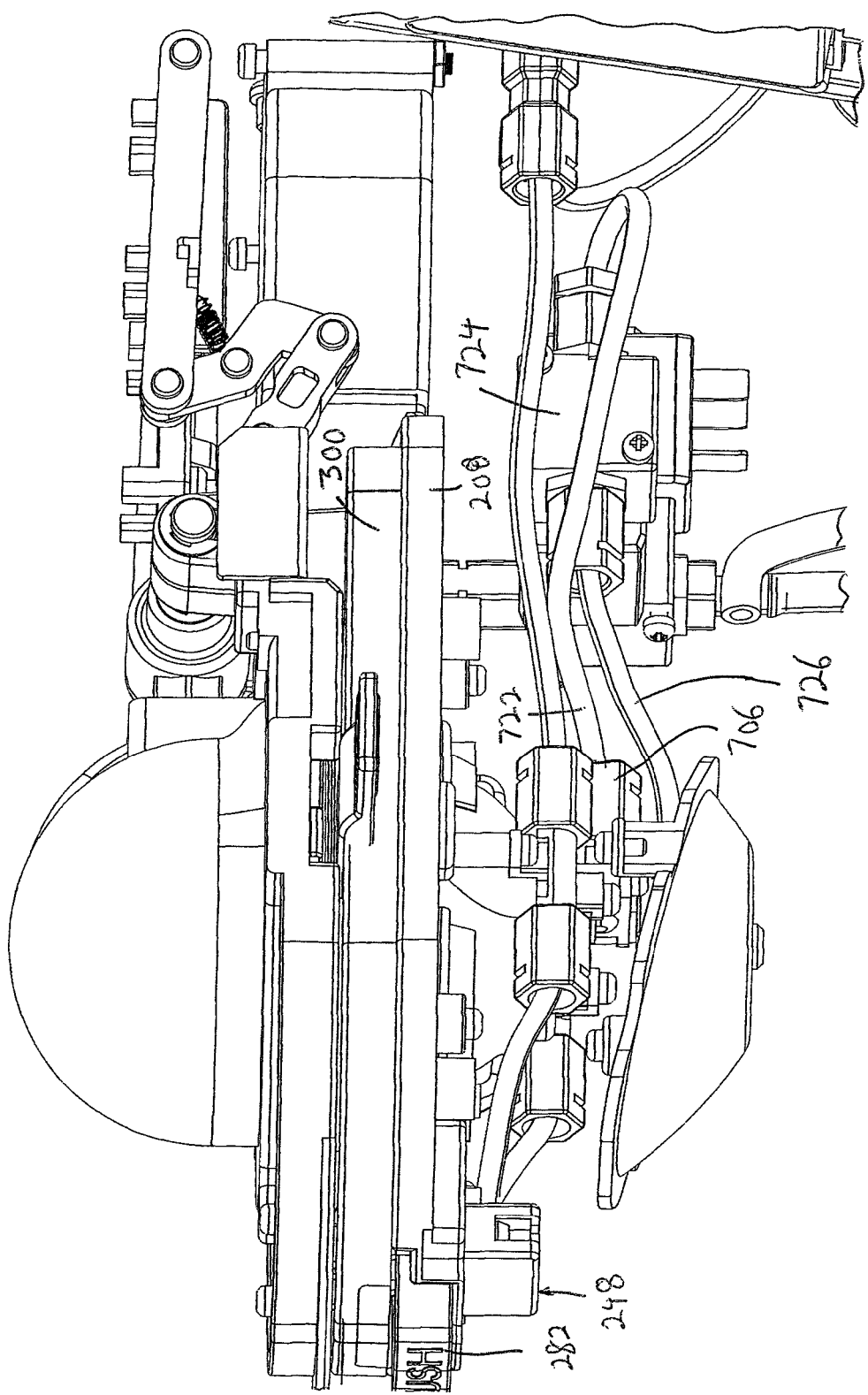
FIG. 90 is an enlarged perspective view of a portion of the machine showing the parts for delivering the brewed beverage.
Figure 94:
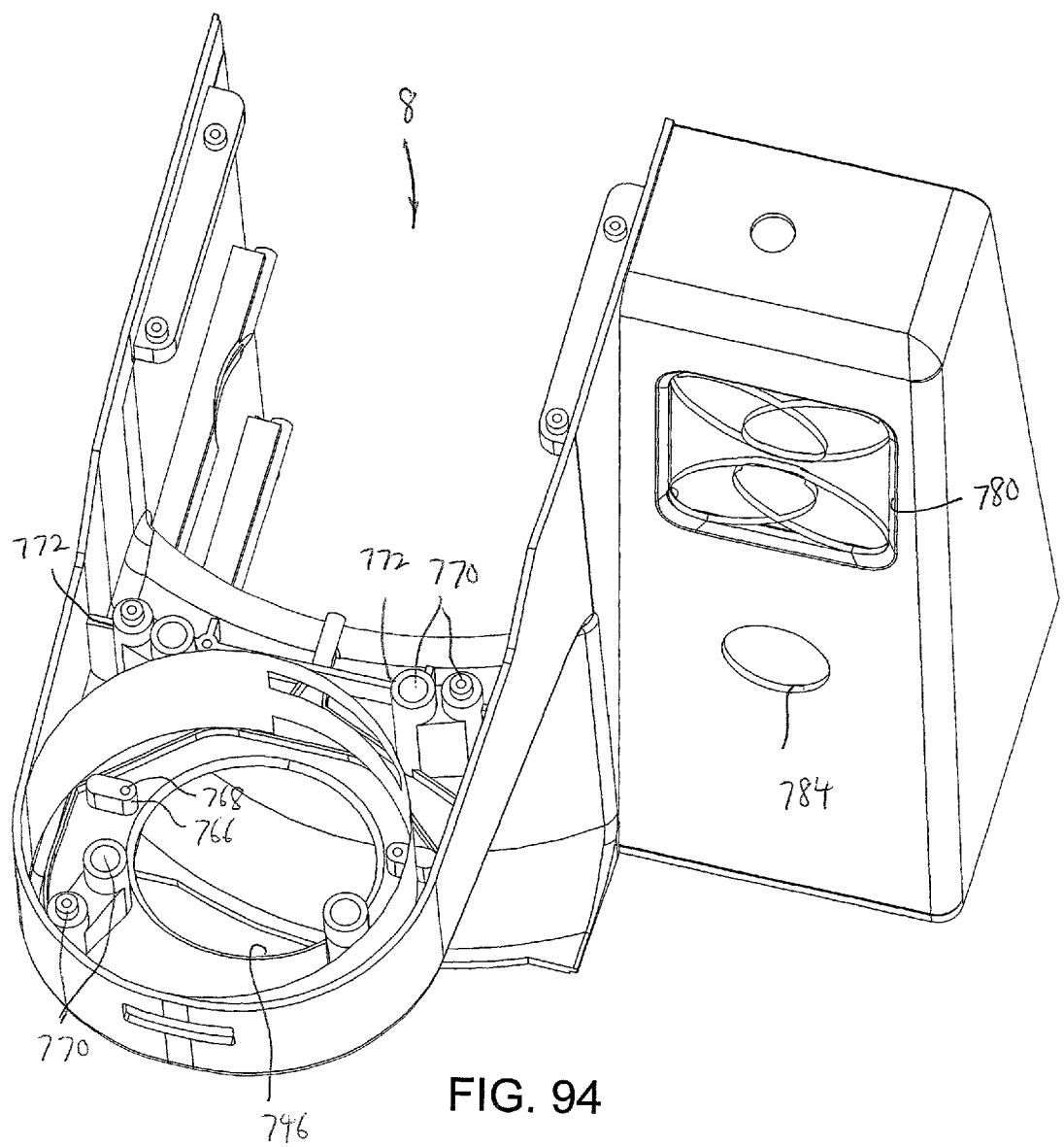
FIG. 94 is a top perspective view of the housing.
Figure 95:
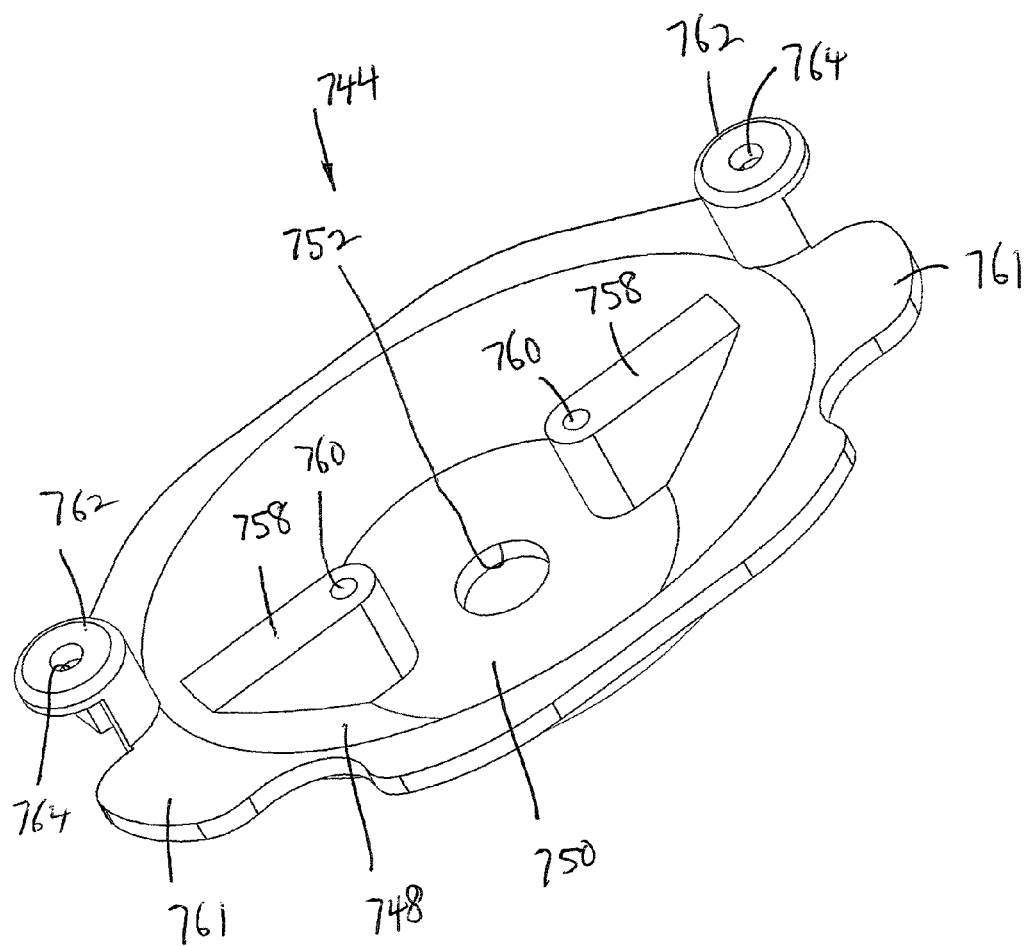
FIG. 95 is a top perspective view of the outlet cover.
Figure 96:
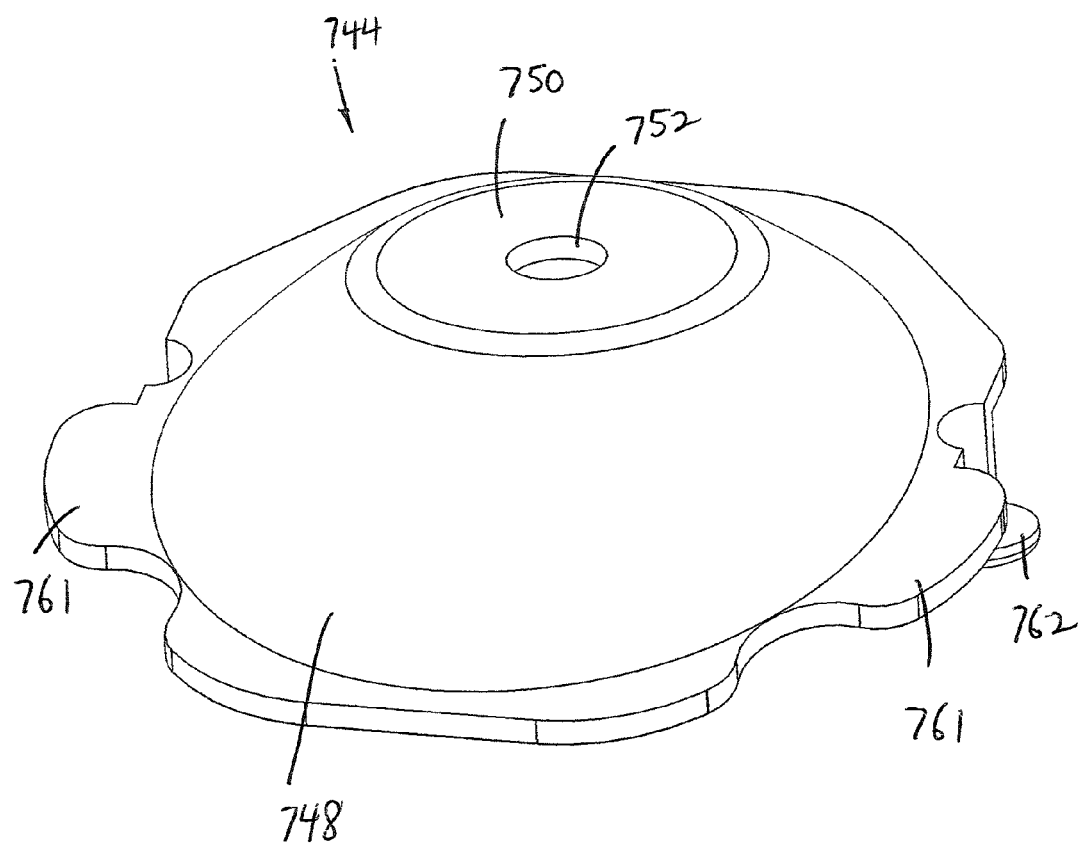
FIG. 96 is a bottom perspective view of the outlet cover.

Brewing support assembly 207 further includes a lower cover 300 that is secured on top of brewing lower support 208, as shown in FIGS. 23 and 90. Lower cover 300, as shown in FIGS. 37 and 38, has the same general shape as upper wall 210 of brewing lower support 208, and specifically, includes a generally rectangular upper wall 302 with a rounded front end 304, and a downwardly extending short side wall 306 around the peripheral edge thereof. Upper wall 302 and side wall 304 are cut-away at the rear thereof by a rectangular cut-out section 308 which is wider than rectangular cut-out section 216 of brewing lower support 208, so as to fit around ears 235. A circular opening 310 is provided substantially centrally in upper wall 302. Four bosses 312 extend downwardly from the underside of upper wall 210 in surrounding relation to circular opening 310, and are in alignment with four of the openings 258 in upper wall 210 of brewing lower support 208. Screws (not shown) extend through openings in bosses 312 and openings 258, and are received in threaded openings 770 in bosses 772 (FIG. 94) mounted on the upper surface at the front of housing 8, so as to fix lower cover 300 and brewing lower support 208 to housing 8. In addition, lower cover 300 includes an elongated opening 314 in alignment with elongated opening 244 in brewing lower support 208 to allow sliding movement of lock plate 296 of hook support 290 during opening and closing of brewing assembly 6.

Referring now to FIGS. 39-42, brewing support assembly 207 includes a brewing upper support 316 having a generally rectangular lower wall 318 with a rounded front end 320, and an upwardly extending short side wall 322 around the peripheral edge thereof. A rounded grasping handle 324 is formed at the rounded front end of lower wall 318 so that a user can grasp the same to open and close brewing support assembly 207. A circular opening 326 is provided substantially centrally in lower wall 318. A vertical, upwardly extending wall 328 extends up from lower wall 318 at the periphery of circular opening 326, terminating at its upper end in an inwardly extending upper annular ledge 330 which defines a circular opening 332.

Lower wall 318 and upwardly extending wall 328 are broken away at transverse, diametrically opposite positions to create two transverse opening sections 333, and at a rear portion thereof to create a rear opening section.334, thereby defining two rear island sections 336 and an arcuate front section 338. Each rear island section 336 includes a recessed section 340 extending through circular ledge 330 and having a small opening 342. In like manner, a recessed section 344 is provided centrally at the rear of lower wall 318 of front section 338 and includes a small opening 346 extending through annular ledge 330 thereat.

Brewing upper support 316 further includes four bosses 348 extending up from lower wall 318 in surrounding relation to vertical, upwardly extending wall 328 and having stepped openings 350 that extend through lower wall 318.

An elongated opening 352 is provided in lower wall 318 at front section 338 in alignment with elongated openings 244 and 314. Two bosses 351 are provided adjacent to opposite sides of elongated opening 352, each having a threaded opening 353 therein. In this manner, upper connection plate 292 of hook support 290 rests on bosses 351, with lock plate 296 extending through elongated opening 352. Screws (not shown) are inserted through openings 294 and threadedly received in threaded openings 353 to secure hook support 290 thereto.

Two spaced apart ears 354 extend upwardly from opposite sides at the rear of upper annular ledge 330. The inner spacing between ears 354 is similar to the outer spacing between ears 235 so as to fit therearound. Ears 354 include axially aligned openings 356 at their upper ends, which are in alignment with axially aligned openings 237 of ears 235. A tab 358 extends rearwardly from each ear 354 and has a transverse opening 360.

Figure 43:
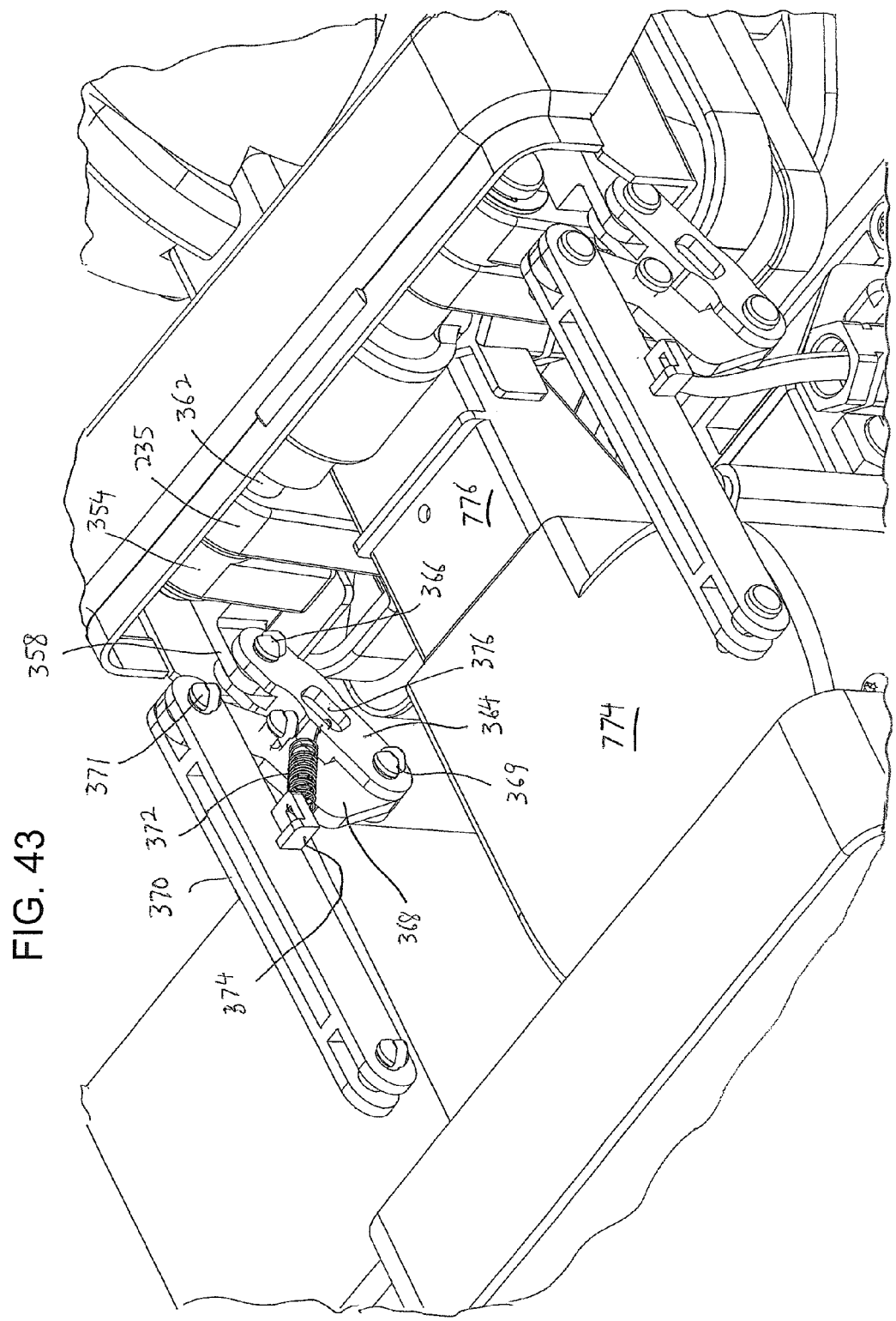
FIG. 43 is an enlarged perspective view showing the assembly of the brewing upper support to the brewing lower support.

With this arrangement, as shown in the enlarged assembly view of FIG. 43, a rotatable shaft 362 extends through openings 237 and 356 to rotatably mount brewing upper support 316 to brewing lower support 208. Specifically, ears 235 are rotatably mounted on rotatable shaft 362. However, ears 354 are fixed to rotatable shaft 362, so that brewing upper support 316, when pivoted toward or away from brewing lower support 208, also results in rotatable shaft 362 rotating therewith. Since brewing lower support 208 is fixed in position, this permits brewing upper support 316 to pivotally open and close with respect to brewing lower support 208.

As also shown in FIG. 43, a first linkage arm 364 is pivotally connected at one end to each tab 358 by a pivot pin 366. A second linkage arm 368 has one end pivotally connected to the opposite second end of first linkage arm 364 by a pivot pin 369, and a third linkage arm 370 has one end pivotally connected to the opposite second end of second linkage arm 368 by a pivot pin 371. The other end of third linkage arm 370 is free. A coil extension spring 372 is connected between a projection 374 mounted to a side of third linkage arm 370 and an opening 376 in first linkage arm 364. This linkage arrangement has the effect of maintaining brewing upper support 316 in the open position when pivoted upwardly away from brewing lower support 208, and maintaining brewing upper support 316 in the closed position when pivoted downwardly into engagement with brewing lower support 208.

Figure 44:
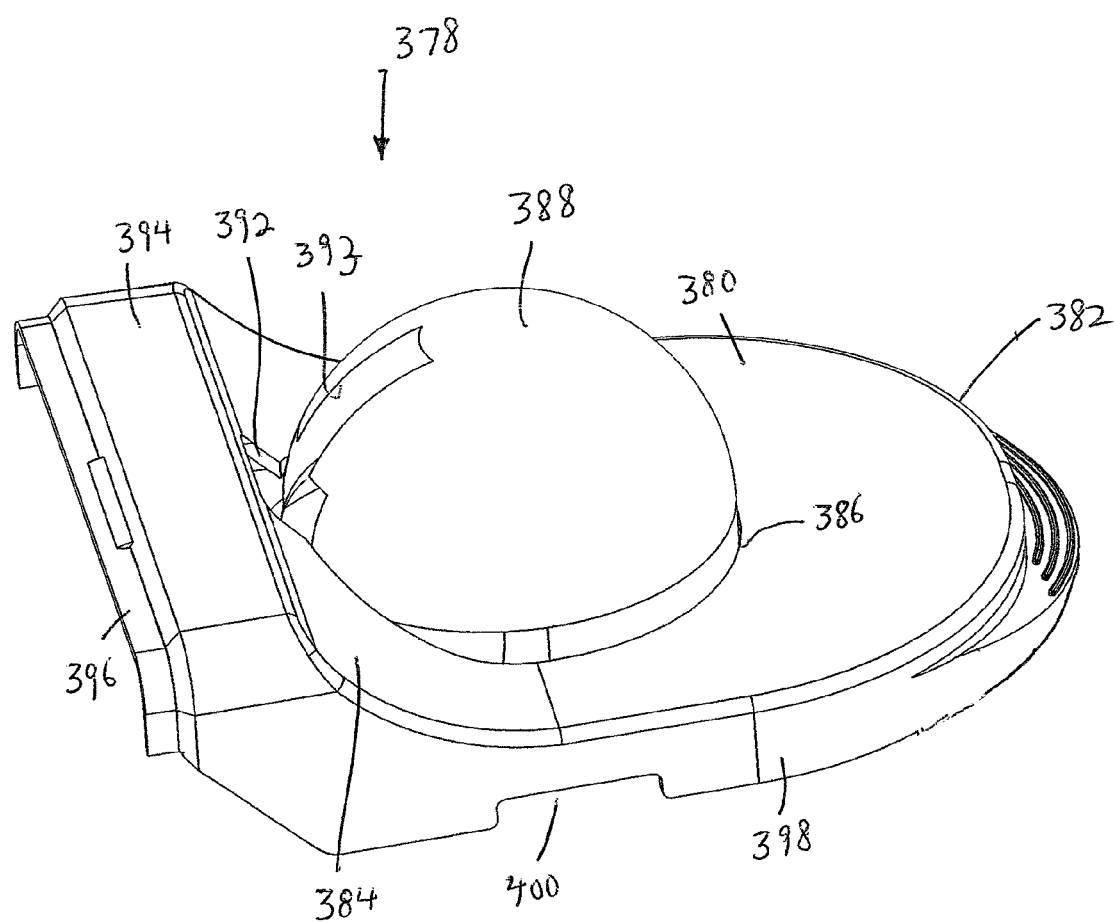
FIG. 44 is a top perspective view of the front cover of the brewing assembly.
Figure 45:
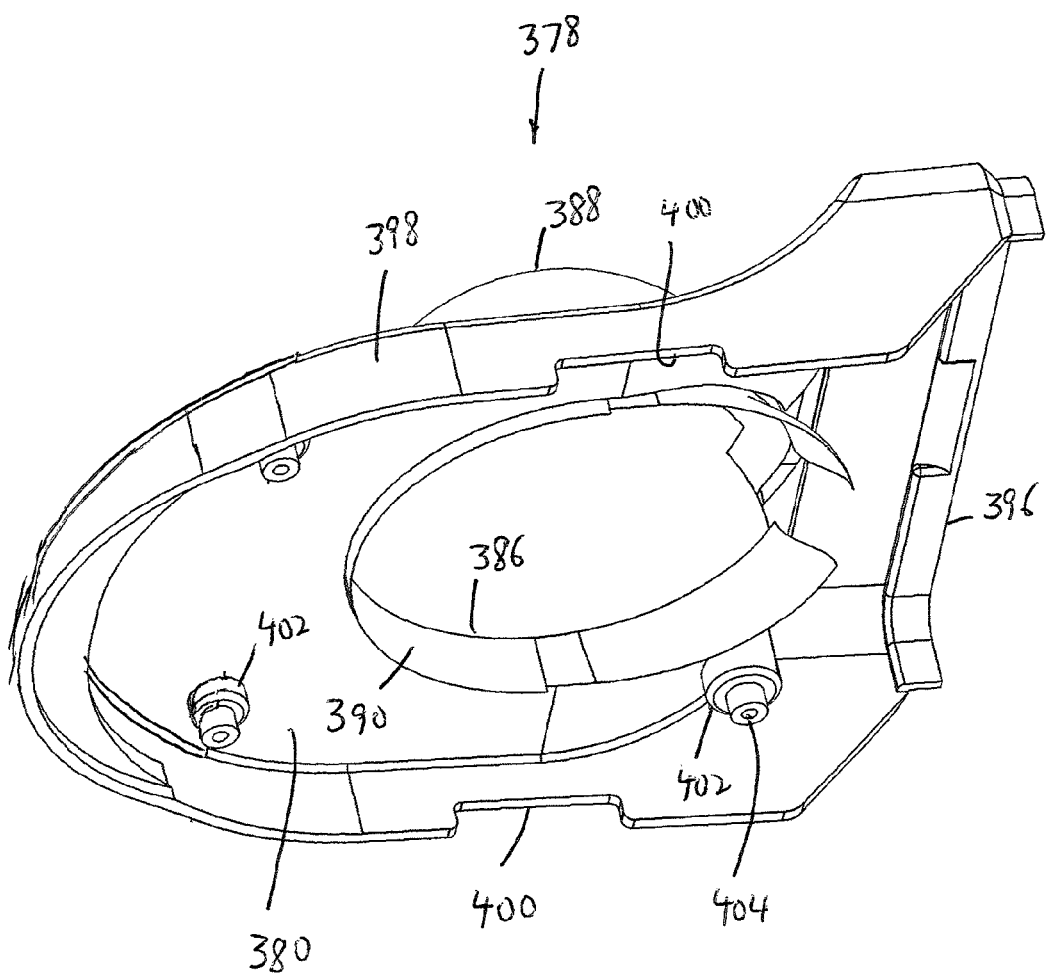
FIG. 45 is a bottom perspective view of the front cover.
Figure 46:
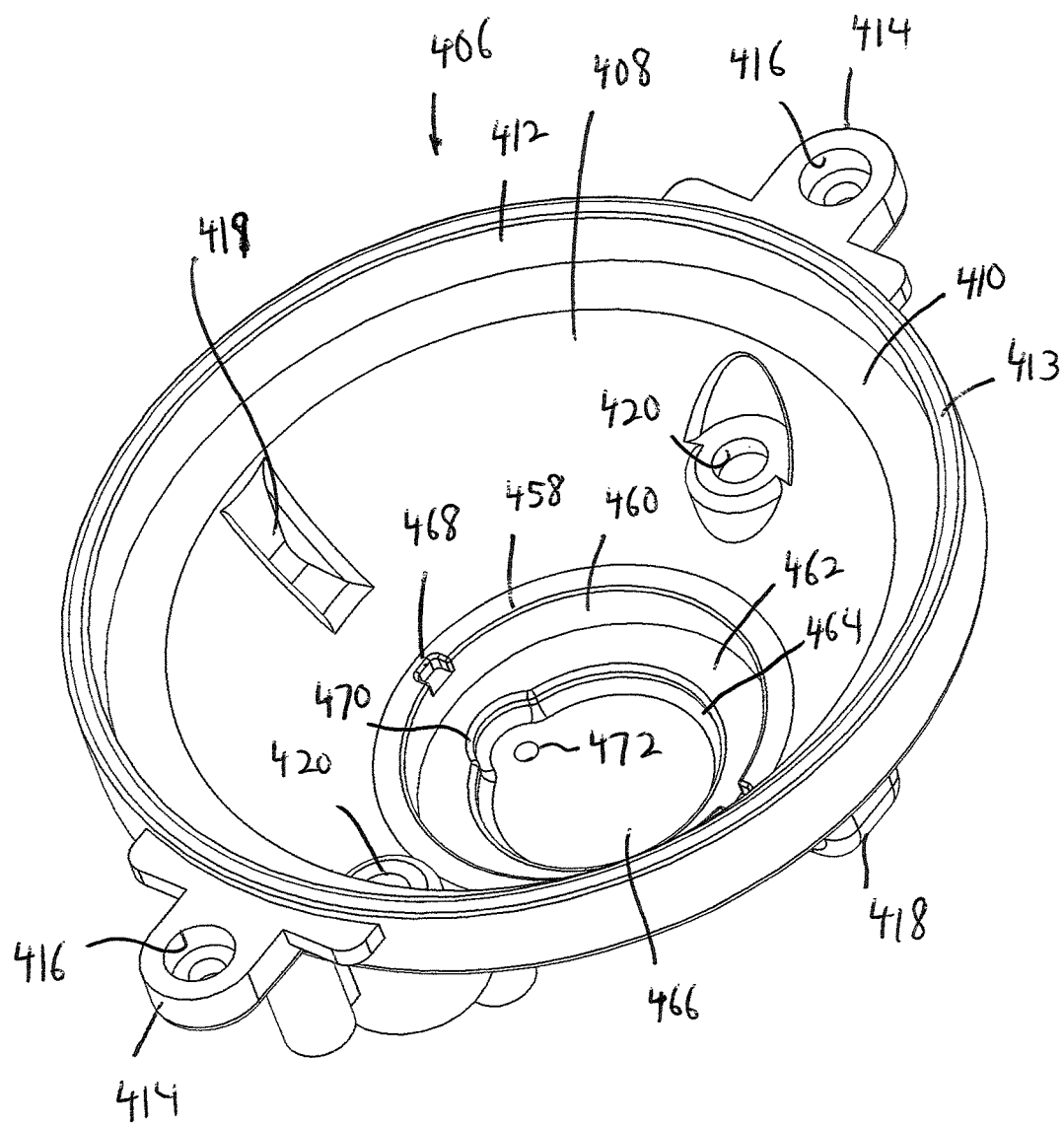
FIG. 46 is a top perspective view of the brewing tea support of the brewing assembly.
Figure 47:
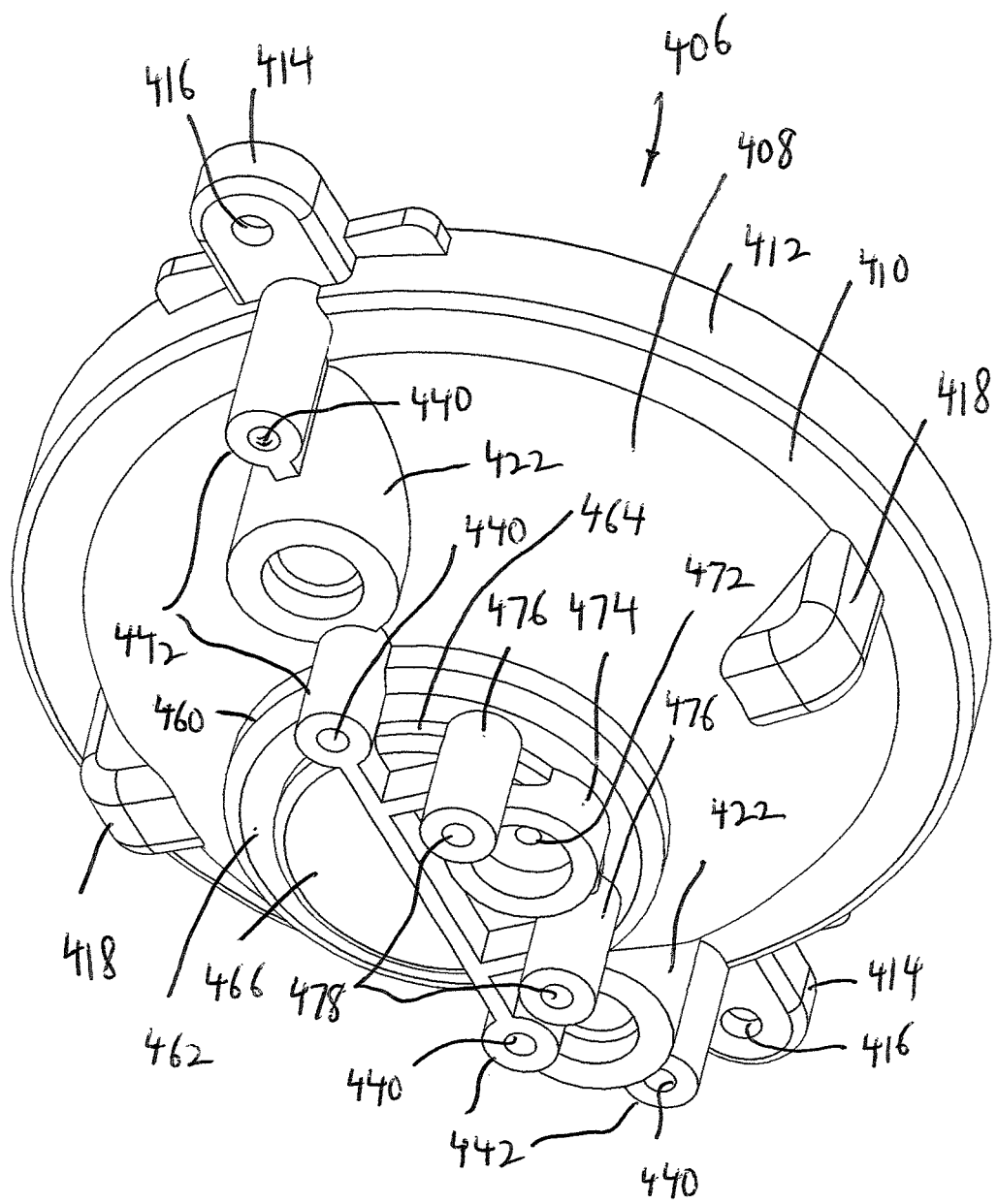
FIG. 47 is a bottom perspective view of the brewing tea support.
Figure 48:
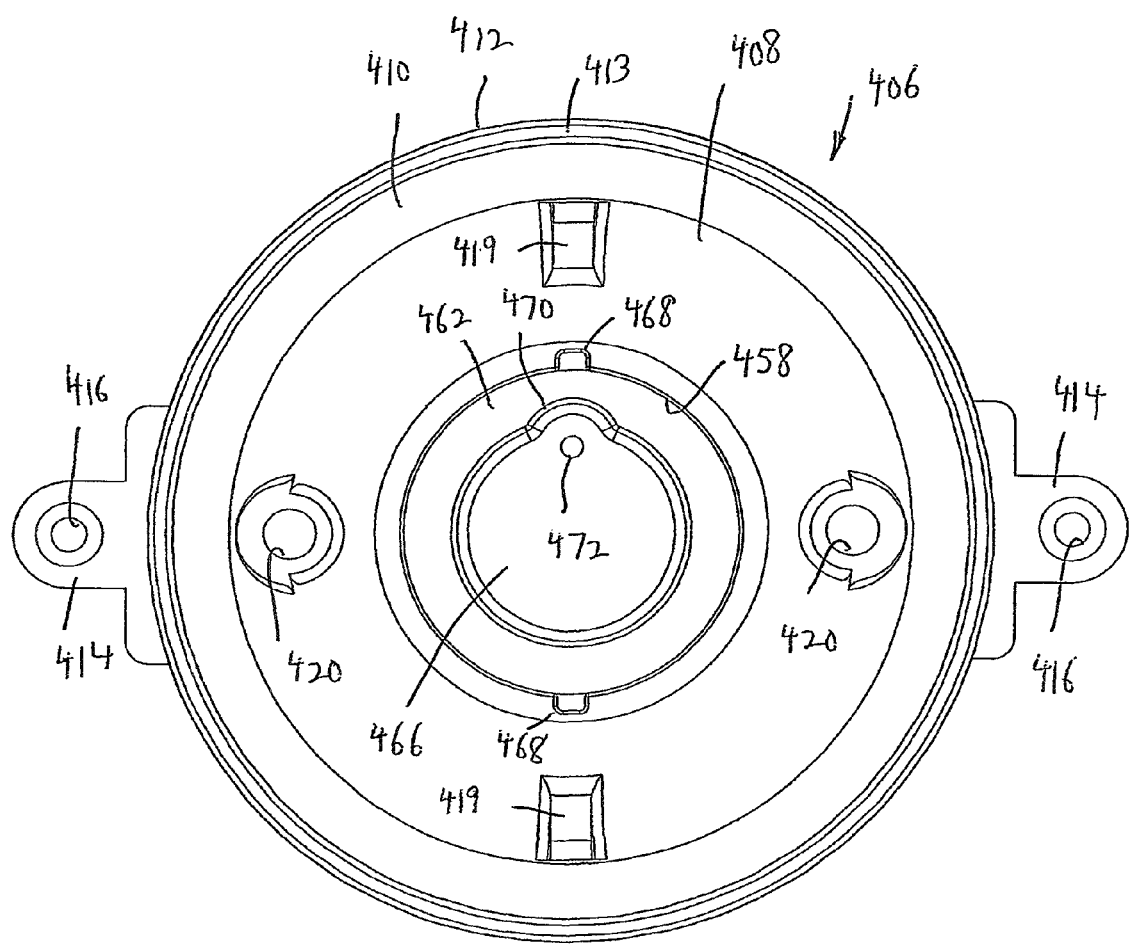
FIG. 48 is a top plan view of the brewing tea support.
Figure 49:
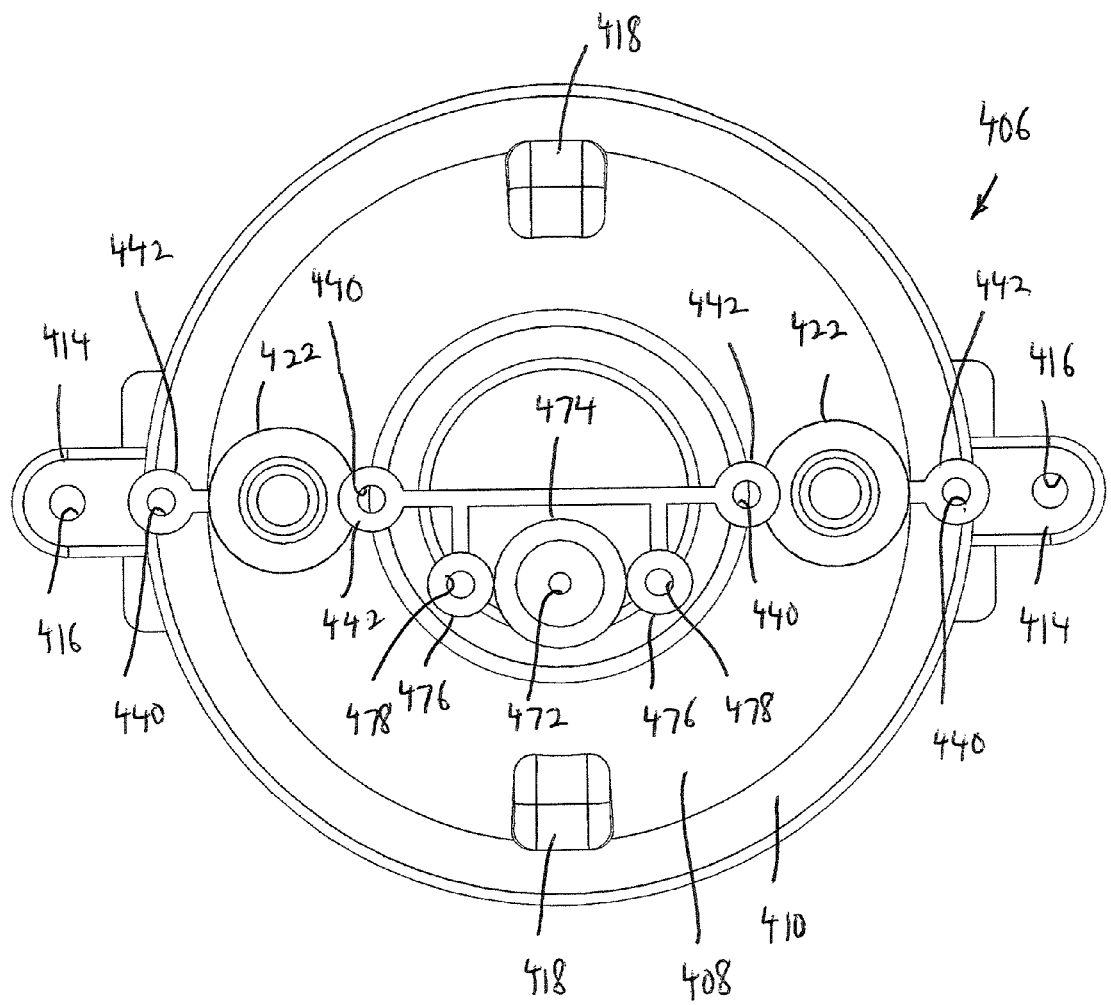
FIG. 49 is a bottom plan view of the brewing tea support.
Figure 50:
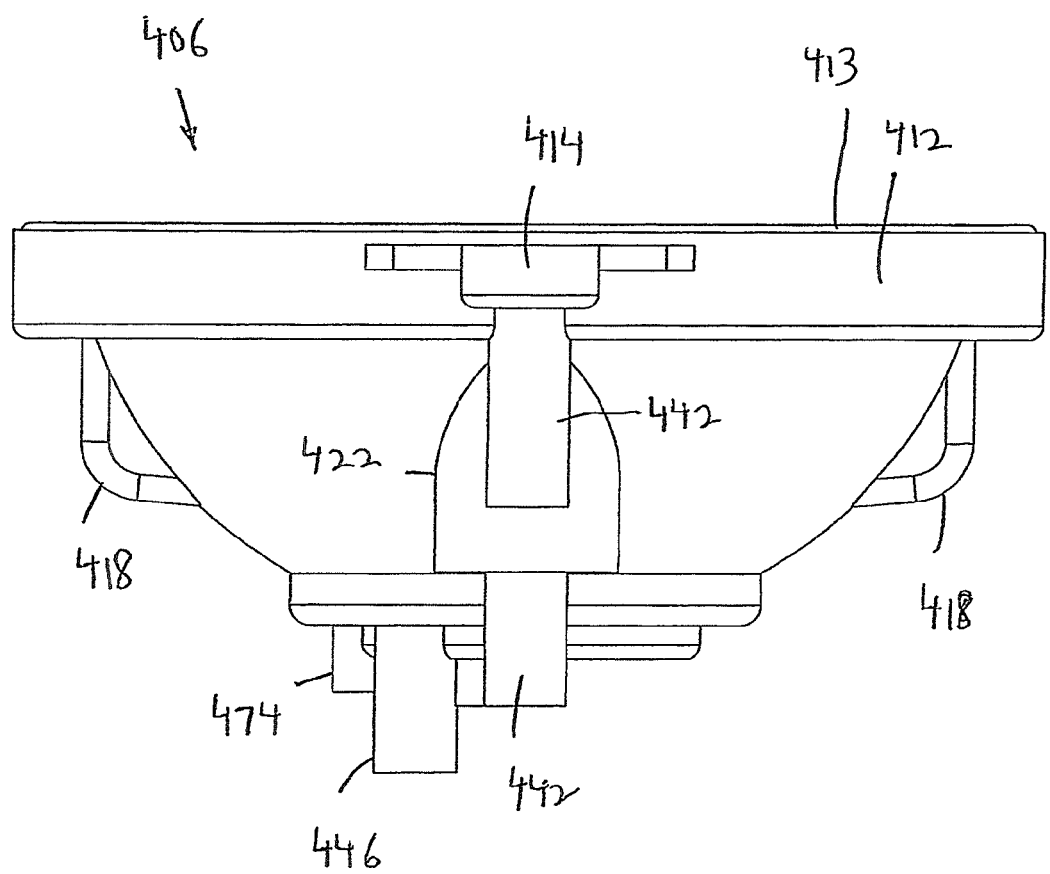
FIG. 50 is a side elevational view of the brewing tea support.
Figure 51:
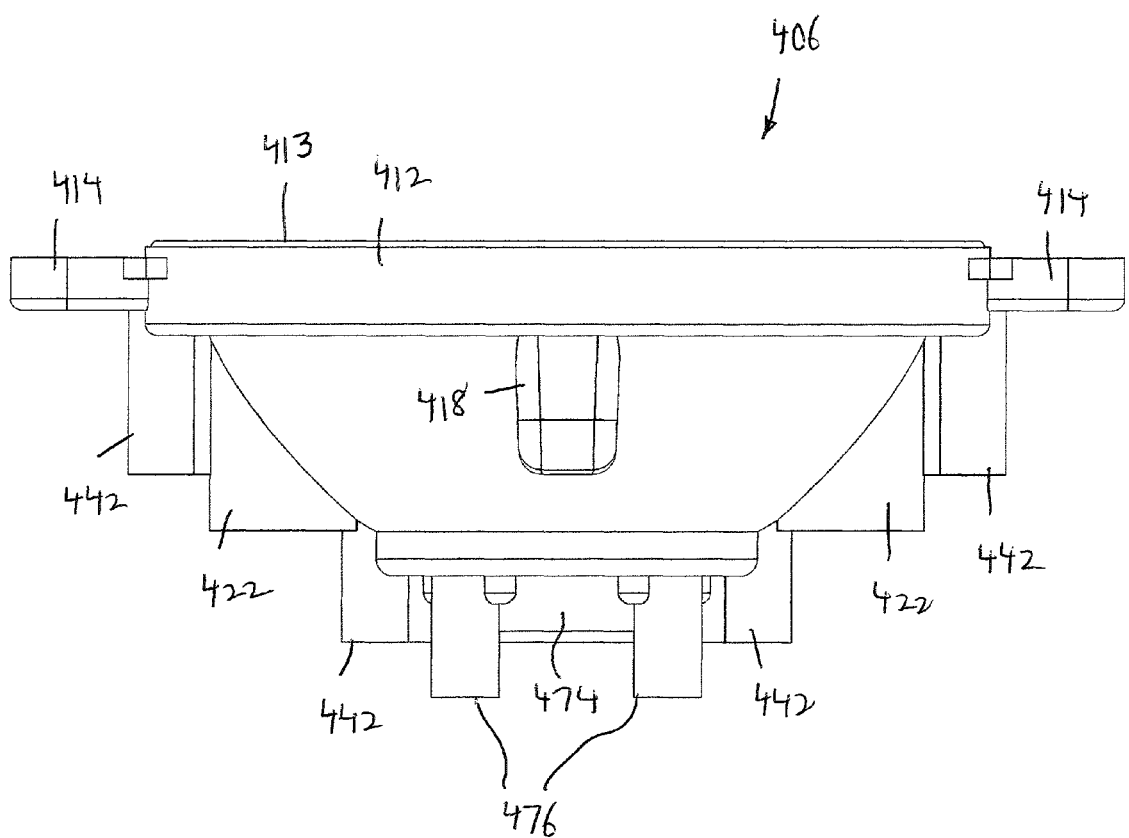
FIG. 51 is a front elevational view of the brewing tea support.

As shown in FIGS. 1, 44 and 45, brewing support assembly 207 further includes a front cover 378 that is fixedly secured on top of brewing upper support 316 for movement therewith. Front cover 378 includes a generally rectangular upper wall 380 with a rounded front end 382 and with an upwardly curved rear portion 384. A central opening 386 is provided in upper wall 380 in alignment with the opening 332 in upper circular ledge 330 of brewing upper support 316. A transparent half-spherical dome 388 is secured to upper wall 380 at central opening 386 and includes a flared lower annular portion 390 that extends below upper wall 380. When front cover 378 is assembled with brewing upper support 316, flared lower annular portion 390 fits within and extends below opening 332 in upper circular ledge 330. A small rectangular opening 392 is provided centrally in upwardly curved rear portion 384 at a position at the upper end thereof just behind dome 388, and a T-shaped opening 393 is provided in the rear of dome 388 in open communication with opening 392.

A short rectangular wall 394 extends rearwardly from the rear edge of upwardly curved rear portion 384, and is thereby in parallel relation to upper wall 380. A tab wall 396 extends rearwardly from short rectangular wall 394.

A side wall 398 extends downwardly from the periphery of upper wall 380 including upwardly curved rear portion 384, short rectangular wall 394 and tab wall 396. Side wall 398 includes rectangular cut-out sections 400 on opposite sides which are in alignment with transverse opening sections 333 of brewing upper support 316.

Four stepped bosses 402 extend down from the underside of upper wall 380 and include threaded openings 404 therein. Stepped bosses 402 are positioned within openings 350 of brewing upper support 316, whereby screws (not shown) secure front cover 378 to brewing upper support 316.

Referring now to FIGS. 46-51, brewing support assembly 207 includes a brewing tea support 406 having a part spherical base wall 408 which extends out through circular opening 218 of brewing lower support 208, and guided by downwardly extending guide wall 224. An annular ledge 410 extends radially outwardly from the upper end of part spherical base wall 408, and seats on inwardly extending circular ledge 222 of brewing lower support 208. An annular guide wall 412 extends upwardly from the outer edge of annular ledge 410 and seats against vertical, downwardly extending guide wall 220 of brewing lower support 208. A raised annular bead 413 is formed on the upper surface of annular guide wall 412.

Brewing tea support 406 includes diametrically opposite securing tabs 414 at the outer surface of annular guide wall 412 that seat within recessed sections 226 of brewing lower support 208, with each securing tab 414 having an opening 416 through which a screw (not shown) is received and threadedly secured in the respective threaded opening 230 to secure brewing tea support 406 to brewing lower support 208. Two diametrically opposite guide walls 418 extend out from the outer surface of part spherical base wall 408 and seat within guide openings 232 of brewing lower support 208. Guide walls 418 define an L-shaped recess 419 in the inner surface of part spherical base wall 408. With this arrangement, lower cover 300 seats on top of brewing lower support 208 and brewing tea support 406.

Brewing tea support 406 includes two water inlet openings 420 in part spherical base wall 408 through which water is jetted into the brewing chamber, to be discussed later. Two tube securing connections 422 are formed at the lower outer surface of part spherical base wall 408 in fluid communication with openings 420. Thus, the heated water from water heater 192 is passed out through tube 200 to one input of T-connector 202, as shown in FIG. 24, and then, the water is passed out of T-connector 202, through a tube 424.

Figure 52:
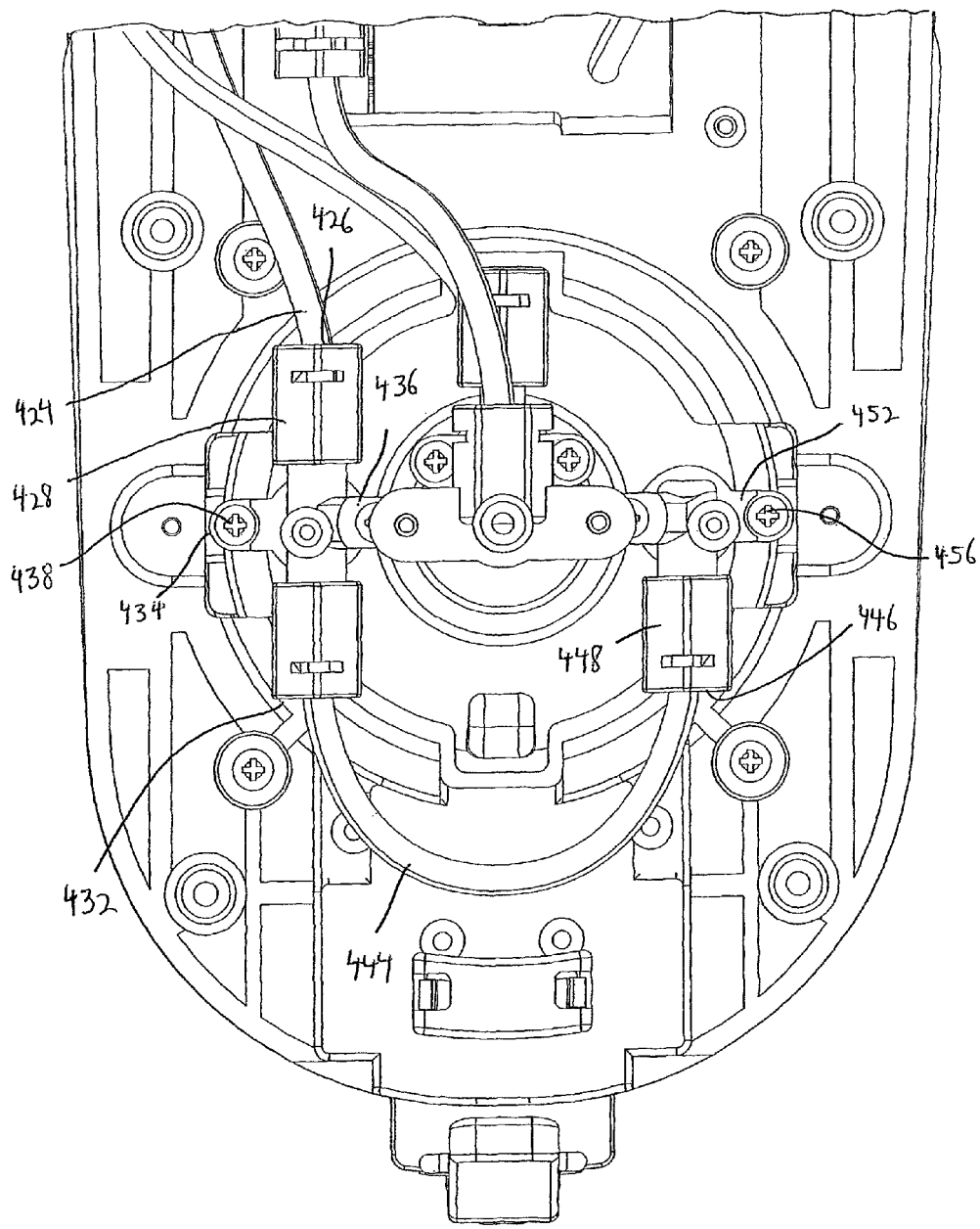
FIG. 52 is a bottom plan view of the hot water connections to the brewing tea support.
Figure 53:
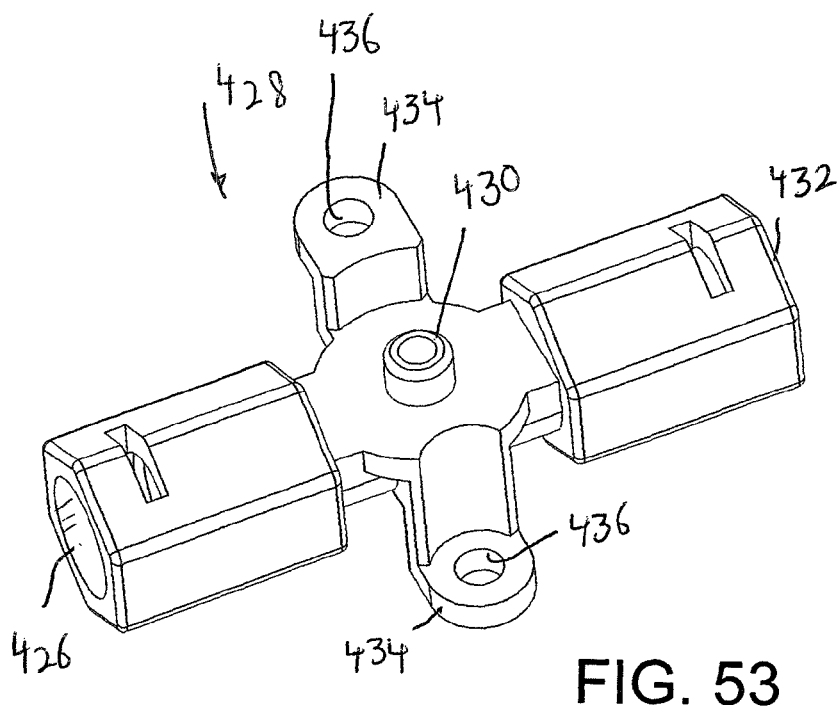
FIG. 53 is a perspective view of the T-inlet connector for one inlet of the brewing tea support.

As shown in FIG. 52, tube 424 is connected to an inlet 426 of a T-inlet connector 428 (FIG. 53), which includes a first outlet boss 430 and a second outlet 432. T-inlet connector 428 includes transverse securing tabs 434 with openings 436 through which screws 438 are inserted and received in threaded openings 440 of bosses 442 extending down from the outer surface of part spherical base wall 408 on opposite sides of the respective tube securing connection 422. In this secured position, first outlet boss 430 is tightly fit within one tube securing connection 422 to supply heated water to the respective water inlet opening 420.

Figure 54:
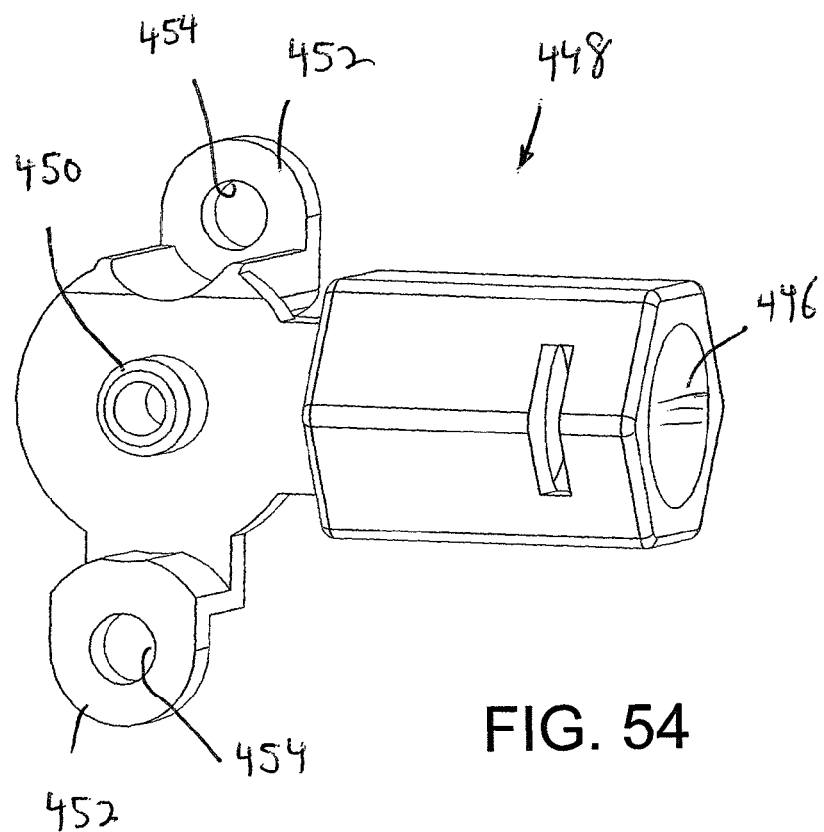
FIG. 54 is a perspective view of the inlet connector for the other inlet of the brewing tea support.

A flexible tube 444 (FIG. 52) extends out of the second outlet 432 of T-inlet connector 428 and is connected to an inlet 446 of an inlet connector 448 (FIG. 54) at the opposite side of brewing assembly 6, with inlet connector 448 having an outlet boss 450 tightly fit within the other tube securing connection 422 to supply heated water to the respective water inlet opening 420. Inlet connector 448 includes transverse securing tabs 452 with openings 454 through which screws 456 are inserted and received in threaded openings 440 of bosses 442 extending down from the outer surface of part spherical base wall 408 on opposite sides of the other tube securing connection 422. In this secured position, outlet boss 450 is tightly fit within the other tube securing connection 422 to supply heated water to the respective water inlet opening 420.

Returning back to FIGS. 46-51, brewing tea support 406 further includes a circular opening 458 centered at the lower end of part spherical base wall 408. An annular wall 460 extends vertically down from circular opening 458 and terminates at its lower end, at an inwardly extending ledge 462, which in turn, terminates in another annular wall 464 extending vertically down therefrom. The lower end of annular wall 464 is closed off by a bottom wall 466. Two diametrically opposite shallow recessed sections 468 are formed in annular wall 460 and the bottom of part spherical base wall 408 where it meets with annular wall 460. An arcuate recess 470 is formed in annular wall 464 in alignment with one shallow recessed section 468, with a small opening 472 formed in bottom wall 466 just outside of arcuate recess 470. As will be understood from the description hereafter, the brewed beverage escapes through small opening 472. A tube securing connection 474 is formed at the lower outer surface of bottom wall 466 in fluid communication with small opening 472. Bosses 476 extend down from the outer surface of part spherical base wall 408 on opposite sides of tube securing connection 474, each including a threaded opening 478.

Figure 55:
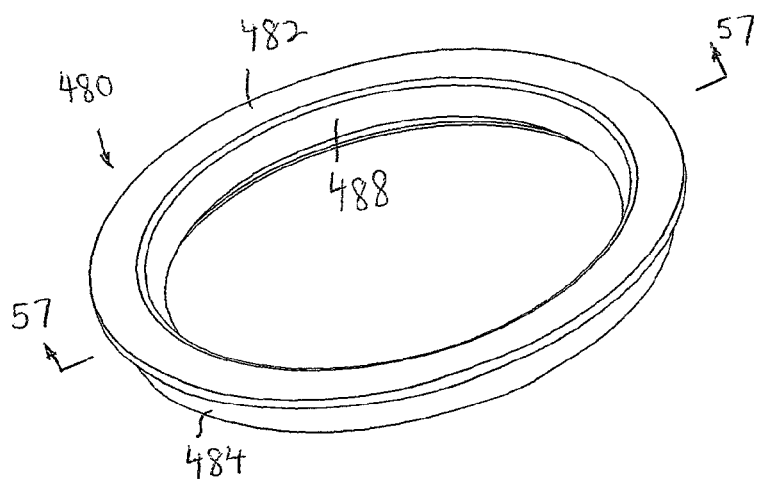
FIG. 55 is a top perspective view of the tea support ring of the brewing tea support.
Figure 56:
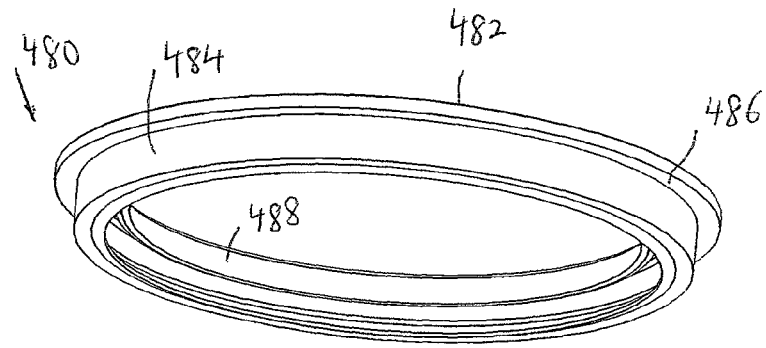
FIG. 56 is a bottom perspective view of the tea support ring.
Figure 57:
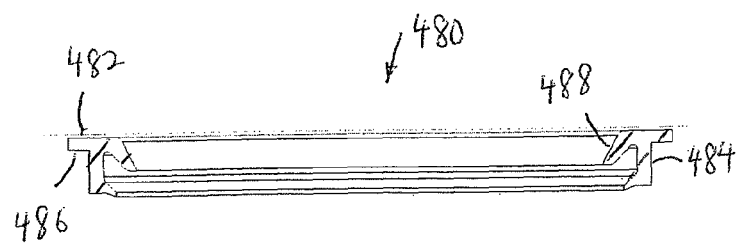
FIG. 57 is a cross-sectional view of the tea support ring of FIG. 55, taken along line 57-57 thereof.
Figure 58:
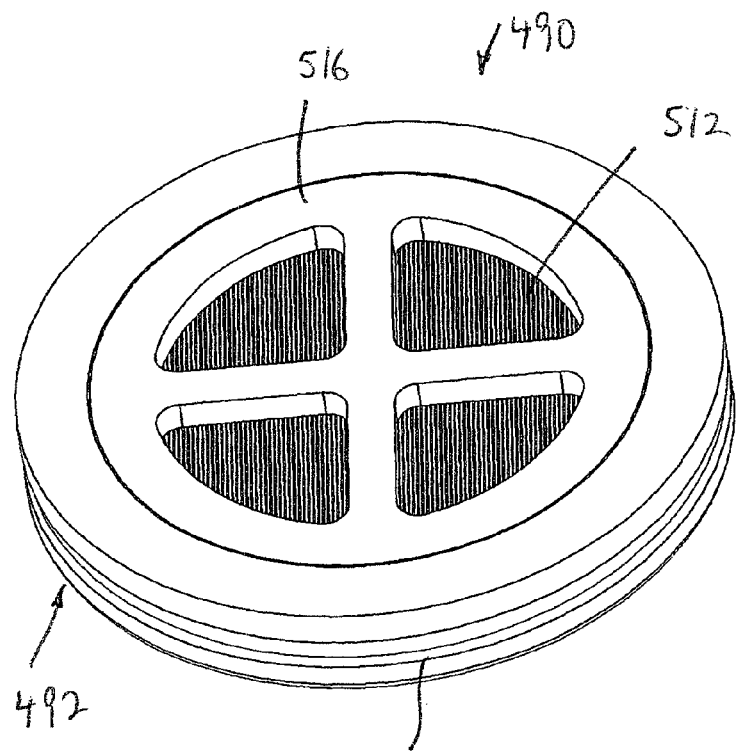
FIG. 58 is a perspective view of the net outlet tea assembly of the brewing assembly.
Figure 59:
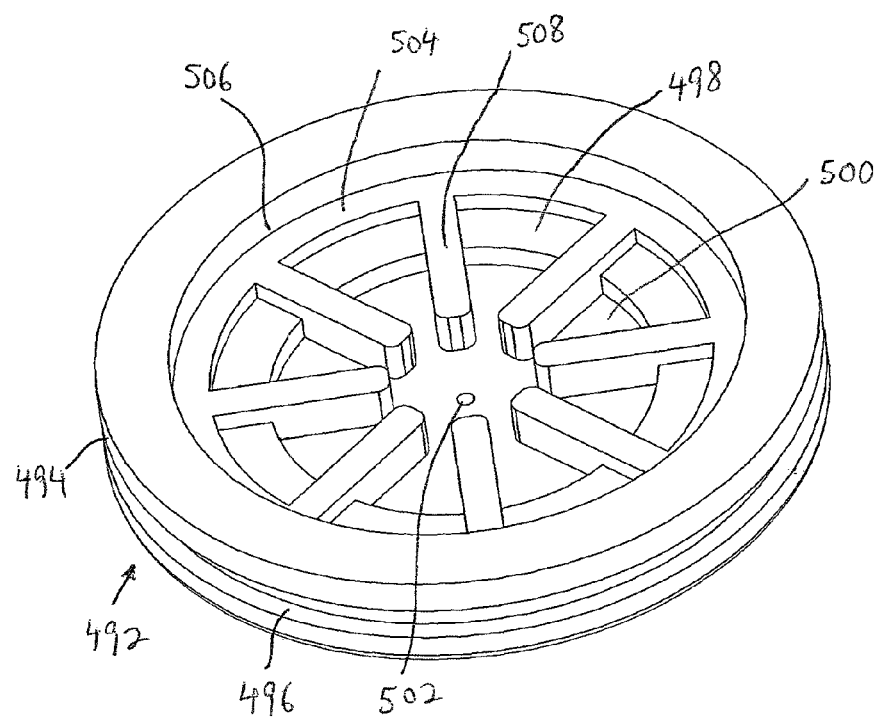
FIG. 59 is a top perspective view of the flow control disk of the net outlet tea assembly.
Figure 60:
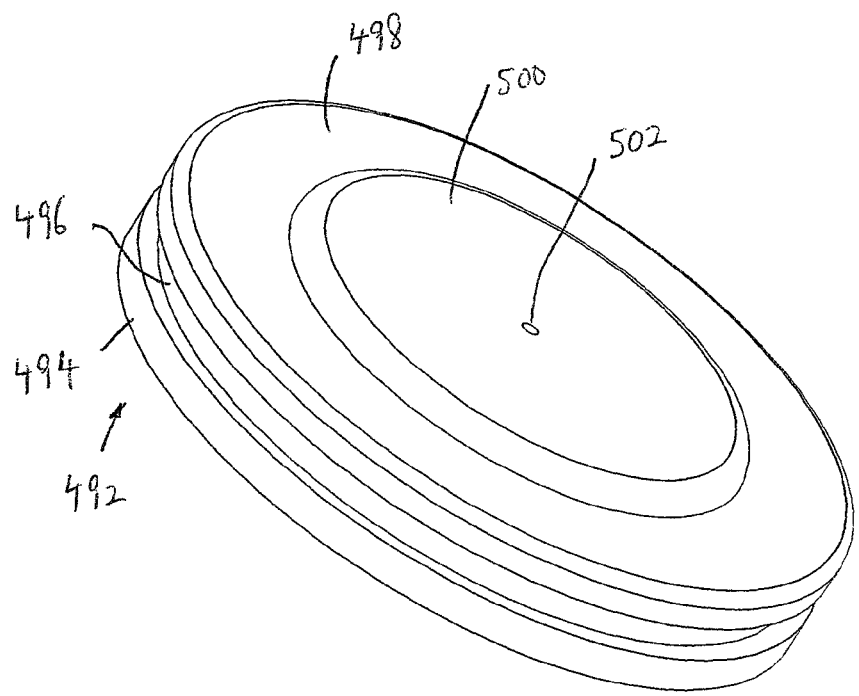
FIG. 60 is a bottom perspective view of the flow control disk.
Figure 61:
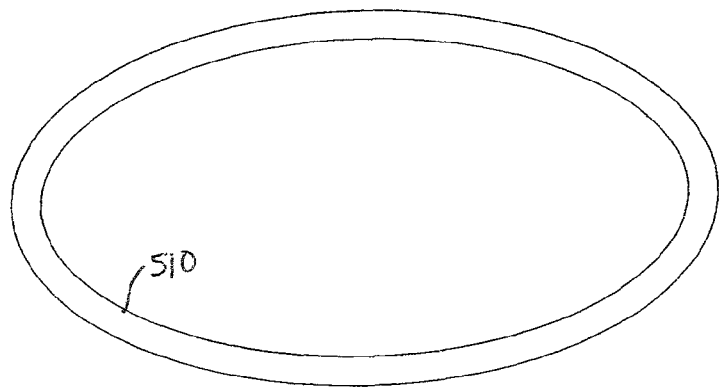
FIG. 61 is a perspective view of the sealing ring of the net outlet tea assembly.
Figure 62:
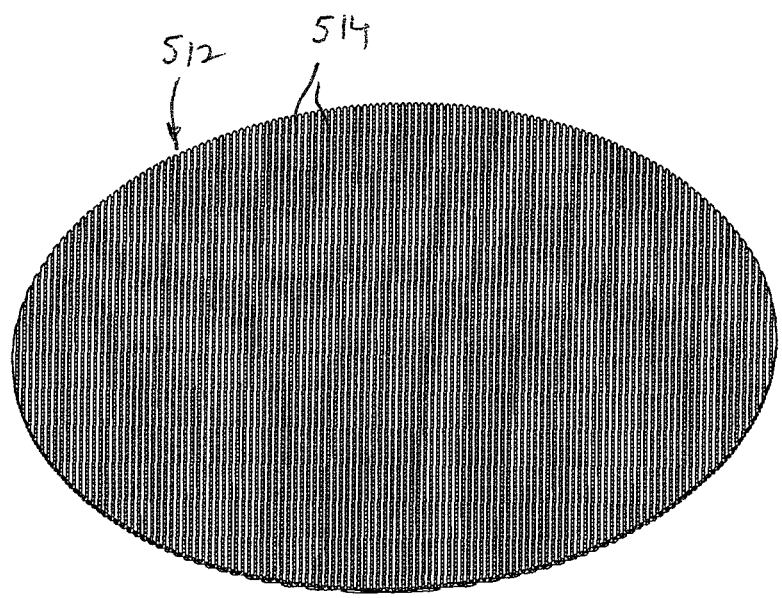
FIG. 62 is a perspective view of the mesh screen of the net outlet tea assembly.
Figure 63:
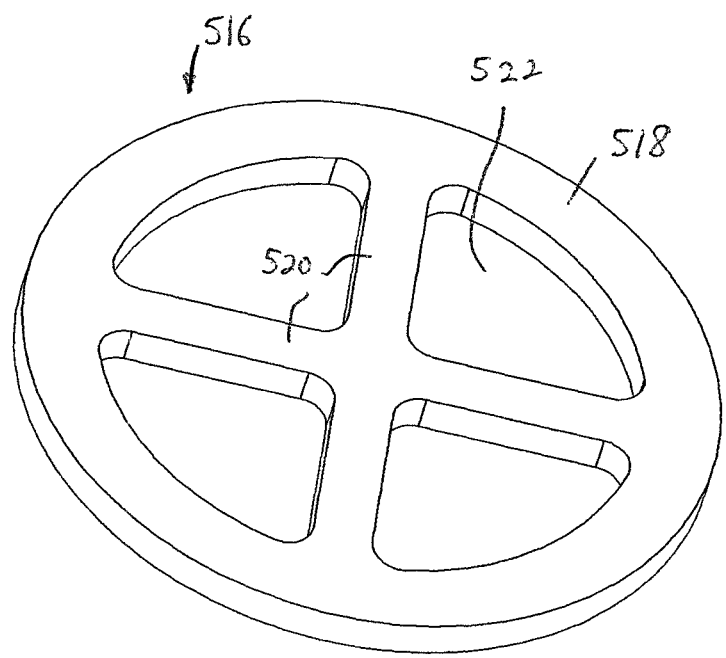
FIG. 63 is a top perspective view of the closure plate of the net outlet tea assembly.

As shown in FIGS. 55-57, brewing support assembly 207 further includes a tea support ring 480 that seats on top of brewing tea support 406 and includes an annular top wall 482 with an annular guide wall 484 extending vertically down from annular wall 482 at a position spaced inwardly from the peripheral edge thereof, thereby forming an annular shoulder 486. In this regard, annular guide wall 484 fits within annular guide wall 412 of brewing tea support 406 with the lower end of annular guide wall 484 resting on annular ledge 410, and annular shoulder 486 seats on annular bead 413 of brewing tea support 406. Tea support ring 480 further includes an annular guide wall 488 extending down and inwardly at an angle from the inner periphery of annular wall 482.

In order to properly guide and filter the brewed liquid exiting through small opening 472 of brewing tea support 406, a net outlet tea assembly 490, as shown in FIGS. 58-63, is sealingly fit within annular wall 460 and rests on inwardly extending ledge 462 of brewing tea support 406. Specifically, net outlet tea assembly 490 includes a flow control disk 492 that includes an annular outer wall 494 having an annular groove 496 therein. The bottom of flow control disk 492 is closed off by an annular bottom wall 498 having a central circular depression 500 therein, with a small opening 502 in the center of circular depression 500. A raised annular ledge 504 is provided on the outer periphery of annular bottom wall 498. The height of raised annular ledge 504 is less than that of annular outer wall 494 so as to define an annular shoulder 506 at the upper surface of raised annular ledge 504. A plurality, for example, eight, radially extending ribs 508 extend inwardly from the inner surface of annular wall 460 and terminate in surrounding relation to small opening 502. A sealing ring 510 extends around flow control disk 492 within groove 496 thereof.

A circular mesh screen 512 with small mesh openings 514 sits on annular shoulder 506 and ribs 508, and a closure plate 516 seats on mesh screen 492 and fits snugly within annular wall 494 of flow control disk 492 such that the upper surface of closure plate 516 is flush with the upper surface of annular wall 494. Closure plate 516 includes an annular ring plate 518 and four equiangularly arranged rib plates 520 extending inwardly from annular ring plate 518 and are connected at a center thereof, thereby defining four quadrant openings 522.

Thus, when net outlet tea assembly 490 is sealingly fit within annular wall 460 and rests on inwardly extending ledge 462 of brewing tea support 406, central circular depression 500 is spaced slightly above bottom wall 466. Accordingly, the brewed beverage travels through quadrant openings 522, mesh screen 512, small opening 502 and out through small opening 472.

Figure 64:
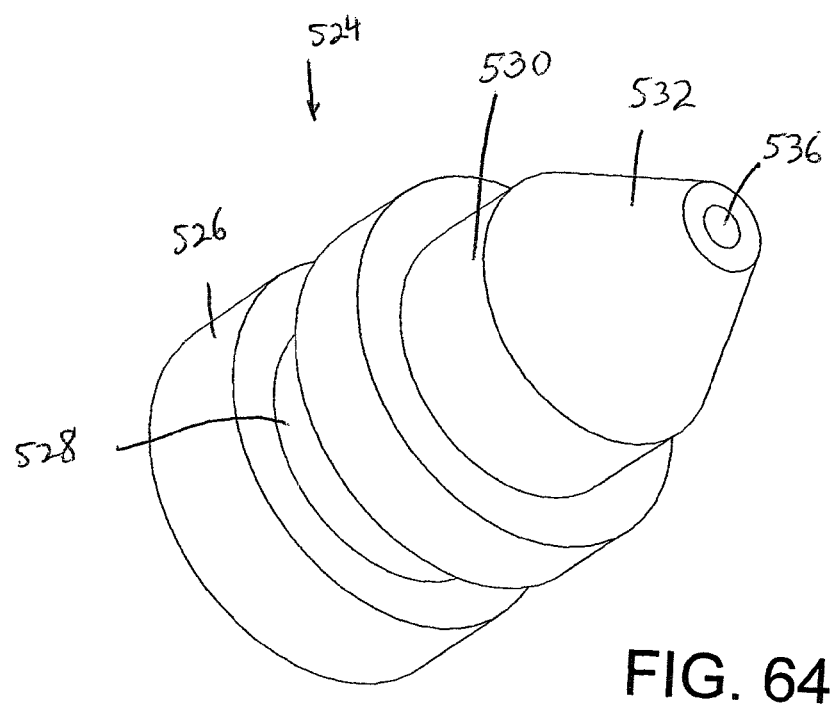
FIG. 64 is a top perspective view of an inlet connect for use with the brewing tea support.
Figure 65:
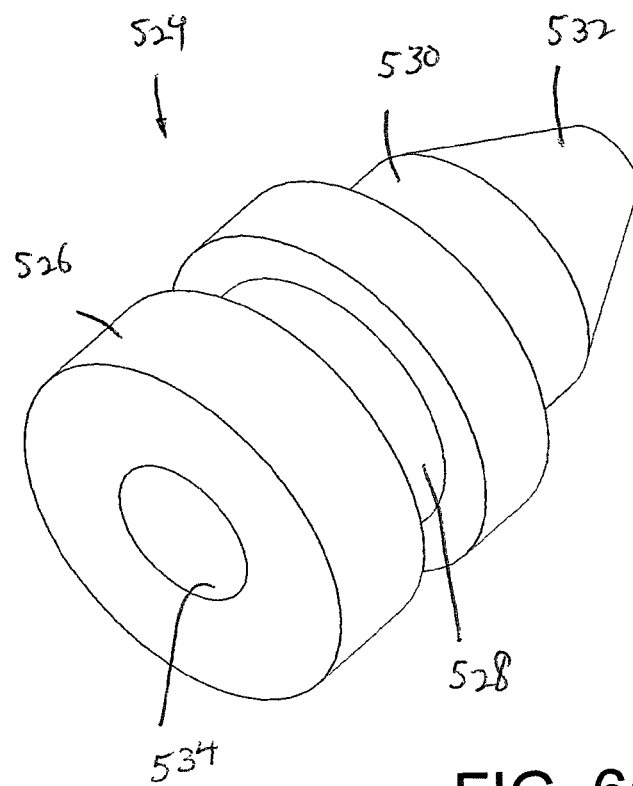
FIG. 65 is a bottom perspective view of an inlet connect.
Figure 66:
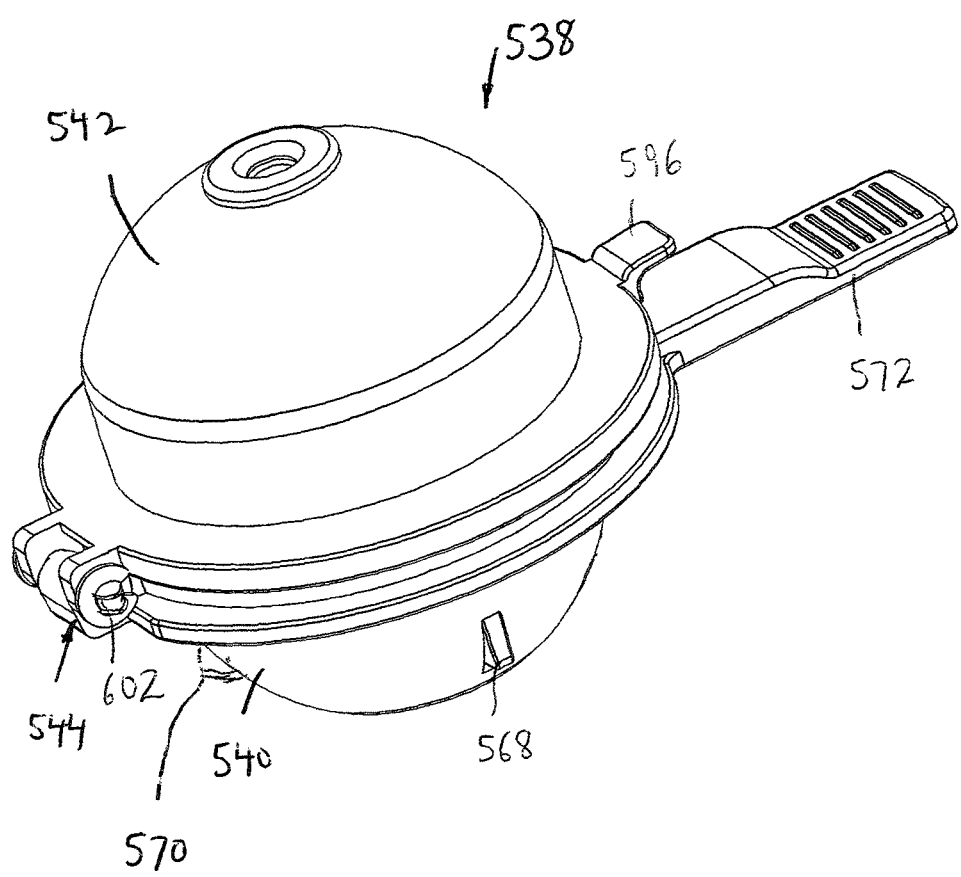
FIG. 66 is a perspective view of the removable brewing tank assembly.
Figure 67:
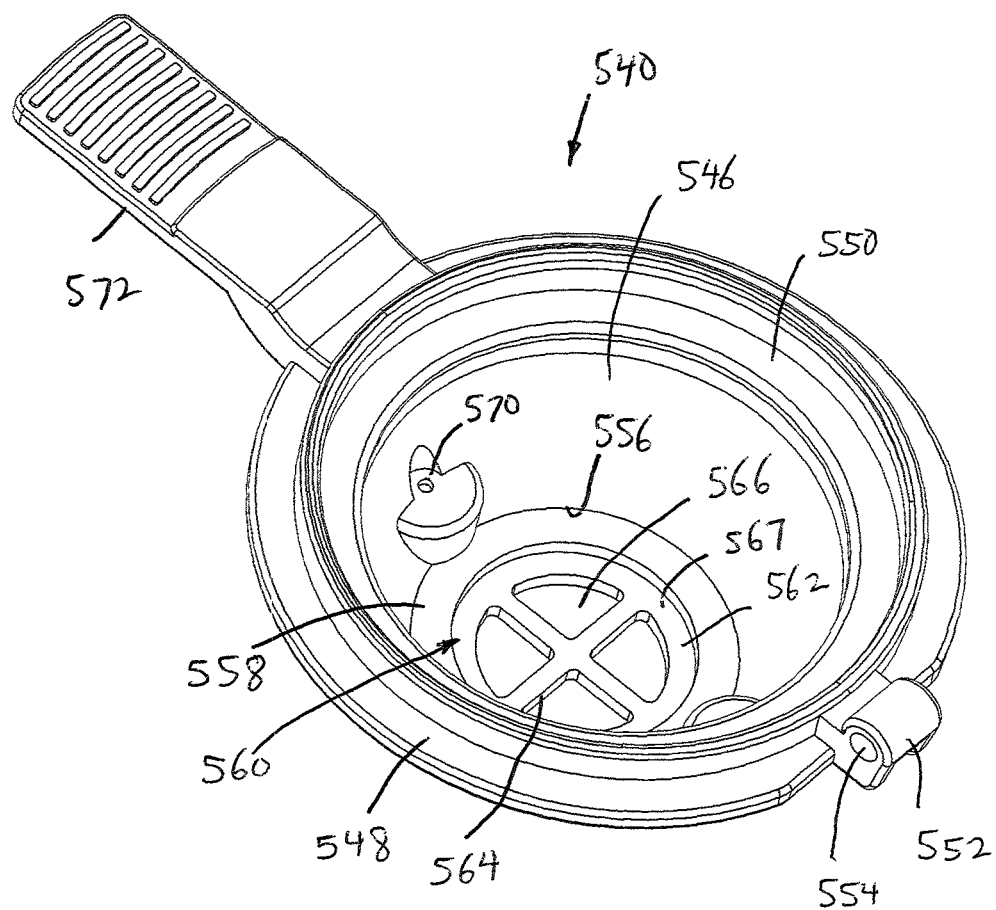
FIG. 67 is a top perspective view of the bottom cup section of the removable brewing tank assembly.
Figure 68:
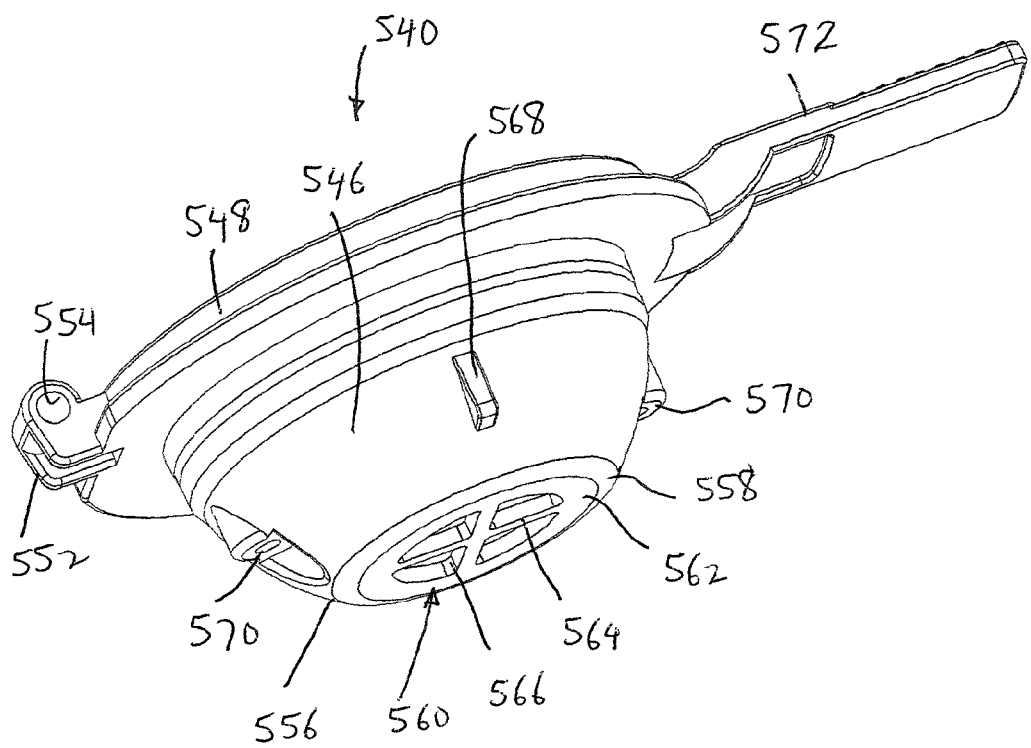
FIG. 68 is a bottom perspective view of the bottom cup section.
Figure 69:
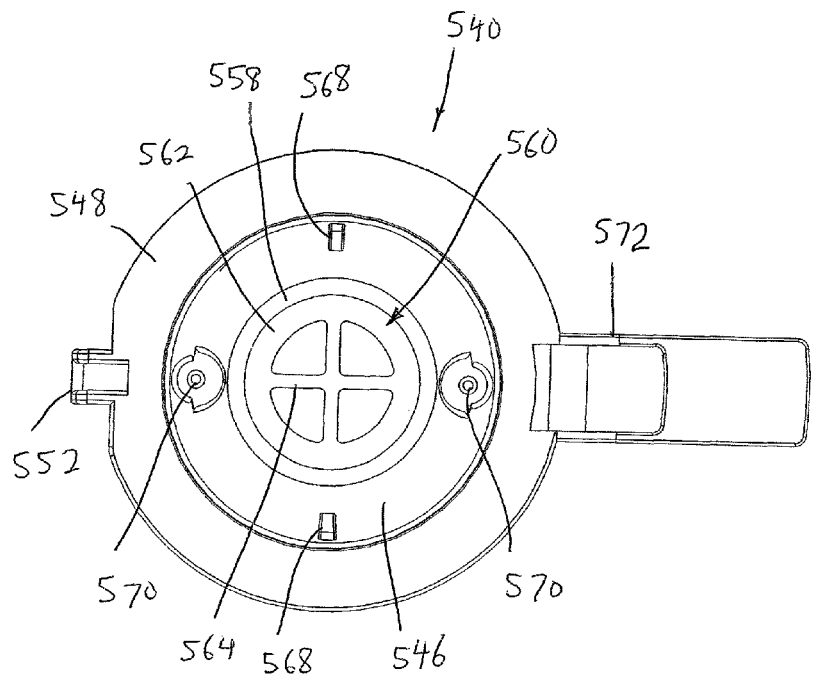
FIG. 69 is a bottom plan view of the bottom cup section.
Figure 70:
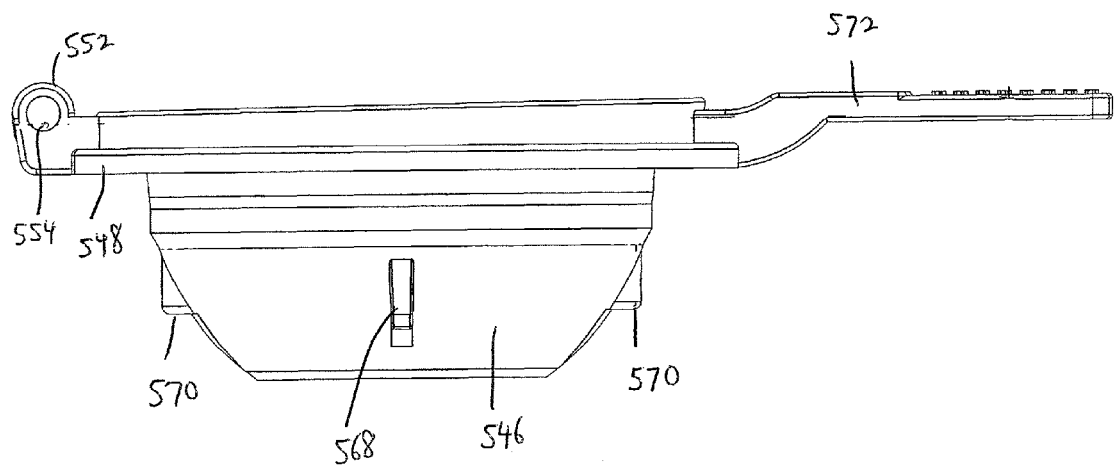
FIG. 70 is a side elevational view of the bottom cup section.
Figure 71:
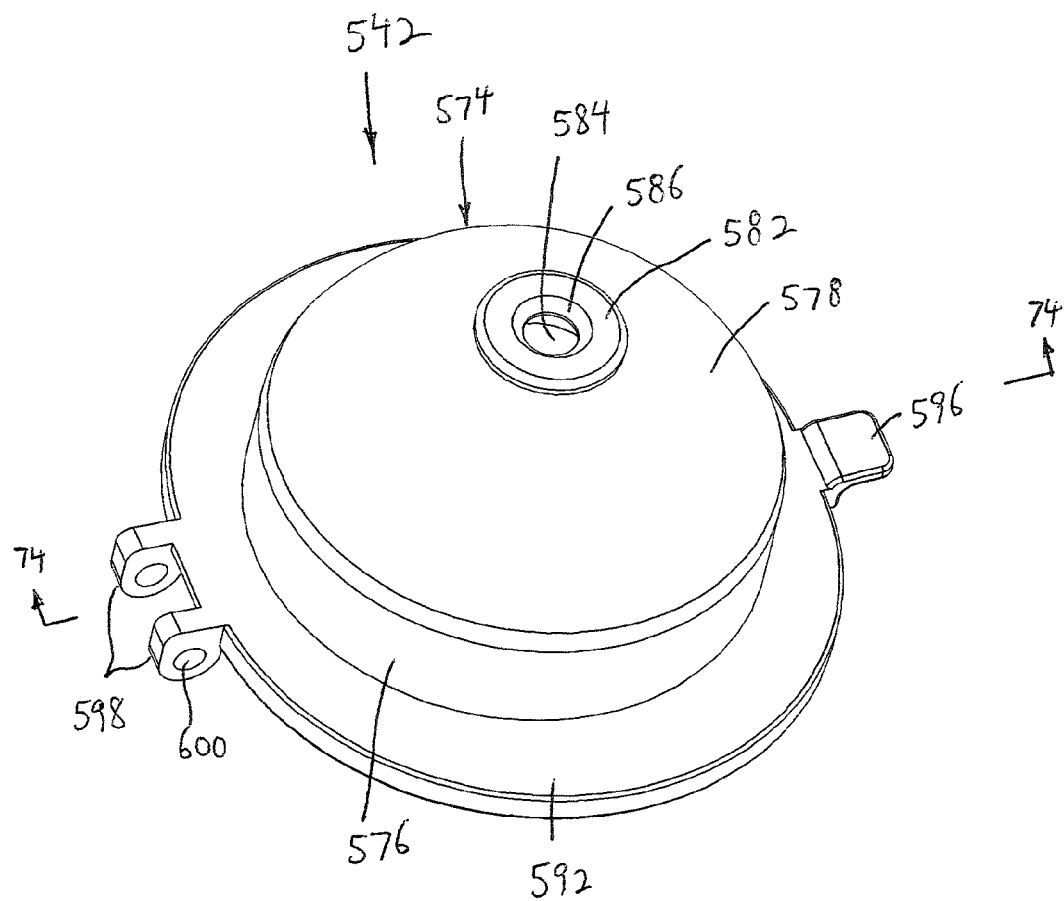
FIG. 71 is a top perspective view of the top domed cover section of the removable brewing tank assembly.
Figure 72:
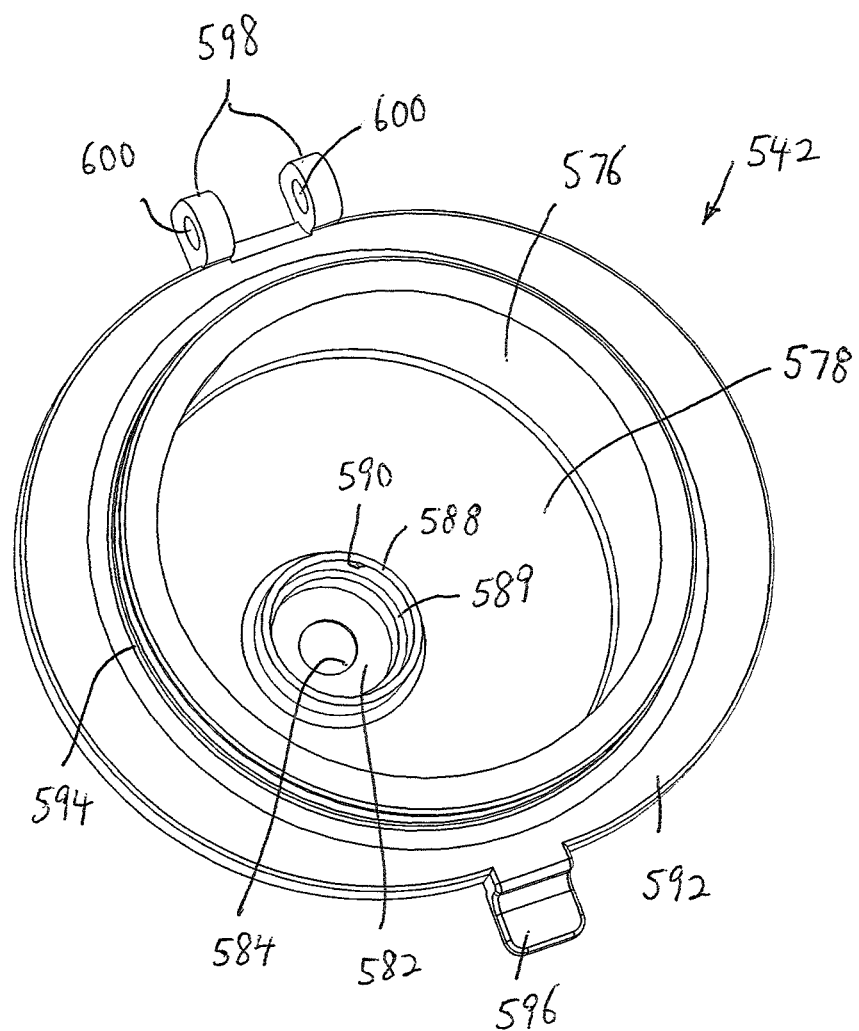
FIG. 72 is a bottom perspective view of the top domed cover section.
Figure 73:
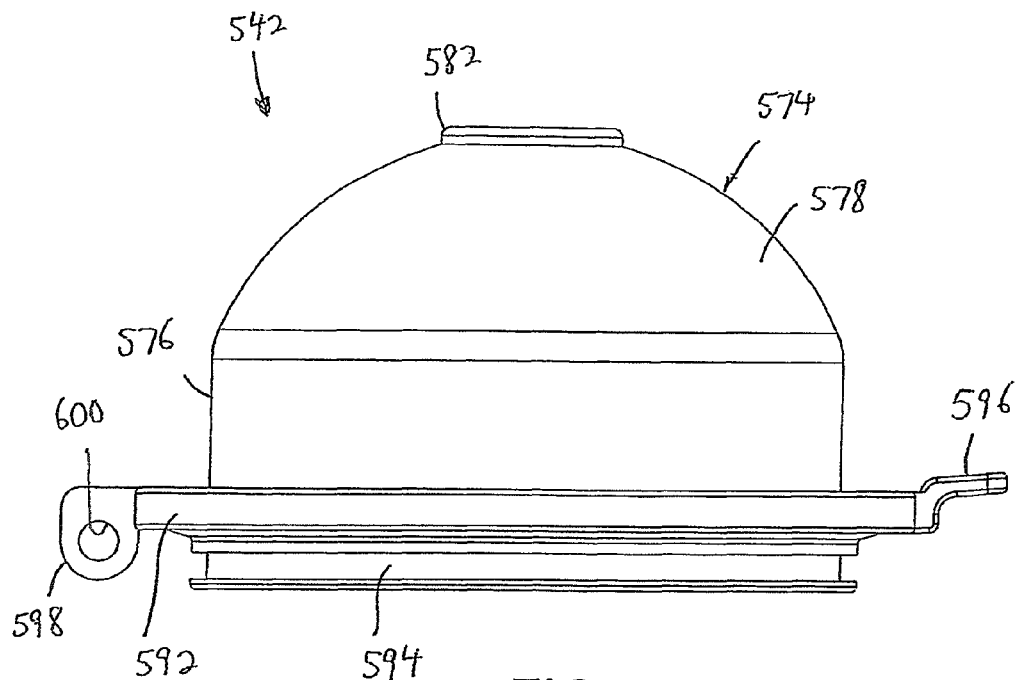
FIG. 73 is a side elevational view of the top domed cover section.
Figure 74:
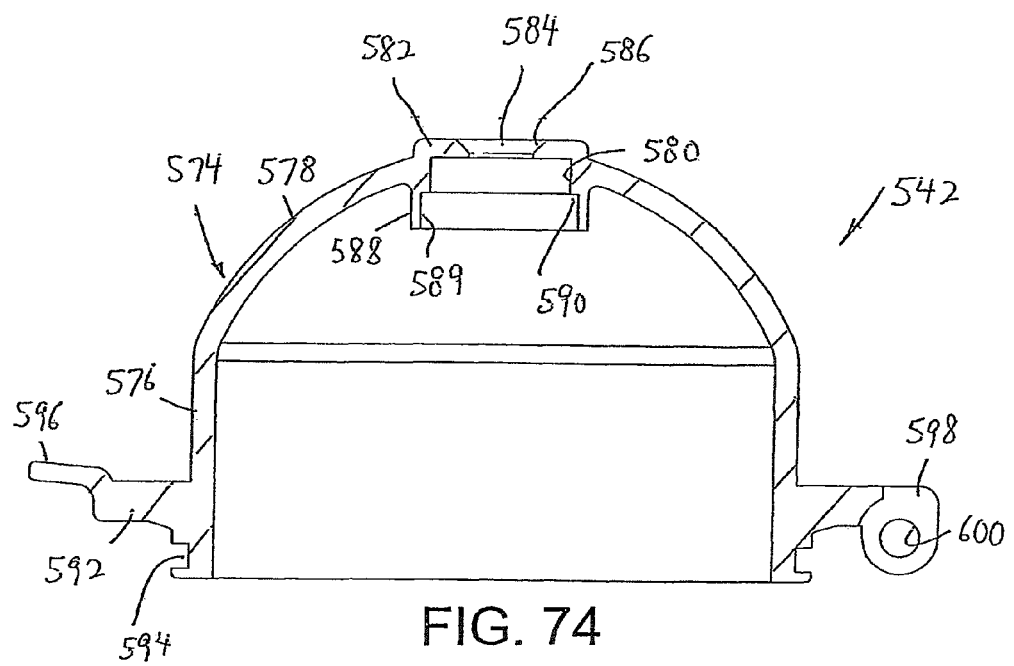
FIG. 74 is a cross-sectional view of the top domed cover section, taken along line 74-74 of FIG. 71.

A copper inlet connect 524 (FIGS. 64 and 65) is inserted in each water inlet opening 420 of brewing tea support 406. Each inlet connect 524 includes a lower cylindrical body 526 having an outer circumferential groove 528 in which a sealing ring (not shown) is fitted. A reduced diameter upper cylindrical body 530 is formed at the upper end of lower cylindrical body 526 and terminates at its upper end by a frusto-conical section 532. A through bore 534 of a first diameter extends through lower cylindrical body 526 and is fluidly connected with a through bore 536 of a second smaller diameter through upper cylindrical body 530 and frusto-conical section 532. As a result, a jetting action occurs which accelerates the hot water exiting smaller diameter through bore 536 and water inlet openings 420.

Referring now to FIGS. 66-75, brewing assembly 6 further includes a removable brewing chamber assembly 538 for containing the brewable substance during a brewing operation and which is removably fit within brewing tea support 406. Removable brewing chamber assembly 538 includes a bottom cup section 540 and a top domed cover section 542 hinged to bottom cup section 540 by a hinge 544 for pivotal movement between a raised open configuration and lowered closed configuration.

Bottom cup section 540 includes a frusto-spherical cup body 546 having an outer annular ledge 548 extending outwardly from the outer wall thereof, spaced slightly below the upper edge thereof, and an inner annular ledge 550 extending inwardly from the inner wall thereof, spaced slightly below the upper edge thereof. A hinge knuckle 552 of hinge 544 extends outwardly from the outer surface of cup body 546 at and through an open portion of the outer annular ledge 548, and includes a through opening 554.

The bottom of cup body 546 is provided with a large central opening 556 partially closed by an annular bottom wall 558 of cup body 546. Annular bottom wall 558 is partially closed by a closure plate 560 formed by an annular ring plate 562 and four equiangularly arranged rib plates 564 extending inwardly from annular ring plate 562 and connected at a center thereof, thereby defining four quadrant openings 566. The thickness of closure plate 560 is less than the thickness of bottom wall 558, with the bottom surface of closure plate 560 being flush with the bottom surface of bottom wall 558. As a result, an annular shoulder 567 is formed at the upper surface of annular ring plate 562.

Two diametrically opposite L-shaped guide walls 568 extend from the outer surface of frusto-spherical cup body 546, and during a brewing operation, are positioned snugly within L-shaped recesses 419 defined by guide walls 418 of brewing tea support 406.

In addition, two small diametrically opposite through openings 570 are formed in frusto-spherical cup body 546, at right angles to the positions of L-shaped guide walls 568. Openings 570 are offset from a center line of said cup body 546. When L-shaped guide walls 568 are guided into L-shaped recesses 419, the lower ends of openings 570 are positioned in sealing relation over and in fluid communication with the through bore 536 of the respective inlet connect 524 so that hot water is jetted through openings 570 into removable brewing chamber assembly 538. In order to obtain optimal swirling and more preferably, turbulent agitation, conditions of the hot water with the brewable substance, openings 570 are angled slightly inwardly so as to meet at a point 571 (FIG. 75) slightly below the top center of top domed cover section 542. This results in greater turbulence of the water entering removable brewing chamber assembly 538 so as to better force the water into mixing engagement with the brewable substance therein. In this regard, it is noted that whereas a swirling action results in the water and brewable substance moving at the same speed and in the same direction so that there is some, but not a lot of interaction, agitation, and specifically, turbulent agitation results in changes in direction of the water moving into the brewable substance, causing much greater interaction between the water and brewable substance.

Bottom cup section 540 further includes an elongated handle 572 extending outwardly from the upper edge of frusto-spherical cup body 546 at a position diametrically opposite to hinge knuckle 552. This permits a person to remove removable brewing chamber assembly 538 from brewing tea support 406 after a brewing operation and to place removable brewing chamber assembly 538 into brewing tea support 406 to start a brewing operation. Handle 572 extends out from either transverse opening section 333 of brewing upper support 316 and rectangular cut-out section 400 of front cover 378.

A circular mesh screen identical to circular mesh screen 512 with small mesh openings 514 sits on annular, ring plate 562 and ribs 564, and a closure plate identical to closure plate 516 seats on the mesh screen and fits snugly within annular bottom wall 558 such that the upper surface of the closure plate is flush with the upper surface of annular bottom wall 558. Thus, as with closure plate 516, this closure plate includes an annular ring plate and four equiangularly arranged rib plates extending inwardly from the annular ring plate and connected at a center thereof, thereby defining four quadrant openings.

Top domed cover section 542 includes a dome 574 which has a lower cylindrical section 576 that is closed at its upper end by a transparent part-spherical section 578 made of glass or plastic. An opening 580 is formed centrally in the upper part of part-spherical section 578. An annular wall 582 extends inwardly from the upper edge of part-spherical section 578 at opening 580 and defines a smaller opening 584 with an upper annular beveled wall 586 at opening 584. An annular skirt 588 extends down from the upper edge of part-spherical section 578 in surrounding relation to opening 580 and defines a larger opening 589, thereby defining an annular shoulder 590.

An annular ledge 592 extends outwardly from the lower edge of cylindrical section 576 at a short distance spaced from the lower edge thereof, and an annular groove 594 is formed in the portion of cylindrical section 576 below annular ledge 592.

A short handle 596 extends radially outward from annular ledge 592 and two spaced apart knuckles 598 extend outwardly from annular ledge 592 in diametrically opposed relation to handle 596, with knuckles 598 including aligned openings 600.

With this arrangement, a pin 602 is inserted through openings 554 and 600 in aligned knuckles 552 and 598 to hingedly secure top domed cover section 542 to bottom cup section 540. Further, an O-ring 603 (FIG. 75) is inserted in groove 594. Thus, when top domed cover section 542 is in a closed position, the lower surface of annular ledge 592 seats on the upper edge of frusto-spherical cup body 546 of bottom cup section 540, and the portion of cylindrical section 576 below annular ledge 592, along with O-ring 603 in groove 594, fits within frusto-spherical cup body 546, with O-ring 603 forming a seal with the inner surface of frusto-spherical cup body 546.

In accordance with the present invention, removable brewing chamber assembly 538 is arranged to better force the water into the brewable material, particularly where the material consists of tea leaves, to better extract the flavor from the tea leaves. This is accomplished by permitting air to escape removable brewing chamber assembly 538 during initial filling of the hot water therein, but which pressurizes removable brewing chamber assembly 538 once it is filled with hot water and the air escapes therefrom. This also prevents air or vapor lock at the upper end of removable brewing chamber assembly 538 during filling of the hot water therein. The result of jet openings 570 and the pressurization of removable brewing chamber assembly 538, provides agitation and turbulence of the hot water entering removable brewing chamber assembly 538, providing an improved mixing of the water with the material therein, to better extract the flavor from the material.

In this regard, a tank cover ring 604 (FIGS. 75-78) is press fit in opening 580 of top domed cover section 542. Tank cover ring 604 includes an outer annular wall 606 having a circumferential bead 608 on the outer surface thereof which presses into the inner wall 588 that defines opening 580 to create a seal thereat. When thus assembled, the lower edge of outer annular wall 606 is flush with annular shoulder 590. An inwardly directed annular top wall 610 is connected at the upper end of outer annular wall 606 and abuts against the lower surface of annular wall 582 when assembled, thereby defining an inlet opening 612 of similar diameter as the lower end of smaller opening 584 of top domed cover section 542. An inner annular, resilient guide wall 614 extends downwardly at an inward angle from the inner edge of top domed cover section 542, forming a smaller opening 616 at the lower annular end thereof.

As shown in FIGS. 75, 76 and 79-83, a tank cover filter 618 is press fit within outer annular wall 606 of tank cover ring 604. Specifically, tank cover filter 618 includes an upper annular wall 620 having an outer diameter similar to the inner diameter of outer annular wall 606 of tank cover ring 604 so as to be press fit therein. Tank cover filter 618 further includes a lower annular wall 622 of a greater diameter than upper annular wall 620. A central annular connecting wall 624 connects together upper annular wall 620 with lower annular wall 622 and has an outer diameter equal to the outer diameter of lower annular wall 622 and an inner diameter equal to the inner diameter of upper annular wall 620. Four equiangularly arranged ribs 626 extend inwardly from the inner surface at the lower end of central annular connecting wall 624 and are connected at a center thereof, thereby defining four quadrant openings 628.

As shown in FIGS. 75, 76, 82 and 83, an annular securing plate 630 is provided in tight surrounding relation to the lower end of annular wall 588 of top domed cover section 542, so as to press annular wall 588 inwardly and thereby ensure the securement of tank cover ring 604 and tank cover filter 618. Annular securing plate 620 includes an upper beveled surface 632 which conforms and abuts against the inner surface of top domed cover section 542, and a lower curved surface 634.

Figure 75:
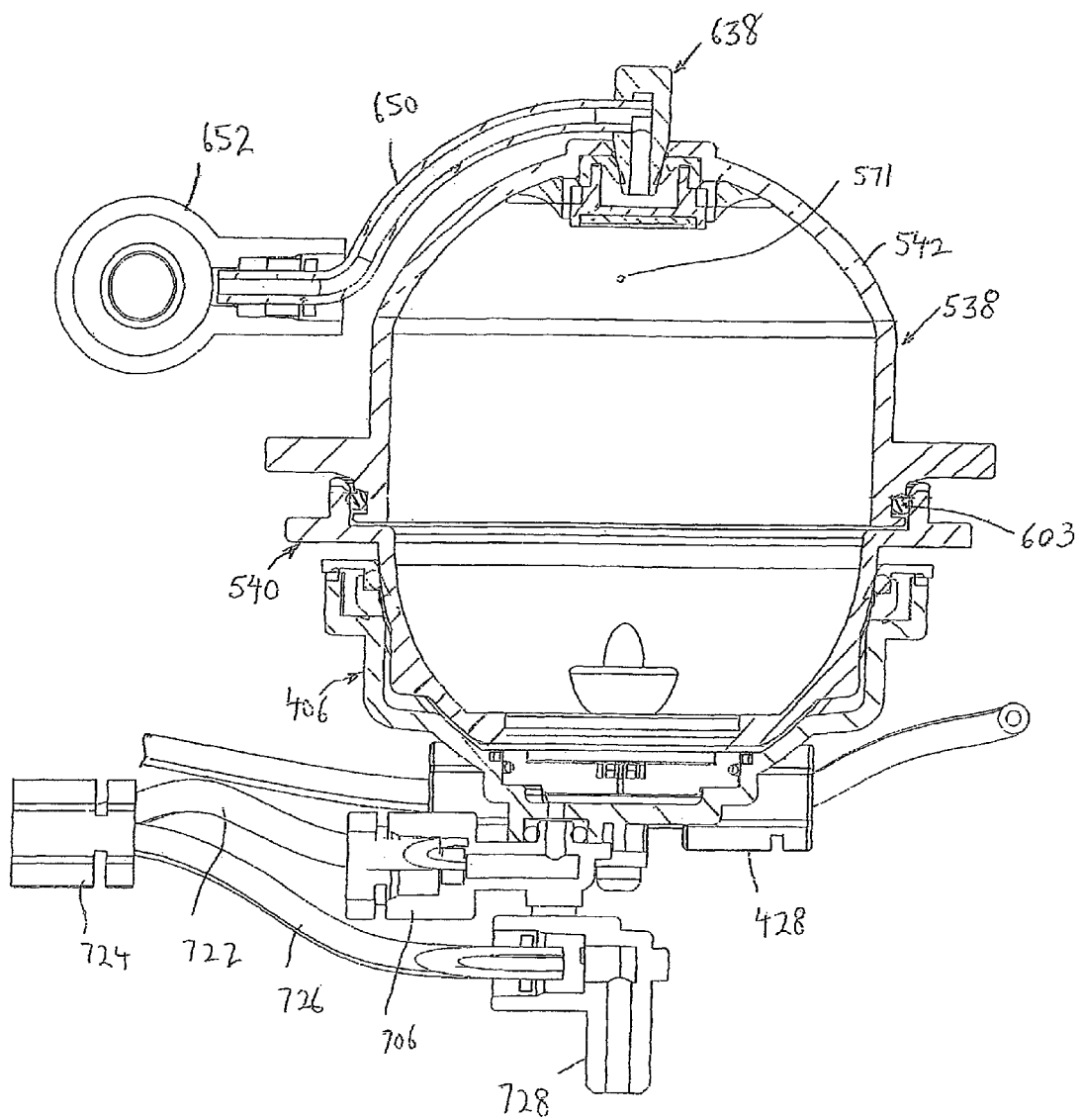
FIG. 75 is a cross-sectional view of the removable brewing tank assembly.
Figure 76:
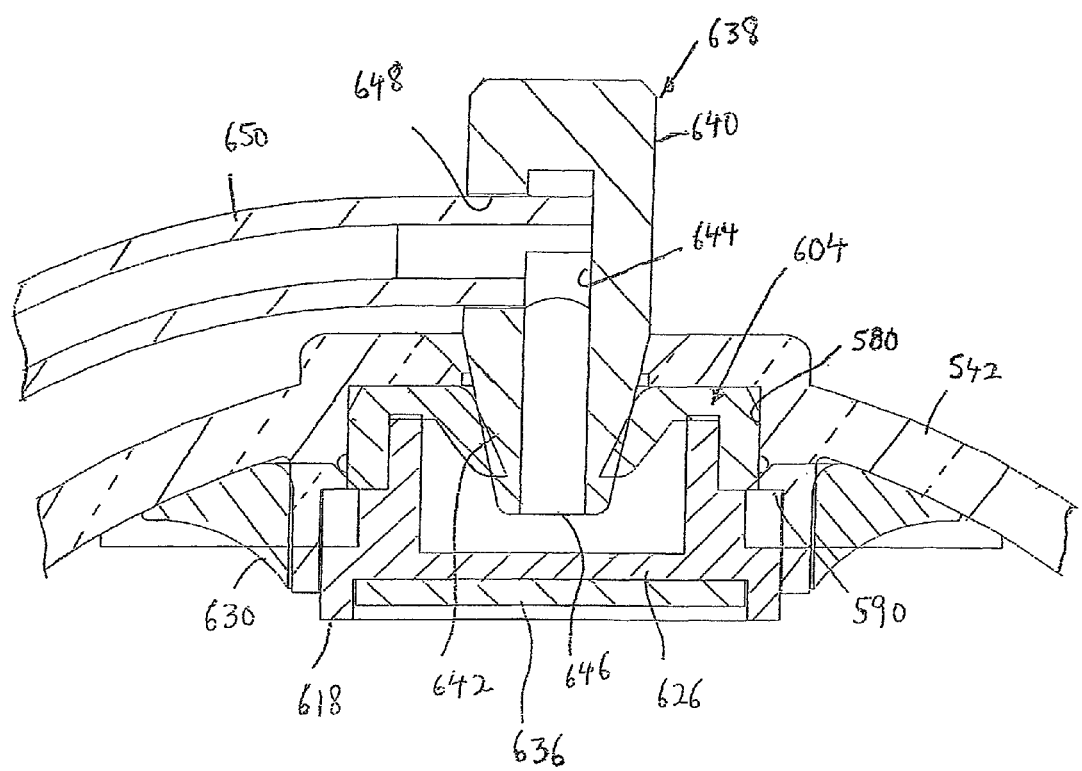
FIG. 76 is an enlarged cross-sectional view of the upper open end of the top domed cover section of the removable brewing tank assembly.
Figure 77:
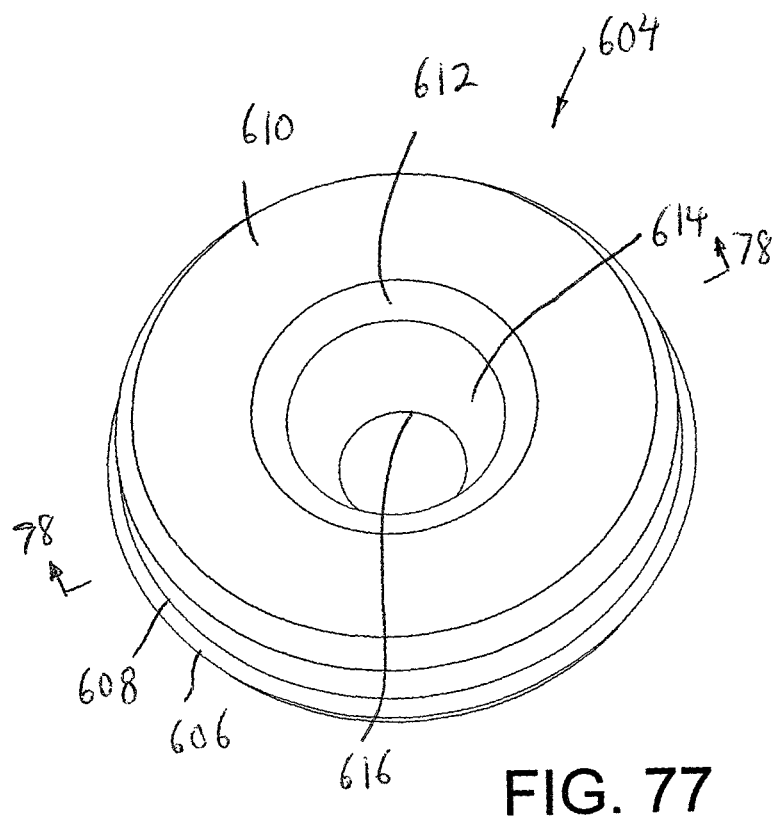
FIG. 77 is a top perspective view of the tank cover ring that is secured in the upper open end of the top domed cover section.
Figure 78:
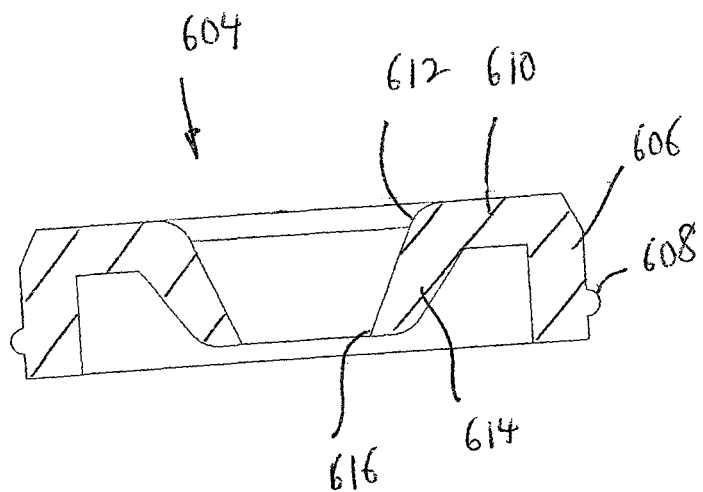
FIG. 78 is a cross-sectional view of the tank cover ring of FIG. 77, taken along line 78-78 thereof.
Figure 79:
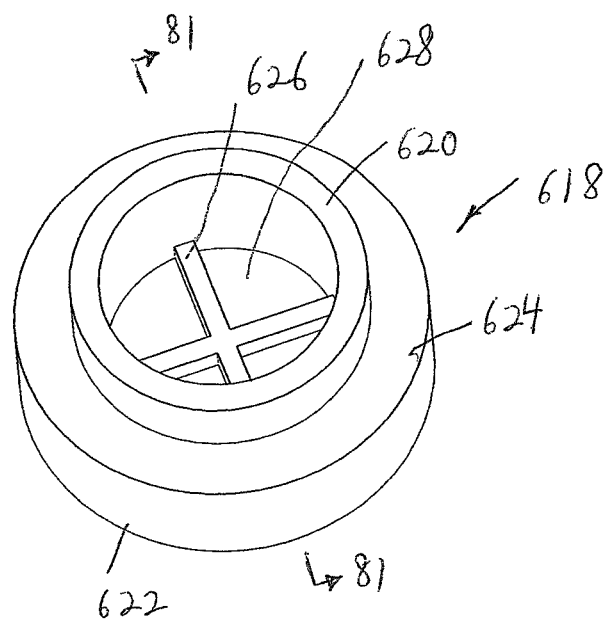
FIG. 79 is a top perspective view of the tank cover filter that is secured in the upper open end of the top domed cover section.
Figure 80:
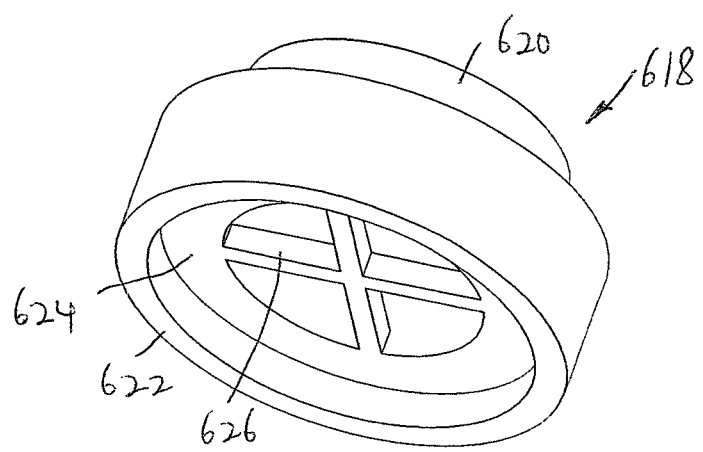
FIG. 80 is a bottom perspective view of the tank cover filter.
Figure 81:
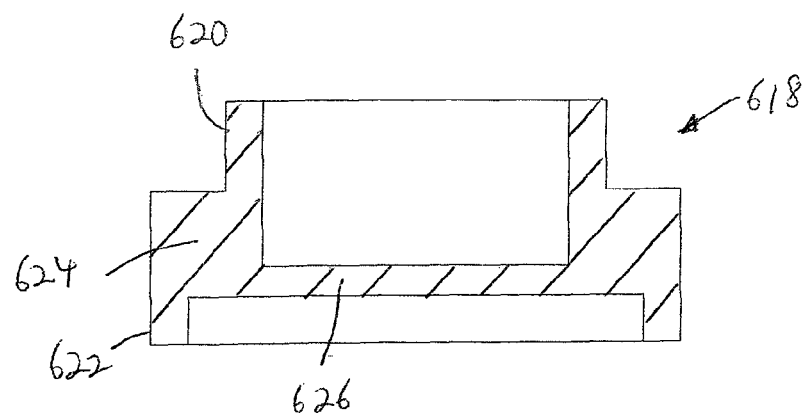
FIG. 81 is a cross-sectional view of the tank cover filter of FIG. 79, taken along line 81-81 thereof.
Figure 82:
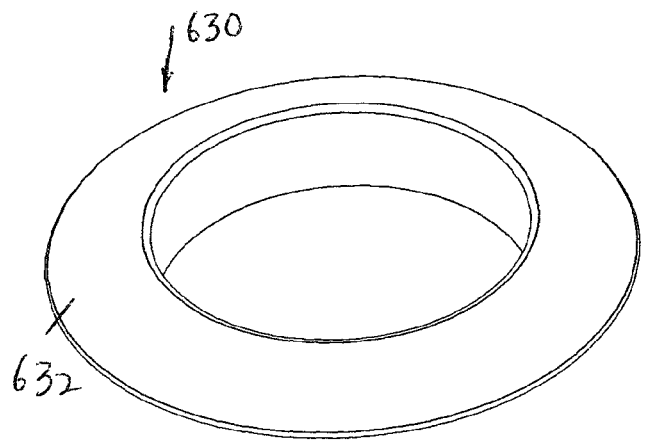
FIG. 82 is a top perspective view of the annular securing plate that is secured in the upper open end of the top domed cover section.
Figure 83:
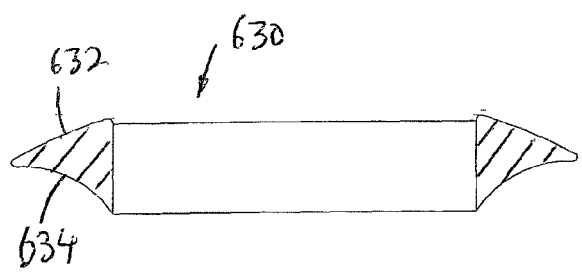
FIG. 83 is a cross-sectional view of the annular securing plate of FIG. 82, taken along line 83-83 thereof.

As shown in FIGS. 75 and 76, a closure plate 636 which is identical in construction to closure plate 516, fits snugly within lower annular wall 622 with the upper surface thereof in abutment against the lower surface of central annular connecting wall 624. A mesh screen (not shown) can be fit therebetween.

Figure 84:
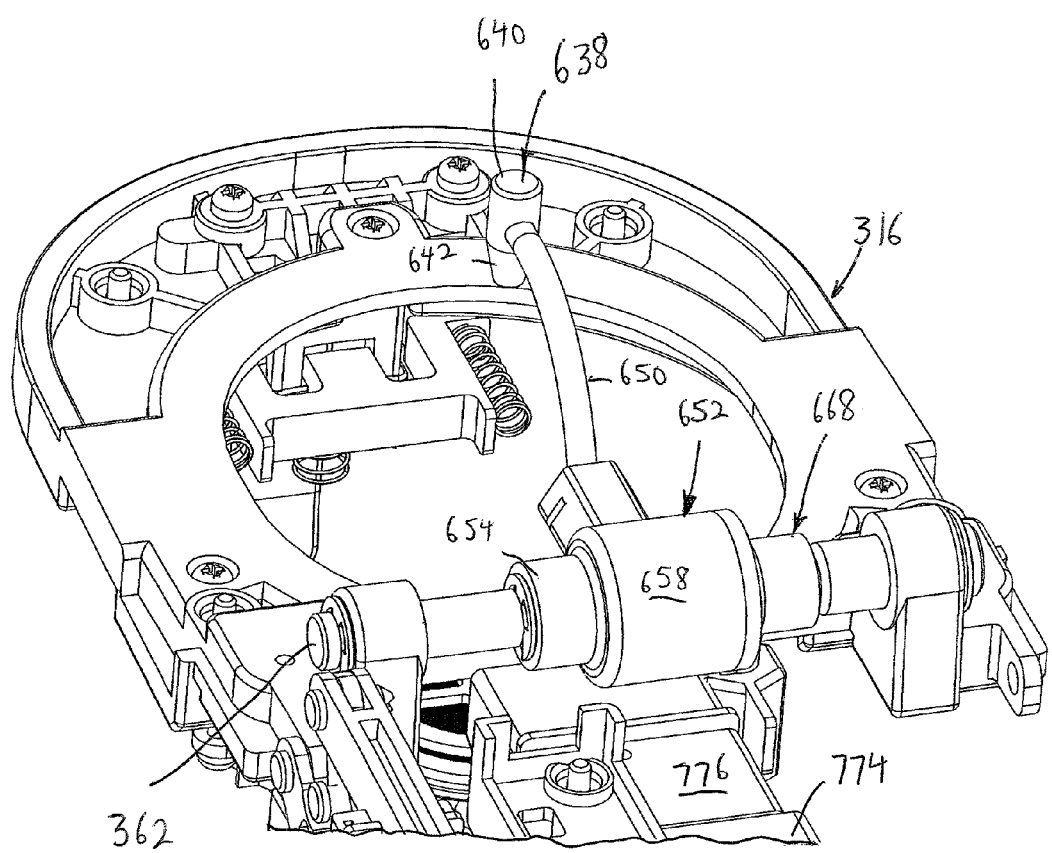
FIG. 84 is a perspective view of part of the machine which shows the exhaust head connected to the air rotary member.

As shown best in FIGS. 75, 76 and 84, an exhaust head 638 is fit within opening 584 of top domed cover section 542 when front cover 378 is closed for exhausting air and in some situations, a small amount of overflow liquid if necessary, from removable brewing chamber assembly 538 during filling of hot water therein. Exhaust head 638, as shown in FIGS. 75, 76 and 84, includes a cylindrical upper section 640, and a frusto-conical lower section 642, with a center axial bore 644 therein which is open at an opening 646 at the lower end of frusto-conical lower section 642, and a side opening 648 at an outer surface of cylindrical upper section 640, which is in fluid communication with the upper end of center axial bore 644. As a result, any air that is forced to the upper end of removable brewing chamber assembly 538 during filling of hot water therein, will escape through opening 646, center axial bore 644 and side opening 648. The same occurs if there is any overflow of liquid which is forced out in the same manner.

One end of a rigid tube 650 is connected to side opening 648, and the opposite end of tube 650 is connected to an air rotary member 652 which is fixed on rotatable shaft 362. Thus, as brewing upper support 316 is raised with front cover 378, rotating of brewing upper support 316 causes rotatable shaft 362 to rotate, thereby also rotating air rotary member 652. Since exhaust head 638 is connected to air rotary member 652 by a rigid tube 650, exhaust head 638 is pivoted up with brewing upper support 316. Accordingly, removable brewing chamber assembly 538 can be removed at the end of a brewing operation, or can be refilled with a brewable substance and returned back to its position in brewing tea support 406 to start a new brewing operation. In the latter case, when brewing upper support 316 and front cover 378 are pivoted down to their closed positions, frusto-conical lower section 642 fits through smaller opening 616 of tank cover ring 604, forming a removable sealing fit with inner annular, resilient guide wall 614.

Figure 85:
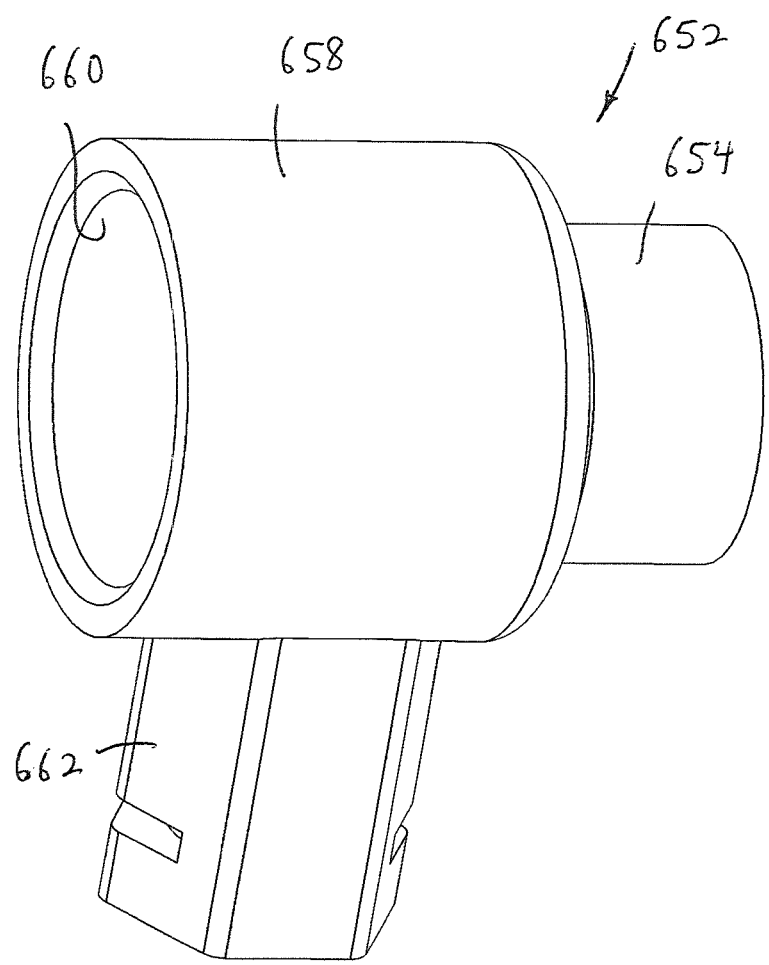
FIG. 85 is a perspective view of the air rotary member.
Figure 86:
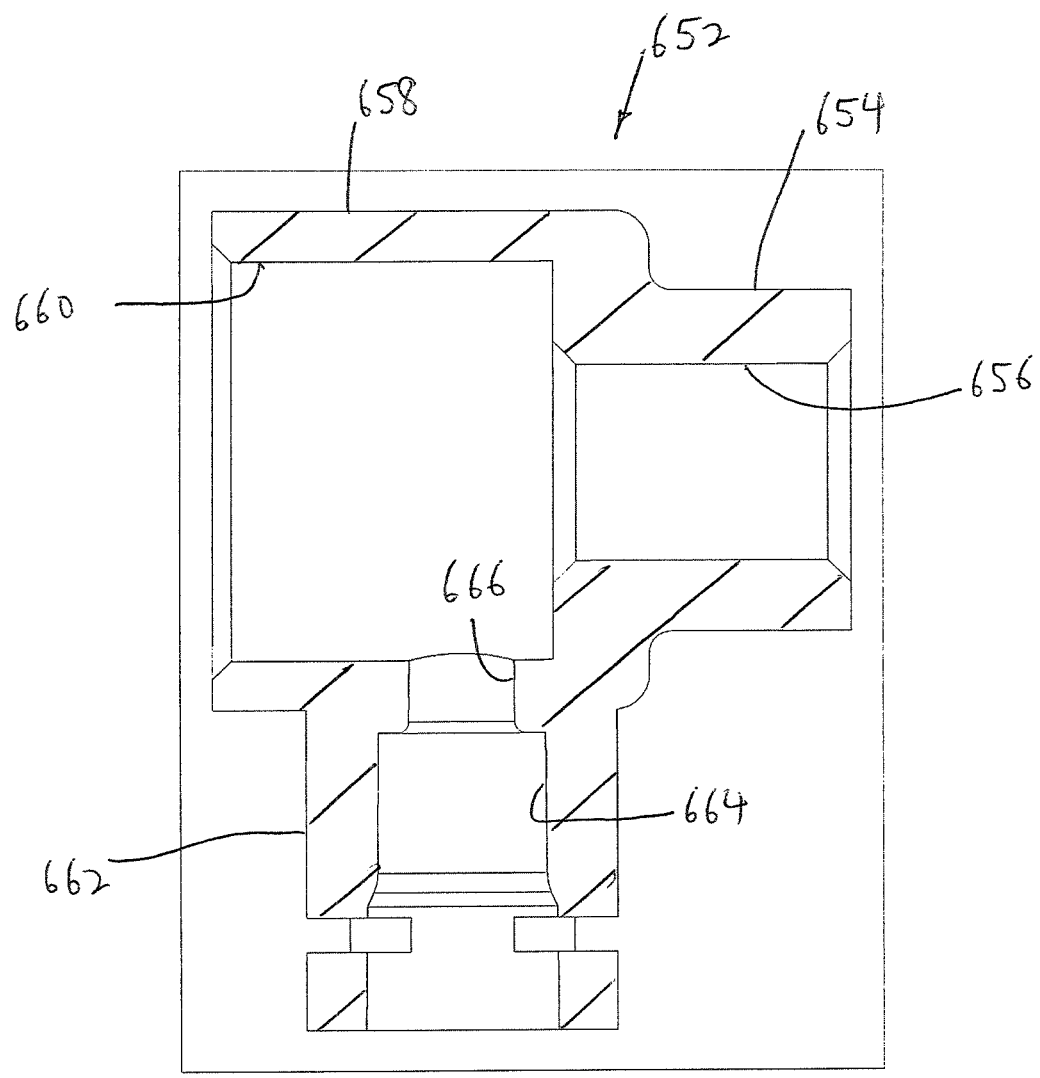
FIG. 86 is a cross-sectional view of the air rotary member.

As shown best in FIGS. 84-86, air rotary member 652 includes a first securing cylinder 654 having a central axial opening 656 of a first diameter and which is fixed to rotatable shaft 362. A second air chamber cylinder 658 having a central axial opening 660 of a second larger diameter is positioned in spaced relation around rotatable shaft 362 and is connected with first securing cylinder 654 in an axially aligned relation. A transverse pipe 662 having a central axial opening 664 is connected to an outer surface of second air chamber cylinder 658 and is fluidly connected with central axial opening 660 through a side opening 666 in second air chamber cylinder 658. The other end of rigid tube 650 is secured at the free end of transverse pipe 662. Thus, since first securing cylinder 654 is fixed to rotatable shaft 362, air rotary member 652 rotates with rotatable shaft 362, causing rigid tube 650 and exhaust head 638 to also rotate therewith, when front cover 378 is raised up. Further, as removable brewing chamber assembly 538 fills up with hot water, air therein is displaced upwardly and can escape through exhaust head 638, rigid tube 650 and second air chamber cylinder 658 of air rotary member 652.

Figure 87:
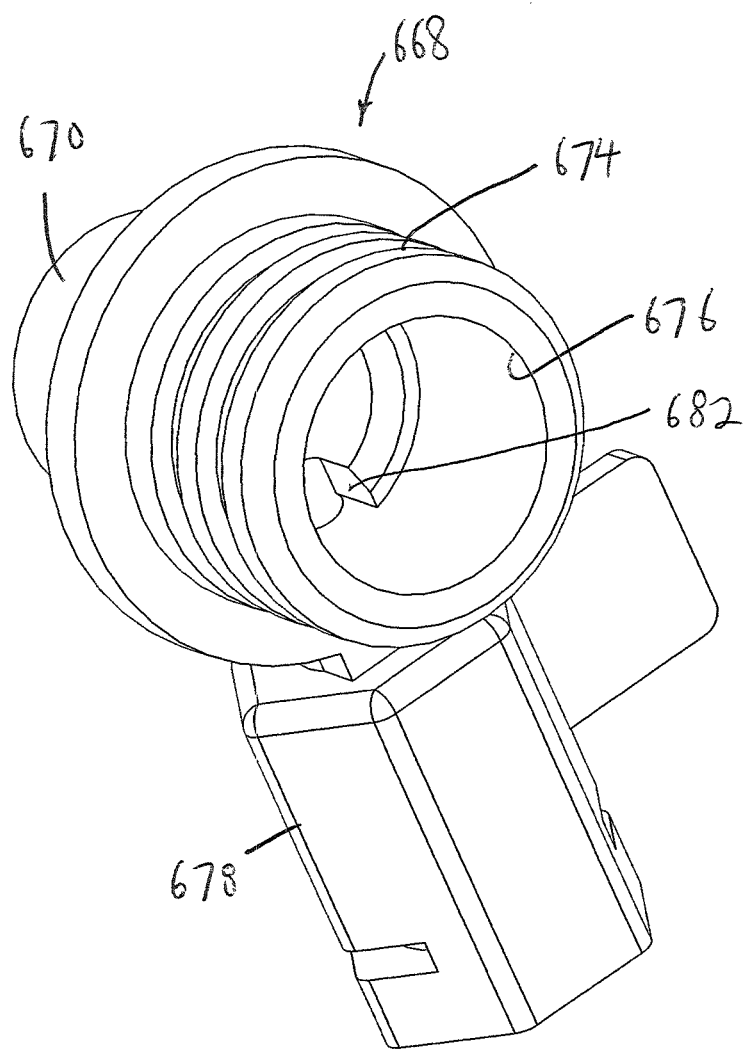
FIG. 87 is a perspective view of the air rotary connect.
Figure 88:
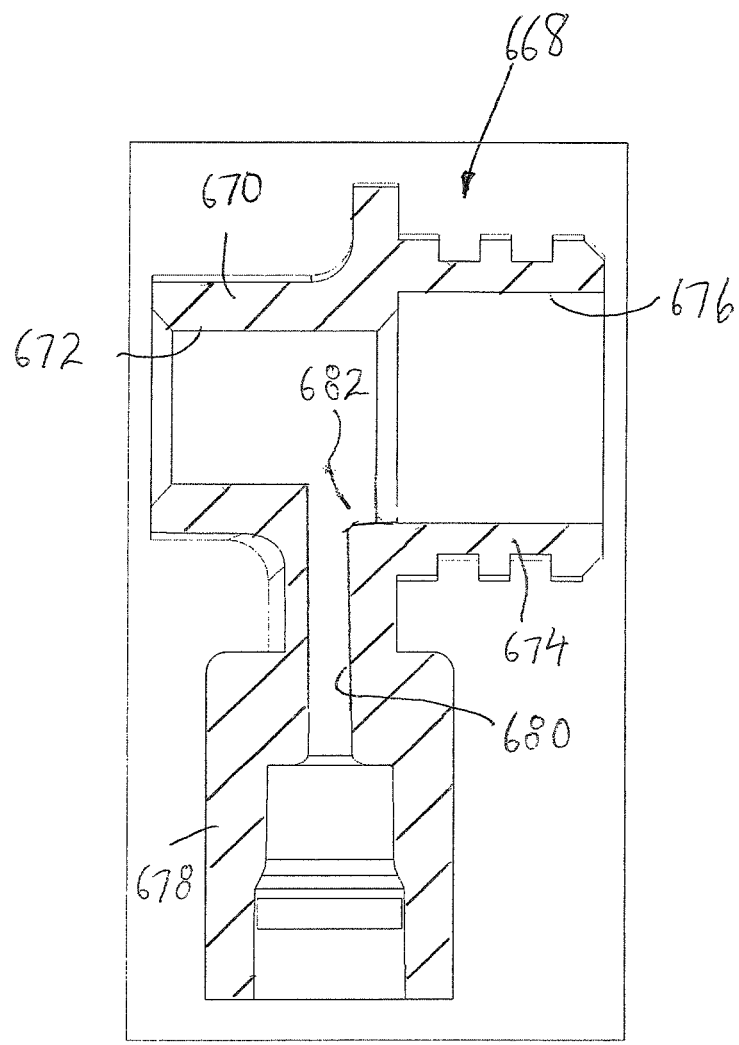
FIG. 88 is a cross-sectional view of the air rotary connect.

As shown in FIGS. 84, 87 and 88, an air rotary connect 668 is also mounted on rotatable shaft 362. Air rotary connect 668 includes a first securing cylinder 670 having a central axial opening 672 of a first diameter and which is fixed to rotatable shaft 362 in sealing contact. A second air chamber connect cylinder 674 having a central axial opening 676 of a second larger diameter is positioned in spaced relation around rotatable shaft 362 and is sealingly fitted in second air chamber cylinder 658 in an axially aligned relation. A transverse pipe 678 having a central axial opening 680 is connected to an outer surface of first securing cylinder 670 and is fluidly connected with central axial opening 676 through a side cut-away 682 in first securing cylinder 670.

Figure 89:
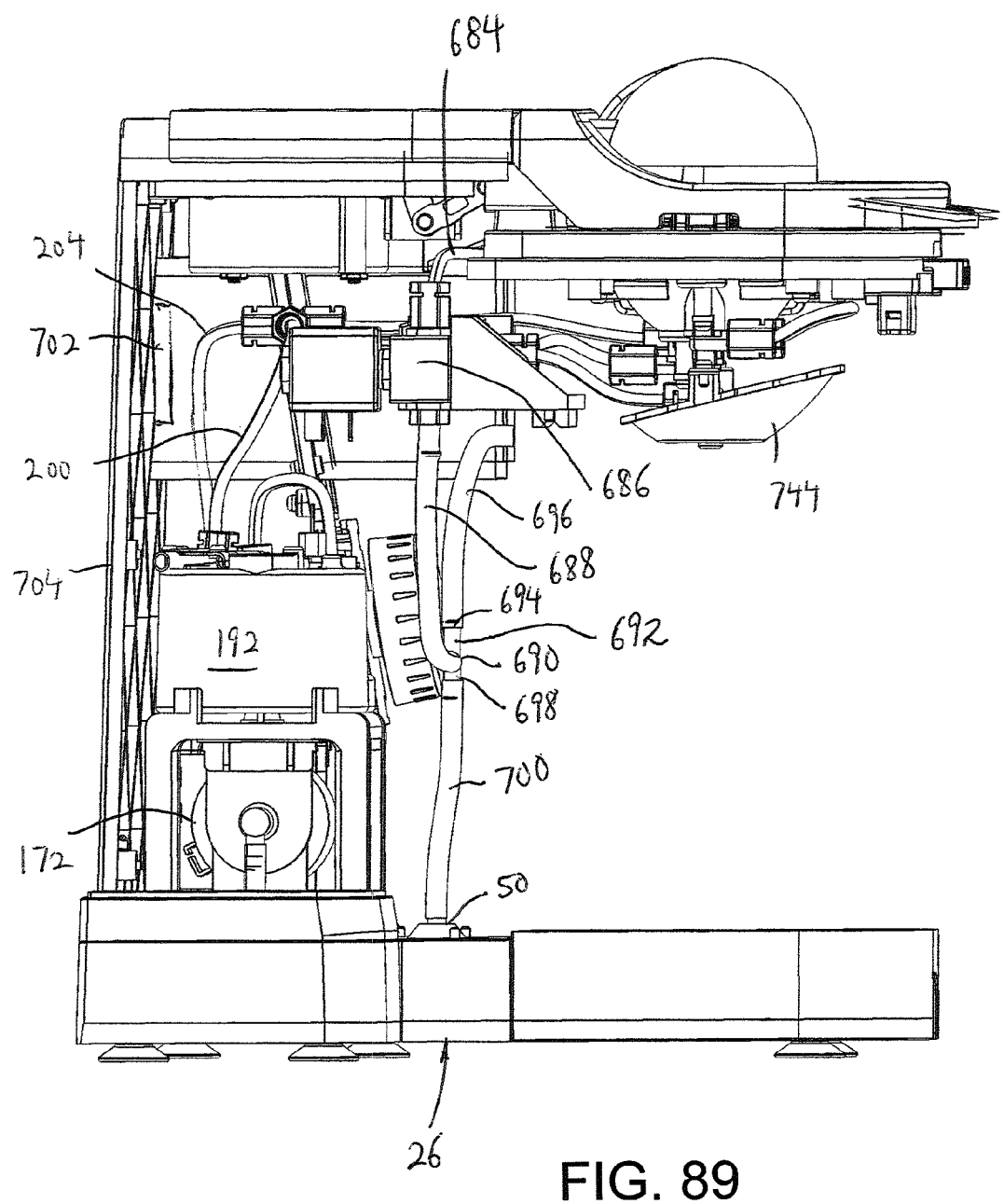
FIG. 89 is a side elevational view of the machine with the housing and water tank removed.

As shown in FIG. 89, a tube 684 has one end connected to the free end of transverse pipe 678 in fluid communication with central axial opening 680 thereof, with the other end connected to an input of a solenoid valve 686, with the output of solenoid valve 686 being connected to one end of a tube 688. The other end of tube 688 is connected to an input 690 of a T-connector 692. The upper output 694 of T-connector 692 is connected to a tube 696, the free end of which exhausts to atmosphere. The lower output 698 of T-connector 692 is connected to a tube 700 that connects to nipple 50 of T-shaped hollow wall enclosure 26. As previously discussed, the lower end of nipple 50 is open and an arcuate guide wall 52 is provided so that any liquid supplied through nipple 50 will be directed to the area of cup platform support 40 as a drain.

Solenoid valve 686 is controlled by a microprocessor 702 (FIG. 89) mounted to rear panel 704 of the casing for machine 2.

It is important that the air at the upper portion of removable brewing chamber assembly 538 be evacuated therefrom during initial filling of the hot water therein. This prevents vapor lock at the upper end of removable brewing chamber assembly 538 during filling of the hot water therein. At the same time, it is important that removable brewing chamber assembly 538 be pressurized once it is filled with hot water and the air escapes therefrom. As a result, the pressure in removable brewing chamber assembly 538 is elevated, which serves to better force the water into the tea leaves to better extract the flavor from the tea leaves in a shorter amount of time.

In this regard, microprocessor 702 controls solenoid valve 686 to permit evacuation of air from removable brewing chamber assembly 538 during filling of the same with hot water. The evacuated air is exhausted to atmosphere through tube 696. When the level of hot water in removable brewing chamber assembly 538 reaches a certain height, microprocessor 702 closes solenoid valve 686 to prevent exhaustion of any more air. At this time, the air is still forced out of removable brewing chamber assembly 538. However, it is trapped between removable brewing chamber assembly 538 and solenoid valve 686. As more hot water enters removable brewing chamber assembly 538, the trapped air becomes pressurized, which serves to prevent escape of hot water from removable brewing chamber assembly 538 and to also pressurize removable brewing chamber assembly 538. At the end of a brewing operation, after no further hot water is input to removable brewing chamber assembly 538 and the level therein starts dropping, that is, a sufficient amount of the brewed liquid has exited removable brewing chamber assembly 538, the compressed air re-enters removable brewing chamber assembly 538 because the pressure of the compressed air is greater than the pressure within removable brewing chamber assembly 538. This serves to further aid in pushing the remainder of the brewed liquid, along with gravitational forces, out from removable brewing chamber assembly 538. If any liquid had previously escaped removable brewing chamber assembly 538 and was combined with the compressed air, this escaped liquid then travels through the open solenoid valve 686 to T-connect 692 and out through tube 700. After the level of brewed liquid in removable brewing chamber assembly 538 falls by a certain amount, solenoid valve 686 is again opened, whereby the inside of removable brewing chamber assembly 538 is open to atmospheric pressure which helps push the remainder of liquid out from removable brewing chamber assembly 538.

Figure 91:
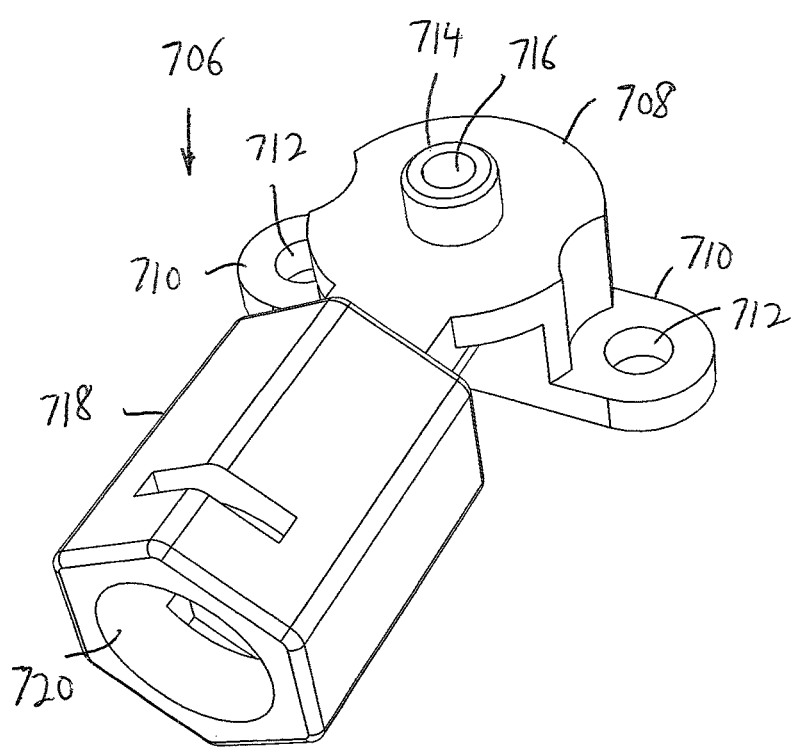
FIG. 91 is a perspective view of a first outlet connect.

In order to deliver the brewing beverage from removable brewing chamber assembly 538, after the brewing operation, the beverage exits quadrant openings 566 of bottom cup section 540 of removable brewing chamber assembly 538. The beverage then exits small opening 472 in brewing tea support 406. As shown in FIGS. 90 and 91, an outlet connect 706 is connected to the bottom of brewing tea support 406. Outlet connect 706 includes an inlet section 708 having connecting wings 710 on opposite sides thereof with openings 712 for receiving screws (not shown) that are threadedly received in threaded openings 478 of bosses 476 of brewing tea support 406. Inlet section 708 also includes a central boss 714 having an axial opening 716 which is fit within tube securing connection 474 of brewing tea support 406 so that the brewed beverage exiting small opening 472 exits through axial opening 716. Outlet connect 706 also includes an outlet section 718 having an outlet bore 720 in fluid communication with axial opening 716 and oriented perpendicular thereto.

A flexible tube 722 has one end connected to outlet bore 720 and the opposite end connected to an inlet of a solenoid valve 724, with the output of solenoid valve 724 being connected to one end of a tube 726. Solenoid valve 724 is controlled by microprocessor 702 mounted to rear panel 704 of the casing of machine 2.

Figure 92:
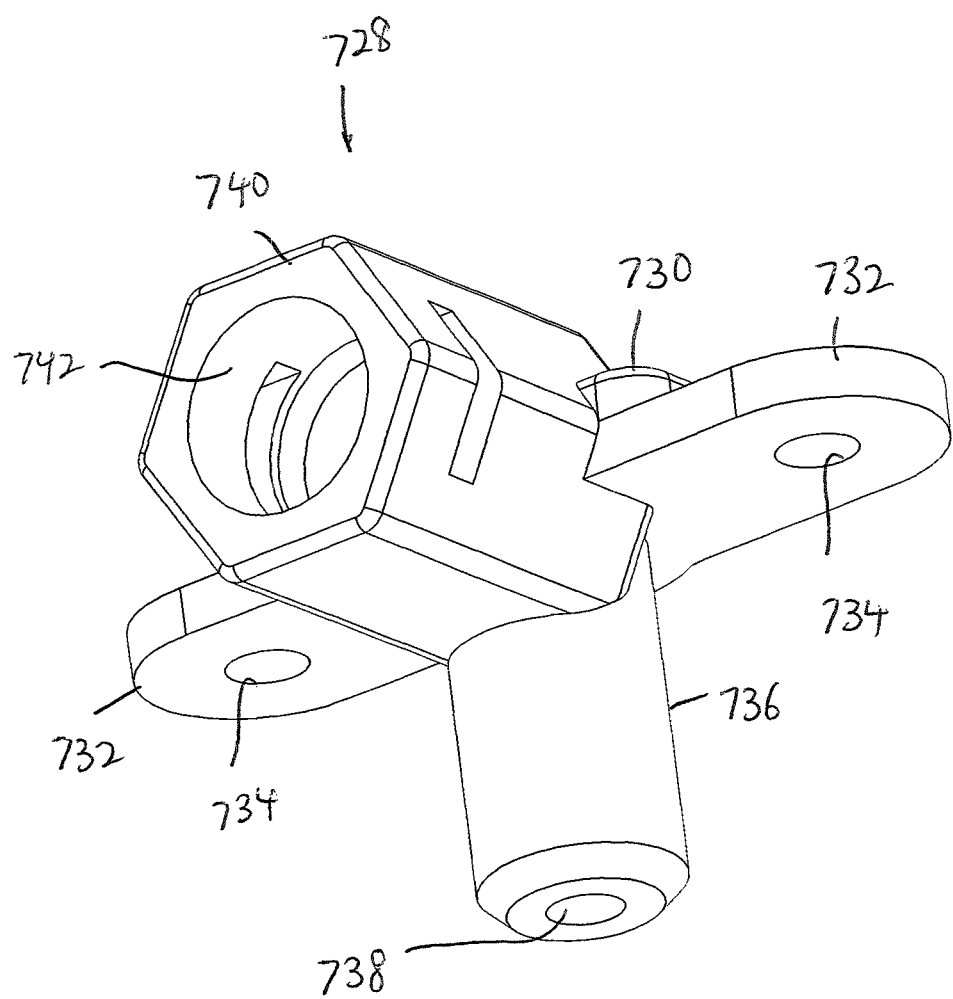
FIG. 92 is a perspective view of a second outlet connect.
Figure 93:
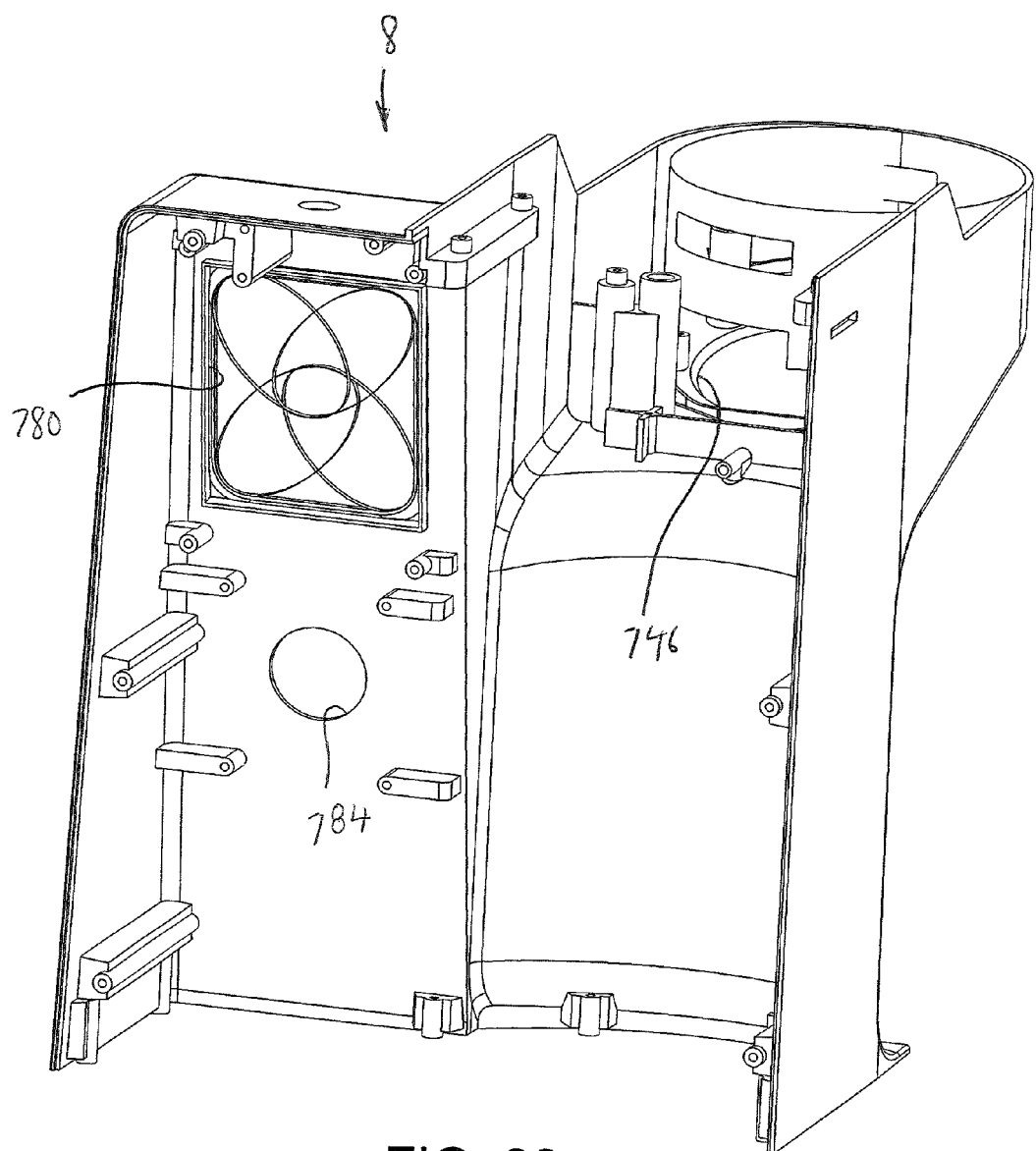
FIG. 93 is a rear perspective view of the housing.

The other end of tube 726 is connected to a discharge connect 728 (FIG. 92) having an outlet section 730 with connecting wings 732 on opposite sides thereof, with openings 734 for receiving screws (not shown). Outlet section 730 also includes a central boss 736 having an axial opening 738. Discharge connect 728 includes an inlet section 740 having an inlet bore 742 in fluid communication with axial opening 738 and oriented perpendicular thereto. The opposite end of flexible tube 722 is connected to inlet bore 742.

As shown in FIGS. 2 and 93-96, outlet connect 728 is connected with an outlet cover 744 that is mounted in a lower opening 746 at the front portion of housing 8, and extends partially out of lower opening 746. Outlet cover 744 includes a frusto-spherical cup wall 748 closed partially at its lower end by an annular bottom wall 750 having a central opening 752 through which central boss 736 of discharge connect 728 extends for delivering the brewed beverage to a cup or the like positioned on a tray 754 (FIG. 1) with holes 756 mounted on cup platform support 40 at the front of T-shaped hollow wall enclosure 26. It is the frusto-spherical cup wall 748 and annular bottom wall 750 that extend out of lower opening 748. Outlet cover 744 includes two projections 758 on opposite sides of central opening 752, each with a threaded opening 760 for securing connecting wings 732 of discharge connect 728 thereto by screws (not shown) extending through openings 734 into threaded engagement with threaded openings 760. Outlet cover 744 includes two diametrically opposite supporting wings 761 that seat on the top surface at the front of housing 8, and two raised hollow pedestals 762 having openings 764 for securing outlet cover 744 to housing 8 by screws (not shown) extending therethrough and into threaded engagement with threaded openings 766 in projections 768 at the upper surface of the front end of housing 8.

It will be appreciated that, during the brewing operation, the user can watch the turbulent agitation action of the brewable substance in removable brewing chamber assembly 538 by reason of transparent part-spherical section 578 of removable brewing chamber assembly 538 and transparent half-spherical dome 388 of front cover 378. However, because of the heat from the hot water in removable brewing chamber assembly 538, transparent half-spherical dome 388 and/or transparent part-spherical section 578 can get fogged up, thereby blocking this view of the turbulent agitation action.

Figure 97:
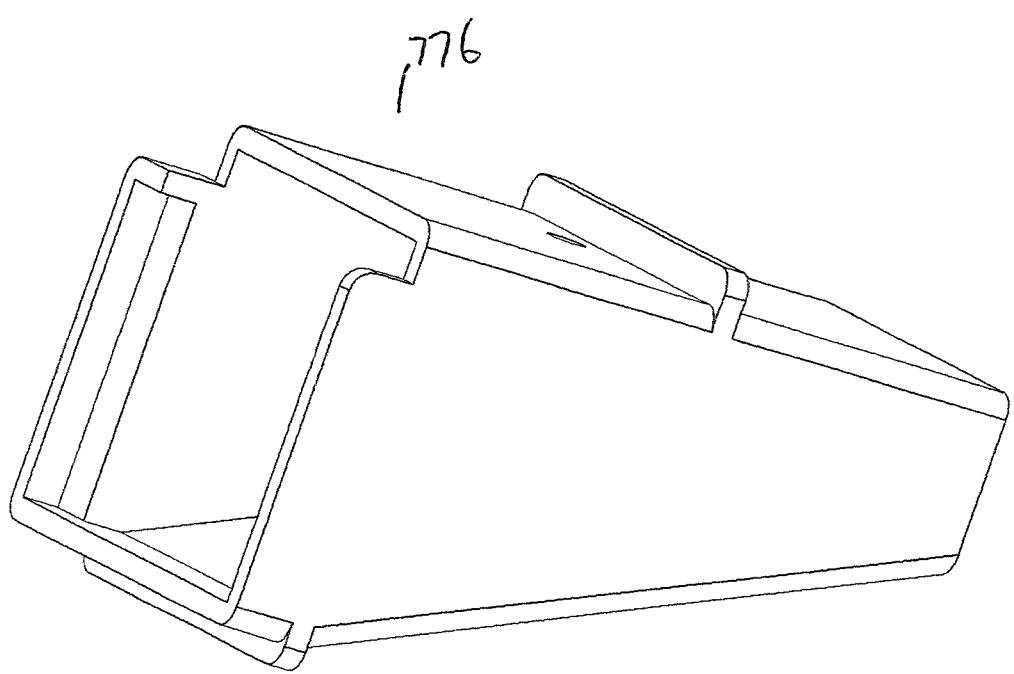
FIG. 97 is a perspective view of the fan connect tapering conduit.

Therefore, in accordance with the present invention, a fan 774 (FIGS. 43 and 84) is positioned behind and below rotatable shaft 362, and a fan connect tapering conduit 776 (FIG. 97) is connected to the output of fan 774, with the open output end of conduit 776 terminating at a position immediately below rotatable shaft 362 in order to blow air into the space between transparent half-spherical dome 388 and transparent part-spherical section 578 during a brewing operation. This prevents fogging up and condensation on transparent half-spherical dome 388 and/or transparent part-spherical section 578 during a brewing operation.

Alternatively, in place of, or in addition to, fan 774, a heater (not shown), for example, by heating wires or the like, could be provided on one or both domes 3881 and 578, to equalize temperatures to prevent fogging.

In order to start and control the brewing operation, brewable beverage making machine 2 includes the aforementioned microprocessor 702, a display screen 778 which is viewable through an opening 780 in housing 8, and a control knob/button 782 which extends out through an opening 784 in housing 8. Microprocessor 702 is connected to solenoid valves 686 and 724, water pump 172, water heater 192, air pump 206, fan 774 and to display screen 778, to control operation thereof, and control knob/button 782 controls operation of microprocessor 702, the results of which are displayed on display screen 778.

Specifically, display screen 778 is controlled by microprocessor 702 to display information, such as the temperature of the water, the brewing time and pressure settings in removable brewing chamber assembly 538, as well as the brewing status, that is, whether a brewing operation is presently taking place and the time remaining, as well as other parameters. Control knob/button 782 is used to control the settings by a combination push button action and turning of control knob/button 782, in accordance with displayed indications on display screen 778. Thus, for example, at the start of a brewing operation, an initial screen request may ask the user to input certain settings such as the brewing time, which the user can increase or decrease by turning of control knob/button 782 and then depressing control knob/button 782 when the desired setting is achieved and which is then displayed on display screen 778. This can continue for each setting, such as temperature, pressure, leaf size of the tea leaves, etc. The user may, however, be able to indicate predetermined settings stored in memory by microprocessor 702, for a desired brewable substance, for example, for a particular type of tea for which there are stored settings, which may be pre-stored or alternatively, pre-set by the user. Thus, there may be preset parameters that are stored, or alternatively, the user can set customizable parameters.

In operation, push button 282 is depressed inwardly in order to unlock and open front cover 378. Top domed cover section 542 of removable brewing chamber assembly 538 is raised up relative to bottom cup section 540, and filled with a brewable substance, for example, medium size tea leaves, and then closed. Removable brewing chamber assembly 538 is then inserted into brewing tea support 406. In such position, openings 570 of removable brewing chamber assembly 538 are positioned in sealing alignment with water inlet openings 420 of brewing tea support 406 in order to jet hot water into removable brewing chamber assembly 538.

Water tank 4 is also filled with water, either by removing cover 106 thereof and pouring water into water tank 4, or removing the entire water tank 4, filling the same at a sink or the like, and returning water tank 4 in position. When removed to fill the same, tank valve 120 closes off the bottom opening 114 to prevent escape of water from water tank 4. When water tank 4 is inserted on T-shaped hollow wall enclosure 26, tank valve 120 is opened by valve actuating projections 94 of valve actuator 86 to permit the flow of water out through bottom opening 114.

The user then sets the parameters for the brewing operation by control knob/button 782, and starts the brewing operation by pressing in control knob/button 782 according to the directions on display screen 778.

At such time, solenoid valve 686 is opened by microprocessor 702 to permit air in removable brewing chamber assembly 538 to escape during the initial filling of removable brewing chamber assembly 538 with water. At the same time, solenoid valve 724 is closed by microprocessor 702 to prevent the discharge of liquid from removable brewing chamber assembly 538. Also, water pump 172 is controlled by microprocessor 702 to pump liquid from water tank 4 through water heater 192, which is also activated by microprocessor 702. The temperature of the water that is heated by water heater 192 can be controlled by the on/off times of water heater 192 as well as the current flowing through the heating coils in water heater 192. In this regard, there is preferably a temperature sensor (not shown) in water heater 192 or further down the line, that sends a signal back to microprocessor 702 as to the temperature of the heated water.

As a result of the pump action of water pump 172, the heated water is heated in water heater 192 and pumped under pressure through water inlet openings 420 of brewing tea support 406, and specifically, each inlet connect 524 in water inlet openings 420, and through openings 570 formed in frusto-spherical cup body 546 of removable brewing chamber assembly 538. Each opening 570 is angled slightly inwardly, so as to meet at point 571 slightly below the top center of top domed cover section 542. This, in combination with the pressure of the jetted water, causes a swirling and more preferably, turbulent agitation, action of the tea leaves or other brewable substance in removable brewing chamber assembly 538.

As the heated water fills removable brewing chamber assembly 538, a water level sensor (not shown) therein sends a signal back to microprocessor 702. As it fills with water, air in removable brewing chamber assembly 538 is evacuated through solenoid valve 686, and then out through tube 688, T-connector 692 and tube 696, where it exhausts to atmosphere. If any liquid exits through the top of removable brewing chamber assembly 538, it exits through solenoid valve 686, and then out through tube 688, T-connector 692 and tube 700.

When the water level sensor senses that the water level in removable brewing chamber assembly 538 has reached a certain level, that is, filling removable brewing chamber assembly 538 with the air evacuated therefrom, solenoid valve 686 is closed. There is some air and/or water remaining in the space between closed solenoid valve 686 and the open top of removable brewing chamber assembly 538. As the water continues to fill removable brewing chamber assembly 538, the removed air in this space may become pressurized, which serves to prevent escape of water from the top of removable brewing chamber assembly 538, while also serving to pressurize the hot water in removable brewing chamber assembly 538. This also prevents air or vapor lock at the upper end of removable brewing chamber assembly 538 during filling of the hot water therein.

Because of the inclined angles of the jets and the pressurization of the water in removable brewing chamber assembly 538, the hot water is better forced into the brewable material, particularly where the material consists of tea leaves, to better extract the flavor from the tea leaves. As a result, agitation and turbulence of the hot water entering removable brewing chamber assembly 538 results, providing an improved mixing of the water with the brewable material therein, to better extract the flavor from the brewable material.

At this time, water pump 172 continues to try to supply water to removable brewing chamber assembly 538. However, since it is filled to capacity, this only serves to pressurize the water in removable brewing chamber assembly 538 which provides further interaction of the water and brewable substance.

When a sufficient brewing time has elapsed to effect sufficient extraction of the flavor from the brewable material, solenoid valve 724 is opened, whereby the brewed beverage is delivered in small amounts to central boss 736 of outlet connect 728 for delivering the brewed beverage to a cup or the like positioned on tray 754. In this regard, brewing time is defined as either residence time, that is, the length of time the water is held in contact with the brewable substance before being released out, or agitation time, that is, the length of time the water and the brewable substance are exposed to agitation.

At this time, hot water is still supplied to removable brewing chamber assembly 538. For example, if removable brewing chamber assembly 538 has a capacity of two ounces, supply of the hot water will continue as necessary to fill, for example, an eight ounce cup or even a pitcher, if desired.

Once the sufficient amount of hot water has been supplied, microprocessor 702 controls water pump 172 to shut off. At this time, air pump 206 is activated by microprocessor 702 to force air through openings 570 formed in frusto-spherical cup body 546 of removable brewing chamber assembly 538. This serves the dual purpose of re-creating the air pressure to force the brewable liquid out of removable brewing chamber assembly 538, as well as forcing any liquid out of T-connector 202 and the lines to openings 570 to clean the same out of any liquid. In other words, the forced air rises through the liquid in removable brewing chamber assembly 538 to the top of removable brewing chamber assembly 538, and this air aids in forcing the brewed liquid out from removable brewing chamber assembly 538.

It will be appreciated that the forced air can be a cooled air, which also serves to cool the brewed beverage, for example, at 34° F. so as not to freeze the brewed beverage. This is provided for making iced tea, iced coffee or the like.

At this time, solenoid valve 686 is still closed, so that the pressurized air between the top open end of removable brewing chamber assembly 538 and solenoid valve 686 serves to aid in the pushing out of the brewed beverage from removable brewing chamber assembly 538.

Once the brewed liquid has been forced out of removable brewing chamber assembly 538, solenoid valve 686 is once again opened, and solenoid valve 724 is closed. Push button 282 is then depressed inwardly in order to unlock and open front cover 378 in order to remove removable brewing chamber assembly 538 for another brewing operation.

It will be appreciated that various modifications can be made to the present invention within the scope of the claims herein.

Figure 98:
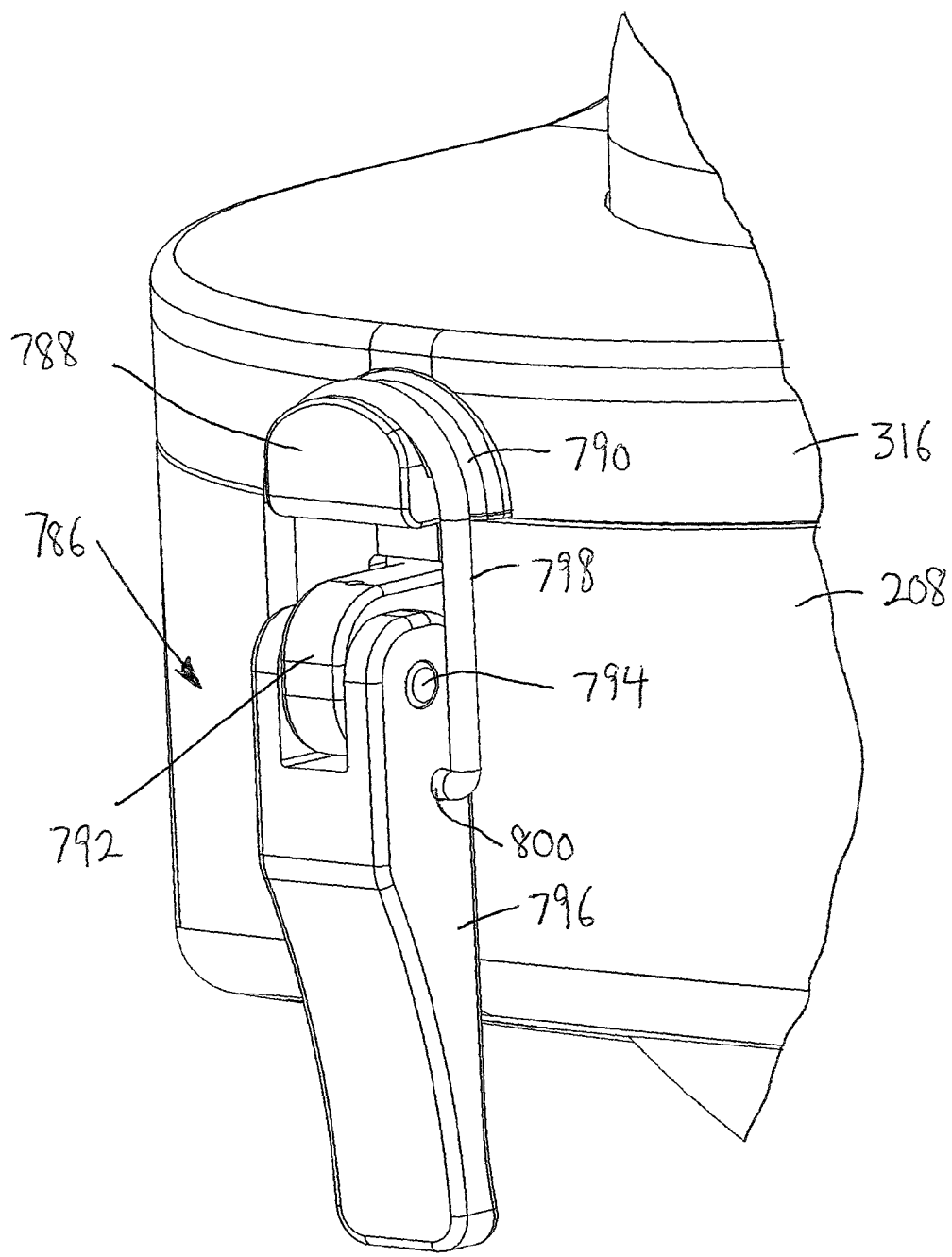
FIG. 98 is an enlarged perspective view of an alternative locking mechanism for the machine.

For example, instead of the pushbutton locking arrangement, a latch locking arrangement 786 can be provided, as shown in FIG. 98. Latch locking arrangement 786 includes a projection 788 extending outwardly from the front of brewing upper support 316, with the upper surface of projection 788 having an arcuate groove 790. A projection 792 extends outwardly from the front of brewing lower support 208 and has a pin 794 extending transversely therethrough. A lock handle 796 has one end pivotally mounted to pin 794, and a U-shaped wire clasp 798 has lower free ends 800 thereof inwardly turned and pivotally mounted to sides of lock handle 796 at positions below pin 794. In this manner, for locking during a brewing operation, lock handle 796 is pivoted upwardly about pin 794, and U-shaped wire clasp 798 is positioned in arcuate groove 790. Lock handle 796 is then rotated down about pin 794 to lock brewing lower support 208 and brewing upper support 316 during a brewing operation.

As a further modification, a float sensor is preferably incorporated into water tank 4 which tells the user to add more water. This is preferably connected to microprocessor 704 to inform the user via the display screen 778. Further, if the float sensor determines that there is insufficient water to operate machine 2, microprocessor 704 will disable machine 2 to prevent damage to the machine.

It will also be appreciated that brewing chamber assembly 538 need not be removable, but rather, can be fixed in position.

Further, although the present invention has been discussed with water as the mixing liquid, the present invention is not limited thereby, and any other suitable liquid can be used. For example, alcohol can be used as the liquid in order to extract the flavors from the substance therein.

In addition, it will be appreciated that solenoid valve 686 can be provided in place of exhaust head 638. The reason that solenoid valve 686 is displaced from, exhaust head 638 is for aesthetic reasons when viewing the assembly through the transparent domes 388 and 574.

As a further modification, an atomizing device 900 (FIG. 3) can be provided at the lower end of discharge connect 728, so that, as the tea exits opening 738, atomizing device 900 functions to break up the liquid tea into small mist-like droplets. As a result, the hot tea will cool quicker and can then be supplied to a glass having ice therein. This is because there is a larger surface area of the tea from the droplets that is exposed to the ambient atmosphere, which acts to cool down the tea quicker. Because the tea is cooled somewhat before hitting the ice, the tea will not completely melt the ice in the glass.

Atomizing device 900 can be any conventional atomizing device. For example, atomizing device 900 can simply be formed by a screen (not shown) with extremely small openings through which the liquid must travel, and which causes the liquid to disperse in a fine spray. Alternatively, for example, atomizing device 900 can use the known venturi effect. In this case, as a gas is injected under pressure through a tube with a decreasing section or venturi, it speeds up, generating a pressure drop at the narrowest point, due to Bernoulli's principle. The reduced pressure, due to the pressure difference between the two points, sucks up the liquid through a narrow tube into the moving gas flow, and projects it forward as a fine spray of droplets, similar to a traditional type of atomizer used for perfume.

It will be appreciated that reference to a dome in the present application is intended to mean a transparent of any shape and size, and is not limited to a part-spherical configuration.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention as defined by the appended claims.

What is claimed is:

1. A brewable beverage making machine, comprising:
- a brewing chamber assembly for holding a brewable substance therein, said brewing chamber assembly including:
  - at least one inlet opening for supply of an input liquid therein, the at least one inlet opening being sized and oriented to cause turbulent agitation of the input liquid and brewable substance in the brewing chamber assembly,
  - an outlet opening at an upper end of said brewing chamber assembly directly open to atmosphere for evacuating air from the upper end of said brewing chamber assembly, and
  - a discharge opening for discharging a brewed liquid from said brewing chamber assembly;
- a heater for heating the input liquid supplied to the brewing chamber assembly;
- an arrangement for supplying heated liquid from the heater through the at least one inlet opening;
- a first valve connected with the outlet opening;
- a control element for opening said first valve during initial filling of said brewing chamber assembly with said heated liquid to enable evacuation of air from the upper end of said brewing chamber assembly and for closing said first valve when said heated liquid reaches a predetermined level in said brewing chamber assembly to cause pressurization of the heated liquid in said brewing chamber assembly during a brewing operation.

2. A brewable beverage making machine according to claim 1,
- further comprising a brewing support assembly; and
- wherein said brewing chamber assembly is removably insertable in said brewing support assembly.

3. A brewable beverage making machine according to claim 2, wherein:
- said brewing support assembly includes a brewing lower support and a brewing upper support, with the brewing upper support and brewing lower support being movable relative to each other between a closed brewing position and an open position;
- said brewing lower support is fixed in position, and said brewing upper support is pivotally mounted relative to said brewing lower support; and
- said brewing chamber assembly is removably mounted in said brewing lower support.

4. A brewable beverage making machine according to claim 3, further including a locking mechanism for releasably locking the brewing upper support to the brewing lower support during a brewing operation.

5. A brewable beverage making machine according to claim 2, wherein said brewing support assembly includes at least one inlet opening therein that is aligned with the at least one inlet opening of the brewing chamber assembly when the brewing chamber assembly is inserted in said brewing beverage support, for supply of the input liquid to said brewing chamber assembly.

6. A brewable beverage making machine according to claim 1, wherein said brewing chamber assembly includes a bottom section and a top section, with the bottom section and the top section being movable relative to each other between a closed brewing position and an open position for removal and insertion of the brewable substance therein, and said top section includes a transparent dome to permit a user to view the turbulent agitation of the brewable substance and the input liquid during a brewing operation.

7. A brewable beverage making machine according to claim 1, wherein said brewing chamber assembly includes a bottom section and a top section, with the bottom section and the top section being movable relative to each other between a closed brewing position and an open position for removal and insertion of the brewable substance therein.

8. A brewable beverage making machine according to claim 7,
- wherein said top section includes a transparent dome to permit a user to view a turbulent agitation action of the brewable substance and the input liquid during a brewing operation, and
- further including a brewing support assembly in which said brewing chamber assembly is removably insertable, said brewing support assembly also including a transparent dome in covering spaced relation to the transparent dome of the top section.

9. A brewable beverage making machine according to claim 8, further comprising an arrangement to prevent fogging and condensation of the transparent domes during a brewing operation.

10. A brewable beverage making machine according to claim 9, wherein the arrangement to prevent fogging and condensation includes a fan for blowing air between said transparent domes to prevent fogging thereof during a brewing operation.

11. A brewable beverage making machine according to claim 1, wherein said at least one inlet opening is located at an offset position away from a center line of said brewing enclosure.

12. A brewable beverage making machine according to claim 1, wherein each inlet opening of said at least one inlet opening is sized to provide sufficient velocity of the input liquid to move the brewable substance and input liquid within said brewing chamber assembly with said turbulent agitation.

13. A brewable beverage making machine according to claim 1, wherein said at least one inlet opening includes at least two inlet openings at a lower section of said brewing chamber assembly, said at least two inlet openings being angled inwardly relative to a vertical.

14. A brewable beverage making machine according to claim 13, wherein said at least two inlet openings are angled upwardly and slightly inwardly toward each other so that the input liquid supplied through said at least two inlet openings meet at a position below the outlet opening.

15. A brewable beverage making machine according to claim 1,
- further comprising a second valve connected with the discharge opening; and
- said control element controls operation of said second valve to close said second valve during initial filling of said brewing chamber assembly with said heated liquid and to open said second valve when said heated liquid reacts with said brewable substance to create the brewed liquid in order to permit discharge of the brewed liquid from said discharge opening, as determined by at least one of the following:
a) pressure in the chamber, and
b) brewing time.

16. A brewable beverage making machine according to claim 15, wherein said brewing time is defined as one of the following:
    residence time which is a length of time the input liquid is held in contact with the brewable substance, and
    agitation time which is a length of time the input liquid and the brewable substance are exposed to agitation.

17. A brewable beverage making machine according to claim 1, wherein the arrangement for supplying heated liquid from the heater through the at least one inlet opening includes a pump for pumping the heated liquid from the heater through the at least one inlet opening.

18. A brewable beverage making machine according to claim 1, further comprising an air pump for pumping air into the brewing chamber assembly at the end of a brewing cycle, so as to aid in forcing out brewed liquid from the brewing chamber assembly.

19. A brewable beverage making machine according to claim 1, further comprising an air pump for pumping air into the brewing chamber assembly so as to provide additional agitation during a brewing operation.

20. A brewable beverage making machine according to claim 1, further comprising an air pump for pumping cooling air into the brewing chamber assembly so as to cool the brewed liquid exiting from the brewing chamber assembly.

21. A brewable beverage making machine according to claim 1, further including a device for breaking up the brewed liquid exiting from the brewing chamber assembly into one of particles and droplets, in order to further cool the brewed liquid.

22. A method of brewing a beverage, comprising the steps of:
    holding a brewable substance in a brewing chamber assembly of the type including:
        at least one inlet opening for supply of an input liquid therein, the at least one inlet opening being sized and oriented to cause turbulent agitation of the input liquid and brewable substance in the brewing chamber assembly,
        an outlet opening at an upper end of said brewing chamber assembly directly open to atmosphere for evacuating air from the upper end of said brewing chamber assembly, and
        a discharge opening for discharging a brewed liquid from said brewing chamber assembly;
    heating an input liquid supplied to the brewing chamber assembly;
    supplying heated liquid from the heater through the at least one inlet opening to cause said turbulent agitation;
    evacuating air from the upper end of the brewing chamber during initial filling of said brewing chamber assembly with said heated liquid by opening a first valve connected with the outlet opening; and
    closing said first valve when said heated liquid reaches a predetermined level in said brewing chamber assembly to cause pressurization of the heated liquid in said brewing chamber assembly during a brewing operation.

23. A method according to claim 22, wherein said brewing chamber assembly includes a bottom section and a top section, with the bottom section and the top section being movable relative to each other between a closed brewing position and an open position for removal and insertion of the brewable substance therein, and said top section includes a transparent dome to permit a user to view the turbulent agitation of the brewable substance and the input liquid during a brewing operation.

24. A method according to claim 23, further including a brewing support assembly in which said brewing chamber assembly is removably insertable, said brewing support assembly also including a transparent dome in covering spaced relation to the transparent dome of the top section, and further comprising the step of:
    preventing fogging and condensation of the transparent domes during a brewing operation by blowing air between the transparent domes.

25. A method according to claim 24, wherein the step of preventing fogging and condensation includes the step of blowing air between said transparent domes to prevent fogging thereof during a brewing operation.

26. A method according to claim 22, wherein said at least one inlet opening includes at least two inlet openings located at an offset position away from a center line of said brewing enclosure, each inlet opening of said at least two inlet openings is sized and oriented to provide sufficient velocity of the input liquid to move the brewable substance and input liquid within said brewing chamber assembly with said turbulent agitation, and said step of supplying heated liquid from the heater through the at least one inlet opening causes said input liquid to result in said turbulent agitation.

27. A method according to claim 22, further comprising the step of:
    controlling a second valve connected with the discharge opening to close during initial filling of said brewing chamber assembly with said heated liquid and to open when said heated liquid reacts with said brewable substance to create the brewed liquid in order to permit discharge of the brewed liquid from said discharge opening, as determined by at least one of the following:
    a) pressure in the chamber, and
    b) brewing time.

28. A method according to claim 27, wherein said brewing time is defined as one of the following:
    residence time which is a length of time the input liquid is held in contact with the brewable substance, and
    agitation time which is a length of time the input liquid and the brewable substance are exposed to agitation.

29. A method according to claim 22, wherein the step of for supplying heated liquid from the heater through the at least one inlet opening includes the step of pumping the heated liquid from the heater through the at least one inlet opening.

30. A method according to claim 22, further comprising the step of pumping air into the brewing chamber assembly at the end of a brewing cycle, so as to aid in forcing out brewed liquid from the brewing chamber assembly.

31. A method according to claim 22, further comprising the step of pumping air into the brewing chamber assembly so as to provide additional agitation during a brewing operation.

32. A method according to claim 22, further comprising the step of pumping cooling air by an air pump into the brewing chamber assembly so as to cool the brewed liquid exiting from the brewing chamber assembly.

33. A method according to claim 22, further including the step of breaking up the brewed liquid exiting from the brewing chamber assembly into one of particles and droplets, in order to further cool the brewed liquid.

* * * * *